United States Patent
Sakata et al.

[11] Patent Number: 6,120,584
[45] Date of Patent: Sep. 19, 2000

[54] AIR CLEANING APPARATUS, AIR FILTER AND METHOD FOR MANUFACTURING THE SAME

[75] Inventors: Soichiro Sakata; Katsumi Sato; Hideto Takahashi, all of Kanagawa-ken; Takao Okada, Tokyo, all of Japan

[73] Assignee: Takasago Thermal Engineering Co., Ltd., Tokyo, Japan

[21] Appl. No.: 09/155,493

[22] PCT Filed: Jan. 30, 1998

[86] PCT No.: PCT/JP98/00383

§ 371 Date: Sep. 28, 1998

§ 102(e) Date: Sep. 28, 1998

[87] PCT Pub. No.: WO98/33575

PCT Pub. Date: Aug. 6, 1998

[30] Foreign Application Priority Data

| Jan. 31, 1997 | [JP] | Japan | 9-033172 |
| May 8, 1997 | [JP] | Japan | 9-134304 |
| Aug. 5, 1997 | [JP] | Japan | 9-224348 |
| Sep. 12, 1997 | [JP] | Japan | 9-267784 |

[51] Int. Cl.[7] ................................ B01D 53/04
[52] U.S. Cl. ............. 96/135; 96/154; 55/524; 55/DIG. 5
[58] Field of Search ............. 55/514, 524, DIG. 5; 96/108, 130–136, 144, 153, 154

[56] References Cited

U.S. PATENT DOCUMENTS

| 2,038,071 | 4/1936 | Wilhelm | 96/153 X |
| 3,545,622 | 12/1970 | Sakhnovsky et al. | 96/153 X |
| 3,664,095 | 5/1972 | Asker et al. | 96/154 |
| 3,687,297 | 8/1972 | Kuhn et al. | 96/153 X |
| 3,800,515 | 4/1974 | Asker et al. | 96/154 |
| 4,130,487 | 12/1978 | Hunter et al. | 96/154 X |
| 4,325,220 | 4/1982 | McFarlin | 96/154 X |
| 4,402,717 | 9/1983 | Izumo et al. | 96/144 X |

(List continued on next page.)

FOREIGN PATENT DOCUMENTS

| 61-103518 | 5/1986 | Japan . | |
| 63-310636 | 12/1988 | Japan . | |
| 3-98611 | 4/1991 | Japan . | |
| 4-104813 | 4/1992 | Japan | 96/154 |
| 5-44958 | 2/1993 | Japan . | |
| 5-44408 | 7/1993 | Japan . | |
| 5-245325 | 9/1993 | Japan | 96/154 |
| 6-154302 | 6/1994 | Japan . | |
| 8-266866 | 10/1996 | Japan . | |
| 2579767 | 11/1996 | Japan . | |

OTHER PUBLICATIONS

Sematech, Forecast of Airborne Molecular Contamination Limits for the 0.25 Micron High Performance Logic Process, Technology Transfer #95052812A–TR, May 31, 1995.

*Primary Examiner*—Robert H. Spitzer
*Attorney, Agent, or Firm*—Patterson, Belknap, Webb and Tyler

[57] ABSTRACT

An air cleaning apparatus such as a clean room or the like having an air circulation mechanism which circulates the humidity controlled air through a predetermined air circulation path, wherein the air circulation path is provided with a filter which has a hydrophobic zeolite layer formed on its base filter media surface and another filter which is disposed downstream from the filter having a hydrophobic zeolite layer and is used for removing particulate impurities contained in the circulating air. According to this air cleaning apparatus, gaseous organic impurities and particulate impurities contained in the air circulating in the air cleaning apparatus can be removed without lowering the humidity of the circulating air. Furthermore, since this air cleaning apparatus includes no activated charcoal which is inflammable, the apparatus is excellent from the standpoint of disaster prevention. Accordingly, the filters according to the invention and particle filters can be installed with safety in the ceiling portion of the air cleaning apparatus.

25 Claims, 38 Drawing Sheets

U.S. PATENT DOCUMENTS

| | | | |
|---|---|---|---|
| 4,518,704 | 5/1985 | Okabayashi et al. | 96/153 X |
| 4,737,173 | 4/1988 | Kudirka et al. | 96/153 X |
| 4,800,190 | 1/1989 | Smolik | 55/524 X |
| 4,871,607 | 10/1989 | Kuma et al. | 96/144 X |
| 5,194,414 | 3/1993 | Kuma | 96/153 X |
| 5,288,298 | 2/1994 | Aston | 96/135 |
| 5,332,426 | 7/1994 | Tang et al. | 55/514 X |
| 5,505,769 | 4/1996 | Dinnage et al. | 96/154 X |
| 5,512,083 | 4/1996 | Dunne | 96/154 X |
| 5,580,369 | 12/1996 | Belding et al. | 96/135 X |
| 5,641,343 | 6/1997 | Frey | 96/153 X |
| 5,667,560 | 9/1997 | Dunne | 96/154 X |
| 5,792,244 | 8/1998 | Morlec et al. | 96/154 X |

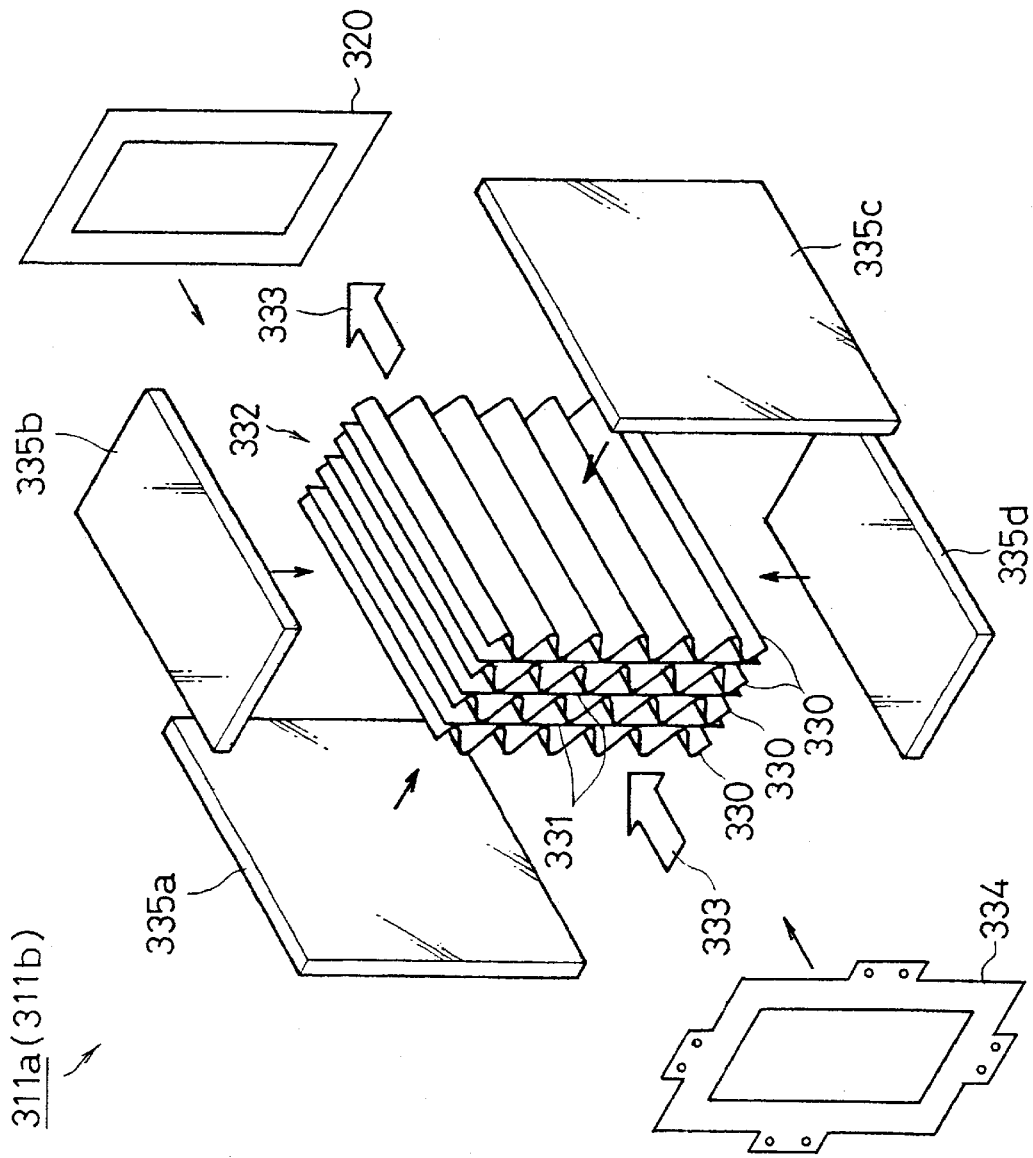

AIR CLEANING APPARATUS, AIR FILTER AND METHOD FOR MANUFACTURING THE SAME

TECHNICAL FIELD

This invention generally relates to an air cleaning apparatus such as a clean room, a clean bench and so forth, which is used in the manufacture of precision products such as semiconductor elements (e.g. LSI), liquid crystal displays (LCD) and so forth, and has the function of controlling the relative humidity of the air in the working space and also removing gaseous organic impurities and fine particulate impurities contained in air of the working space. More particularly, the invention relates to an air filter which can be installed in such apparatus for removing gaseous organic impurities contained in the air of the working space, and further relates to a method for manufacturing the same.

In the following description, the expression 'air cleaning apparatus' seems to be too general, so that it will be expressed as just 'clean room' or 'clean room or the like' for more practical and concrete understanding of the invention.

BACKGROUND ART

It is well known that a clean room, a clean bench and so on are widely made use of in the process of manufacturing LSI's and LCD's. For instance, in case of manufacturing a DRAM of 1-megabit from a bare wafer (silicon wafer), there is required a semiconductor manufacturing line consisting of the manufacturing steps of about 200. Also, in case of manufacturing a TFT of the 9.4 type from a bare glass plate (LCD substrate), there is required a LCD panel manufacturing line consisting of the manufacturing steps of about 80. In such a manufacturing line, it is not possible in practice to continuously convey the object good e.g. silicon wafer or LCD substrate from process to process up to the goal without leaving the object good in any standby position. Consequently, it may happen that semifinished products are held in a certain place or area for hours being exposed to the air of the working space. For instance, in the manufacturing line of the TFT-LCD, the half-finished LCD substrate which has been finished up to the formation of an electric circuit through the prior steps, is left in a standby position in a proper carrier or a storage compartment or room for several to several tens hours being exposed to the ordinary clean room air.

As such, when the silicon wafer or the LCD substrate are left in the ordinary clean room air for a long time, it often happens that some organic substances are deposited on the surface of the wafer or the LCD substrate. If such deposition of organic substances occurs, it causes the following an inconvenient state. That is, if an insulating oxide film ($SiO_2$) is formed on the silicon wafer surface on which organic substances are deposited, the carbon component of the organic substance is captured within the silicon dioxide film, which reduces the dielectric strength of the silicon dioxide film, thus a leakage current being increased to a great extent. Furthermore, adsorption of the organic substances disturbs the close contact between the silicon wafer surface and a photoresist film applied thereto, thus, causing failure in light exposure and etching in the photolithographic process, and resulting in incorrect formation of a circuit pattern. In addition, adsorption of the organic substances results in increasing the surface resistivity of the silicon dioxide film formed on the silicon wafer, which causes the silicon wafer to be easily charged, thereby electrostatically adsorbing the fine airborne particles thereon, and readily causing the dielectric breakdown thereof. Still further, if organic impurities contained in the clean room air are irradiated by the ultra-violet rays emitted from the optical instruments, an optical CVD reaction might take place in the clean room air, so that products generated through such reaction might stick to and cloud up the surfaces of the lens and the mirror constituting an optical instrument such as a light projector, thereby reducing the optical efficiency.

Organic substances contained in the air of the working space can give a similar ill influence to the glass substrate as the LCD substrate. In case of forming an amorphous silicon film (a-Si) for use in a thin film transistor (TFT) on the LCD substrate, if organic substances contained in the air of the working space is deposited on the LCD substrate surface, it again disturbs the close contact between the a-Si film and the LCD substrate surface. As described in the above, organic substance flying about in the air of the working space is really an ill factor to be removed as complete as possible.

On one hand, it is possible to remove the organic substance deposited on the substrate surface by some cleaning methods, for instance by means of ultraviolet/ozone treatment. According to this cleaning method, however, at least several minutes have to be spent for completely cleaning a single substrate. Consequently, enormous time has to be shared for cleaning a large number of substrates, thus naturally reducing productivity. Recently, therefore, in addition to problem with regard to the Si and LCD substrate surface contamination caused by metallic impurities and fine airborne particles contained in the air of the working space, the deep concern is focused on organic impurities which still exist even in the clean air of the working space and give a heavy influence over the production yield of semiconductor devices and others. For instance, in the article entitled 'Forecast Of Airborne Molecular Contamination Limits For The 0.25 Micron High Performance Logic Process' of Technology Transfer #95052812A- TR published by SEMATECH (U.S.A.) on May 31, 1995, the organic contaminant control level (allowable surface contamination value) is discussed and made into the following Table 1. In the discussion, the article writer(s) forecasts that in 1998, the allowable number of carbon atoms on the semiconductor substrate surface should be limited up to $5 \times 10^{13}$ carbon atoms/$cm^2$ before processing and $1 \times 10^{15}$ carbon atoms/$cm^2$ after processing.

TABLE 1

| Requirements (Year) | 1995 | 1998 | 2001 | 2004 | 2007 | 2010 |
| --- | --- | --- | --- | --- | --- | --- |
| Feature Size (micrometer) | 0.35 | 0.25 | 0.18 | 0.13 | 0.1 | 0.07 |
| Front End Processes Organics (atoms of C/$cm^2$) | 1E14 | 5E13 | 3E13 | 1E13 | 5E12 | 3E12 |
| Back End Process Organics (atoms of C/$cm^2$) | 1E15 | 1E15 | 1E15 | <1E15 | <1E15 | <1E15 |

Heretofore, a chemical filter such as an activated charcoal filter has been used as means for adsorbing and removing gaseous organic impurities which are still contained in the cleaned air. A predetermined container in the form of a tower which is filled with activated charcoal is well known as the most popular and simple chemical filter. It is also well known that a chemical filter is formed in various types. For instance, some chemical filters are made in the form of a felt by interweaving fibrous activated charcoal with a binder of polyester having a low melting point or nonwoven polyester fabric, and the others are formed by adhering granular activated carbon on an urethane foam or nonwoven fabric with a proper adhesive and then fabricating it in the shape of a block or cutting it in the shape of a sheet.

In case of a clean room of which the ceiling is used as a clean air outlet, the most effective filter arrangement for removing gaseous organic impurities in the air may be achieved by arranging the chemical filters on the upstream side of the particle filters installed in the ceiling portion so as to entirely cover it. However, according to the Fire Laws of Japan, activated charcoal is classified into an inflammable material group, and it strictly requires careful attention to fire. Accordingly, in view of the disaster prevention, it should be as avoided as possible to arrange the chemical filter using activated charcoal on the backside of the ceiling of the clean room.

The clean room for use in the manufacture of LSI's and LCD's supplies the clean air to the working space, the clean air being typically controlled to have a temperature of 23 to 25 °C. and a relative humidity of 45±10%, respectively. In general, however, activated charcoal has a very weak hydrophobic nature, so that it adsorbs not only gaseous organic impurities but also a considerable amount of moisture even if it is placed in the air conditioned circumstances. The adsorption quantity of moisture in the air by activated charcoal is rapidly increased with a small increase of the relative humidity. For instance, after holding fresh activated charcoal adsorbing none of moisture in a container filled with a dry air, if this activated charcoal is abruptly transferred to the clean room and exposed to the clean room air of which the temperature is 23 to 25° C. and the relative humidity is 45±10%, activated charcoal would adsorb a large quantity of moisture before reaching its saturated state. Accordingly, if the chemical filter using fresh activated charcoal is installed on the air supply side of the clean room, the humidity level of the supplied air is lowered due to the large amount of moisture adsorption by activated charcoal, even though the humidity is controlled at a preset level on the upstream side of the filter. If the humidity is lowered exceeding a preset level, it would facilitate generation of static electricity, which often interferes with the manufacture of LSI's and LCD's. In order to solve this problem, the manufacturer of chemical filters using activated charcoal is requested to carry out a very complex work prior to their shipping the filter. That is, they first survey the temperature and humidity of their client's clean room air before their shipping the filter, and then they intentionally humidify the filters so as to meet the air temperature and humidity level in the client's clean room, and further air-tightly pack the humidified filter for shipping thereof.

A chemical filter of the tower type generally has a high adsorption efficiency, but it has a high pressure loss (vent resistance) as its drawback. On one hand, a chemical filter of the felt or sheet type is acceptably ventilative and shows the adsorption efficiency in adsorption of organic impurities which is not so different from that of the tower type chemical filter. However, there is a possibility that the filter of this type may act as a source of gaseous organic impurities. More specifically, the problem exists in various adhesives used for firmly fixing activated charcoal on the base filter media (e.g. nonwoven fabric) and/or sealing materials used for fixing the base filter media to the filter frame. For instance, neoprene resin, urethane resin, epoxy resin, silicone resin, etc. are typically used as adhesives, and neoprene rubber, silicone rubber, etc. are typically used as sealants. Thus, there is a possibility that gaseous organic impurities originating from these adhesives and sealing materials are included in the air passing through the chemical filter and may give an ill influence to the manufacture of semiconductor devices. In other words, the chemical filter of the felt or sheet type may remove the organic impurities of the ppb order contained in the clean room air, but it releases gaseous organic impurities by itself and again mixes them with the clean air once filtered by itself.

In general, materials which release gaseous organic impurities as mentioned above are also included in a constituent of the particle filter for removing particulate impurities. This filter is typically arranged on the downstream side of the chemical filter for adsorbing gaseous organic impurities, so that the particle filter may undesirably act as a gaseous organic impurity source.

A JP unexamined patent publication No. 61-103518 and a JP unexamined patent publication No. 3-98611 respectively disclose a filter which can be convertibly used as a chemical filter. The former patent publication describes a filter which is developed for removing offensive odor. This filter is formed by immersing a base material such as a urethane foam in an aqueous solution containing activated charcoal powder, adhesive of the emulsion type, and solid acid, and then drying it. In case of this filter, however, gaseous organic substances may be also released not only from the synthetic rubber latex and other organic adhesive dispersoid used as the adhesive of the emulsion type, but also from the urethane foam itself. On the other hand, the above latter patent publication describes a filter which is developed for removing harmful gas and offensive odor against human health. This filter requires combination use of the adsorbent and the organic binder as a necessary condition. However, polyethylene and other organic substances, which are described as preferable examples of the organic binder in the publication, may never fail to release undesirable gaseous organic substances by themselves.

As a filter of this kind, a JP unexamined patent publication No. 63-310636 (JP Patent No. 2,579,767) and an unexamined international publication No. WO91/16971 (JP Patent No. 2,579,767) also describe a filter in which an adsorbent such as zeolite is fixed to the surface of a honeycomb matrix having perforations by using a water glass and other inorganic binder.

Accordingly, an object of the invention is to provide a filter which is safe and reliable from the standpoint of disaster prevention, and neither disturbs the controlled humidity of the clean room air nor releases gaseous organic impurities by itself, and can remove even a very small quantity of gaseous organic impurities contained in the working space, thereby protecting the substrate surface from being contaminated with such impurities. Another object of the invention is to provide a method for manufacturing the filter as mentioned above. Still another object of the invention is to provide a clean room or the like equipped with the filter as mentioned above.

DISCLOSURE OF THE INVENTION

According to the invention, there is provided a clean room or the like having an air circulation mechanism which circulates the humidity controlled air through a predetermined air circulation path, wherein said air circulation path is provided with an air filter which has a hydrophobic zeolite layer formed on its base filter media surface and another air filter which is disposed on the downstream side of the filter having a hydrophobic zeolite layer and is used for removing particulate impurities contained in the circulating air.

According to this clean room, gaseous organic impurities can be removed from the air circulating in the clean room without lowering the humidity of the circulating air. Since this clean room includes no activated charcoal which is inflammable, the apparatus is excellent from the standpoint of disaster prevention, and the filter of the invention can be installed with safety in the ceiling portion of the clean room along with a particle filter. Furthermore, it is preferable for the filter to be constituted only with materials which generate no gaseous organic impurities.

In the filter as mentioned above, the base filter media is preferably formed in a honeycomb shape, and includes a number of tiny vent pores therein, and hydrophobic zeolite layer is firmly fixed to the surface of the honeycomb shaped base filter media (referred to as 'honeycomb structure' hereinafter). In this case, this hydrophobic zeolite layer is formed by immersing the honeycomb structure in a suspension in which hydrophobic zeolite powder is dispersed, and then drying it. Also, the hydrophobic zeolite layer may be firmly fixed to the surface of the honeycomb structure by means of an adhesive. The honeycomb structure is preferably formed by using incombustible materials such as inorganic fiber (indispensable component) including either clay minerals or calcium silicate. Hydrophobic zeolite preferably has an effective pore diameter of 7 angstroms or more. Furthermore, the particle filter should be formed of only materials which generate no gaseous organic impurities.

According to the invention, there is provided a filter having an adsorption layer which is formed by firmly fixing synthetic hydrophobic zeolite having an effective pore diameter of not less than 7 angstroms for adsorbing gaseous organic impurities contained in the working space to the surface of a supporter (i.e. base filter media) by using inorganic substance as a binder. This inorganic substance can adsorb gaseous organic impurities and has an effective pore diameter larger than that of zeolite.

Also, the invention provides a filter in which there are provided the first adsorption layer which is formed by firmly fixing synthetic hydrophobic zeolite having an effective pore diameter of not less than 7 angstroms for adsorbing gaseous organic impurities contained in the working space to the surface of the supporter with the help of an inorganic substance as a binder, and the second adsorption layer which is formed by firmly fixing an inorganic substance to the surface of the first adsorption layer, the inorganic substance having ability to adsorb gaseous organic impurities and an effective pore diameter larger than that of zeolite. In this case, the inorganic substance used as a binder in the step of the formation of the first absorption layer may have an effective pore diameter larger than that of zeolite.

Furthermore, the invention provides an air filter in which synthetic hydrophobic zeolite having an effective pore diameter of not less than 7 angstroms for adsorbing gaseous organic impurities contained in the air of the working space is pelletized by using an inorganic substance as a binder, and the resultant zeolite pellets are firmly fixed to the surface of the supporter. In this case, the inorganic substance used as a binder can adsorb gaseous organic impurities and has an effective pore diameter larger than that of zeolite.

Still further, the invention provides an air filter in which synthetic hydrophobic zeolite having an effective pore diameter of not less than 7 angstroms for adsorbing gaseous organic impurities contained in the air of the working space is pelletized using an inorganic substance as a binder, and the resultant zeolite pellets are coated with an inorganic substance which can adsorb gaseous organic impurities and has an effective pore diameter larger than that of zeolite, and are firmly fixed to the surface of the supporter.

In these filters as just mentioned above, if the filter according to the invention utilizes zeolite having an effective pore diameter of 8 angstroms, the filter can adsorb gaseous organic impurities such as DOP and DBP of which the molecular size is less than 8 angstroms. However, when it comes to gaseous organic impurities such as BHT and siloxane of which the molecular size of more than 8 angstroms, the filter might fail to adsorb larger gaseous organic impurities as such. However, such impurities can be adsorbed by the filter according to the invention, because the filter additionally employs an inorganic substance having an effective pore diameter of more than 8 angstroms. The above-mentioned 'binder' can make not only the zeolite-supporter bond, but also the zeolite—zeolite bond.

In the filter according to the invention, its supporter can be formed into the honeycomb structure. In this case, it is preferable that inorganic fiber is used as an indispensable component of the honeycomb structure as the supporter. If the constituents of the filter, not only the supporter but also an adsorbent such as zeolite, a binder for fixing the adsorbent to the supporter surface, etc., are selected from proper inorganic substances, there is no chance for the constituents of the filter to become a gaseous impurity source. The shape of the supporter is not limited to be of honeycomb structure. It may be of other shape, of which the cross section is in the form of a grid or a wave, for instance. Furthermore, the supporter can be of 3-dimensional mesh structure like a rock wool including a great number of air vent pores. In case of this 3-dimensional mesh structure, as will be described later, zeolite as the adsorbent can be firmly fixed not only to its surface but also to the inside thereof along its depth (thickness). Adhesion of the adsorbent to the supporter surface is achieved, for instance, by immersing the supporter in a suspension in which at least an adsorbent is dispersed and then drying it, or by blowing adsorbent pellets against the supporter surface which is made adherent. These adsorbent pellets are pelletized from the mixture of adsorbent and inorganic binder.

Furthermore, the invention provides an air filter having a casing filled up with synthetic hydrophobic zeolite pellets, having an effective pore diameter of not less than 7 angstroms which are pelletized from zeolite capable of adsorbing gaseous organic impurities contained in the air of the working space by using the inorganic substance as a binder which has ability to adsorb gaseous organic impurities and has an effective pore diameter larger than that of zeolite.

Still further, the invention provides an air filter having a casing filled up with synthetic hydrophobic zeolite pellets, having an effective pore diameter of not less than 7 angstroms which are pelletized from zeolite capable of adsorbing gaseous organic impurities contained in the air of the working space by using the inorganic substance as a binder, and which are further coated with an inorganic substance having ability to adsorb gaseous organic impurities and an effective pore diameter larger than that of zeolite.

Similarly, in these air filters as mentioned just in the above, if the filter uses zeolite having an effective pore diameter of 8 angstroms, the filter can adsorb gaseous organic impurities such as DOP and DBP of which the molecular size is less than 8 angstroms. However, when it comes to gaseous organic impurities such as BHT and siloxane of which the molecular size of more than 8 angstroms, the filter might fail to adsorb such larger gaseous organic impurities. However, such impurities can be adsorbed by the filter according to the invention, because it additionally uses an inorganic substance having an effective pore diameter of more than 8 angstroms. The shape and dimension of the casing and the amount of adsorbent pellets to be charged therewith can be determined based on the shape of air flow path, effective filtration area, and the installation condition of the filter. This would give considerable flexibility to the design of the filter.

Zeolite used as an adsorbent is either hydrophobic or A hydrophilic. The moisture amount adsorbed by hydrophobic zeolite is smaller than that adsorbed by hydrophilic zeolite, so that the porous structure of hydrophobic zeolite is less occupied with moisture than that of hydrophilic zeolite. This means that hydrophobic zeolite can more effectively use its porous structure for adsorbing the object impurities than hydrophilic zeolite. Therefore, the filter using hydrophobic zeolite has a longer life than that using hydrophilic zeolite. On one hand, if both of zeolite are compared to each other in terms of the cost thereof, hydrophilic zeolite still gains an advantage over hydrophobic zeolite.

When the above zeolite has an effective pore diameter of 7 angstrom or more and the inorganic substance adsorbing gaseous organic impurities has an effective pore diameter larger than that of zeolite, it is preferable that a total volume of the pore distributing in the range of 15 to 300 angstroms is more than 0.2 cc per unit weight (g) of the inorganic substance, or that a specific surface of the pore of the inorganic substance is more than 100 $m^2/g$. A main component of the inorganic substance which adsorbs gaseous organic impurities and has an effective pore diameter larger than that of zeolite, is preferably either one of porous viscous clay mineral, diatom earth, silica, alumina, mixture of silica and alumina, activated alumina, aluminum silicate and porous glass, or is mixture thereof. The porous viscous clay mineral is either one of hydrated magnesium silicate clay mineral such as sepiolite, palygorskite, etc., activated clay, acid clay, activated bentonite, and a complex of microcrystal of aluminosilicate and microscopic particles of silica, or is mixture thereof. In any event, the inorganic substance which is used as a binder, adsorbs gaseous organic impurities and has an effective pore diameter larger than zeolite, fills various roles, for instance mechanically supporting zeolite powder on the surface of the support, serving as an adhesion assisting agent when pelletizing zeolite powder, and adsorbing gaseous organic impurities which have a molecular size larger than the effective pore diameter, thus not being adsorbed by zeolite. It is preferable that the above-mentioned filter is assembled by using only materials which neither generate any gaseous organic impurities nor burst into flame.

The above-mentioned inorganic substance may include an inorganic adhesion assisting agent, which includes at least one of sodium silicate, silica, and alumina.

In addition, according to the invention, there is provided a method for manufacturing an air filter, which includes the steps of: preparing a suspension in which there are dispersed powder of synthetic hydrophobic zeolite having an effective pore diameter of not less than 7 angstroms and powder of an inorganic substance which absorbs gaseous impurities and has an effective pore diameter larger than that of zeolite and serves as a binder; and immersing the supporter in the suspension and then drying it, thereby forming an absorption layer on the surface of the support.

Furthermore, the invention provide a method for manufacturing an air filter which includes the steps of: immersing a supporter in a suspension in which there are dispersed powder of synthetic hydrophobic zeolite having an effective pore diameter of not less than 7 angstroms and powder of an inorganic substance as a binder and then drying it, thereby forming the first adsorption layer on the surface of the supporter; and immersing the supporter already having the first adsorption layer, in a suspension in which there is dispersed an inorganic substance which has ability to adsorb gaseous organic impurities and an effective pore diameter larger than that of zeolite and then drying it, thereby forming the second adsorption layer on the surface of the first adsorption layer.

According to these filter manufacturing methods, the filter can be assembled substantially only with component materials which neither generate any gaseous organic impurities nor burst into flame. In these methods, it is possible that an inorganic adhesion assisting agent of the sol state may be mixed with the suspension which is used for forming the first adsorbing layer and the second adsorbing layer thereon, so that the above-mentioned inorganic substance comes to include the inorganic adhesion assisting agent.

Furthermore, according to the invention, there is provided a clean room or the like having an air circulation mechanism which circulates the humidity controlled air through a predetermined air circulation path, wherein the air circulation path is provided with any one of air filter according to the invention and a particle filter which removes particulate impurities contained in the circulating air and is arranged on the downstream side of the air filter. According to this clean room, it becomes possible to remove gaseous and particulate impurities contained in the circulating air without disturbing the controlled humidity of the circulating air. Since this clean room includes no activated charcoal which is inflammable, the clean room is excellent from the standpoint of disaster prevention. Accordingly, the filters of the invention and particle filters can be installed with safety in the ceiling portion of the clean room.

Still further, according to the invention, there is provided an air filter which includes the first filter portion including synthetic hydrophobic zeolite having an effective pore diameter of not less than 7 angstroms as an adsorbent, and the second filter portion which is disposed on the upstream or downstream side of the above first filter portion so as to be adjacent thereto, the second filter portion including an inorganic adsorbent which adsorbs gaseous organic impurities and has an effective pore diameter larger than synthetic zeolite. Since this air filter includes no activated charcoal which is inflammable, it is excellent from the standpoint of disaster prevention. According to this filter, gaseous organic impurities contained in the air circulating in the clean room can be removed without disturbing the controlled humidity of the circulating air.

In this filter, the first filter portion includes a supporter to the surface of which synthetic zeolite is firmly fixed, and the second filter portion also includes a supporter to the surface of which an inorganic adsorbent is firmly fixed. In this case, the supporter of the first filter portion is immersing in a suspension in which synthetic zeolite is dispersed, and then dried, thereby synthetic zeolite being firmly fixed to the surface of the supporter, and the supporter of the second filter portion is immersing in a suspension in which an inorganic adsorbent is dispersed, and then dried, thereby the inorganic adsorbent being firmly fixed to the surface of the supporter.

Furthermore, the first filter portion may be formed such that pellets formed by pelletizing synthetic zeolite powder are firmly fixed to the supporter surface of the first filter portion, and the second filter portion may be formed such that pellets formed by pelletizing the powder of an inorganic adsorbent are firmly fixed to the supporter surface of the second filter portion.

The supporter may be divided into two regions by an imaginary boundary plane intersecting the air flow passing through the supporter at right angles, and pellets formed by pelletizing synthetic zeolite or powder thereof are firmly fixed to the surface of one of these two regions, thereby forming the first filter portion, and pellets formed by pelletizing the inorganic adsorbent or powder thereof are firmly fixed to the surface of the remaining region, thereby forming the second filter portion.

When firmly fixing pellets formed by pelletizing synthetic zeolite or powder thereof to the surface of the supporter and/or when firmly fixing pellets formed by pelletizing an inorganic adsorbent or powder thereof to the surface of the supporter, there is used an adhesion assisting agent which consists of at least one selected from talc, kaolin mineral, bentonite, sodium silicate, silica, and alumina.

The inorganic adsorbent as used in the second filter portion consists of at least one selected from diatom earth, silica, alumina, mixture of silica and alumina, aluminum silicate, activated alumina, porous glass, hydrated magnesium silicate clay mineral, activated clay, and activated bentonite.

In the inorganic adsorbent of the second filter portion, a total volume of the pore distributing in the range of 15 to 300 angstroms is more than 0.2 cc per unit weight (g) of inorganic adsorbent, or the specific surface of the pore of the inorganic adsorbent is more than 100 m$^2$/g.

The above-mentioned supporter may be of honeycomb structure. In this case, the honeycomb structure is preferably formed of inorganic fiber as its indispensable component.

The first filter portion may be made in the form of a cylindrical casing which is filled with the synthetic zeolite pellets while the second filter portion may be made in the form of a separate cylindrical casing which is filled with in organic adsorbent pellets. Further, it is preferable that said synthetic zeolite is hydrophobic.

BRIEF DESCRIPTION OF THE DRAWINGS

FIG. 17b is a perspective view of a filter finished by assembling the filter portions as shown in FIG. 17a;

FIG. 18 is a schematic exploded view of first and second filter portions;

FIG. 23b is a cross sectional view taken on line B—B of the FIG. 23a;

PREFERRED EMBODIMENTS OF THE INVENTION

Preferred embodiments of the invention will now be described with reference to accompanying drawings.

Figure 1:
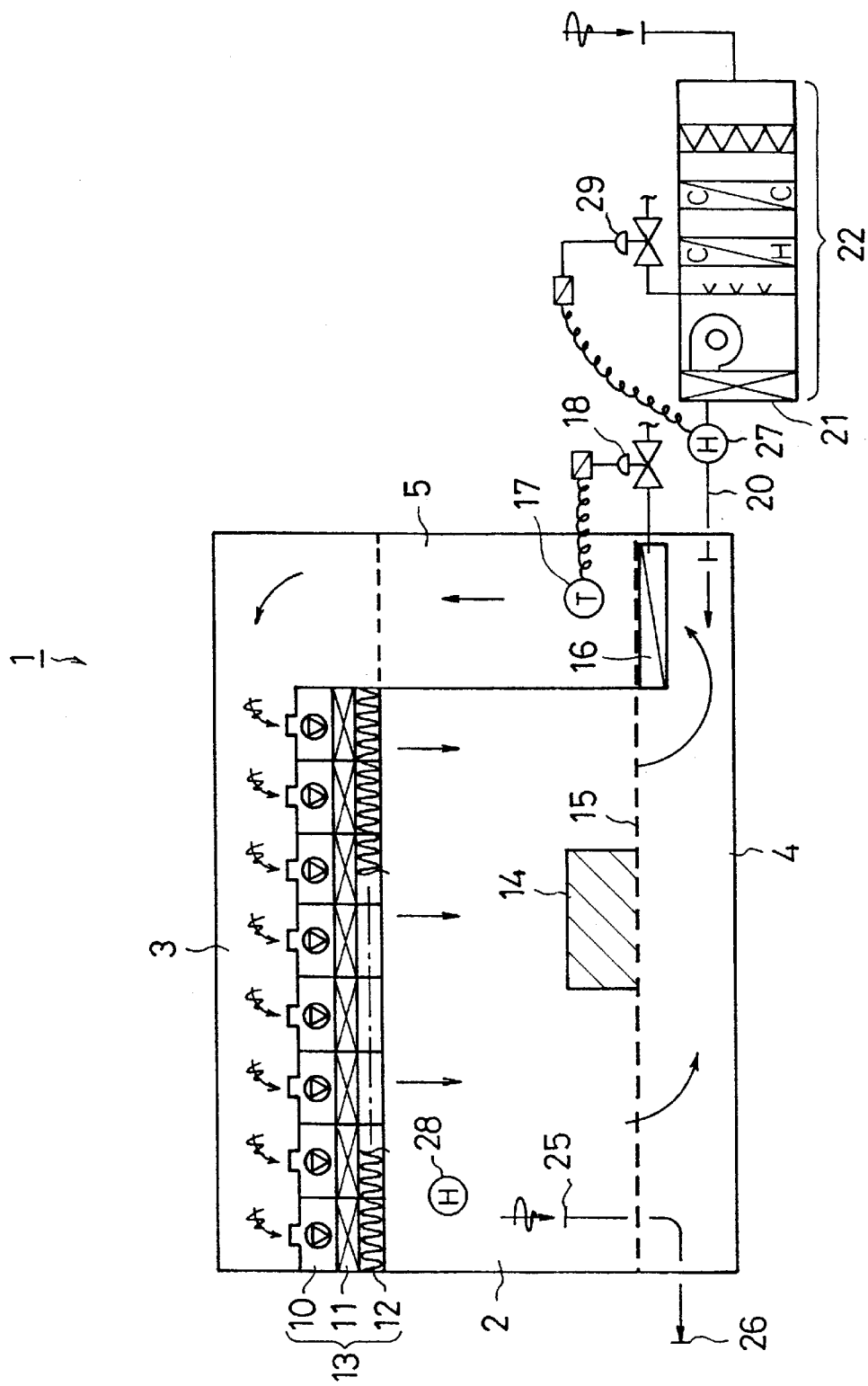
FIG. 1 is a schematic illustration for explaining the constitution of an air cleaning system according to the first embodiment of the invention.

FIG. 1 is a schematic illustration for explaining the constitution of a clean room 1 according to the first embodiment of the invention. Here, as noted in the above, the term 'clean room' may be replaced by a term 'clean bench' or others having similar function, without altering the effect and scope of the invention. The clean room 1 includes a working space 2 in which precise and delicate products such as LSI's and LCD's can be processed, a ceiling portion (supply plenum) 3 and an under-floor portion (return plenum) 4 both of which define the uppermost and lowermost portions of the space 2 respectively, and a return path 5 located on the side of the working space 2.

On the ceiling portion 3 is arranged a clean fan unit 13 which is provided with a fan unit 10, a filter 11 of good vent, and a particle filter 12. A semiconductor manufacturing apparatus 14 is located in the working space 2 and acts as a kind of a heat source. The under-floor portion 4 is partitioned off with grated panels 15 having a number of holes or perforations. A condensation coil of the non-dew type 16 is equipped in the under-floor portion 4 in order to deal with the sensible heat load of the semiconductor manufacturing apparatus 14. The non-dew type condensation coil 16 is an air cooler which can cools the air without causing any dew condensation on the surface of a heat exchanger. A temperature sensor 17 is set up in the return path 5 to detect the temperature therein. A valve 18 which regulates the flow of chilled water is controlled such that the temperature detected by the sensor 17 and the relative humidity in the return path are kept at respective preset constant levels, without causing any dew on the surface of the condensation coil 16.

With operation of the fan unit 10 in the clean fan unit 13, the air in the clean room 1 begins to circulate at a predetermined air flow rate in the order of ceiling portion 3—working space 2—under-floor portion 4—return path 5—ceiling portion 3. During this air circulation, the air is cooled through the non-dew type condensation coil 16, and gaseous organic impurities and particulate impurities contained in the circulating air are removed by the filter 11 and particle filter 12 of the clean fan unit 13 respectively, thereby the clean air with a suitably controlled temperature being continuously supplied to the working space 2.

The filter 11 includes hydrophobic zeolite for removing gaseous organic substances contained in the circulating air. This filter 11 is constituted with materials which neither generate gaseous organic impurities nor are inflammable.

The particle filter 12 is disposed downstream from the filter 11 and removes particulate impurities. This filter 12 is also constituted with materials which do not generate any gaseous organic impurities.

The outdoor air is suitably supplied to the under-floor portion 4 through an outdoor air intake path 20. In this outdoor air intake path 20, there are provided a filter 21 which includes hydrophobic zeolite for removing gaseous organic impurities contained in the outdoor air, and a unit type air conditioner 22 which is disposed upstream from the filter 21, and performs removal of dusts in the outdoor air and controls the temperature and humidity of the outdoor air. A humidity sensor 27 is set up in the outdoor air intake path 20. A valve 29 for regulating a water supply pressure in the humidity control portion of the unit type air conditioner 22 is controlled such that the humidity detected by the sensor 27 is kept at a preset value. On one hand, in the working space 2, there is provided another humidity sensor 28 for detecting the humidity of the air in the working space 2.

The outdoor air supplied to the under-floor portion 4 of the clean room 1 through the outdoor air intake path 20 is introduced to the working space 2 via the return path 5 and the ceiling portion 3. The balance between the outdoor air volume introduced to the working space 2 and the air volume exhausted therefrom is suitably controlled, thereby keeping the pressure of the working space 2 at a constant value. The air of the working space 2 is exhausted from an exhaust opening 25 via a return gill 26.

Figure 2:
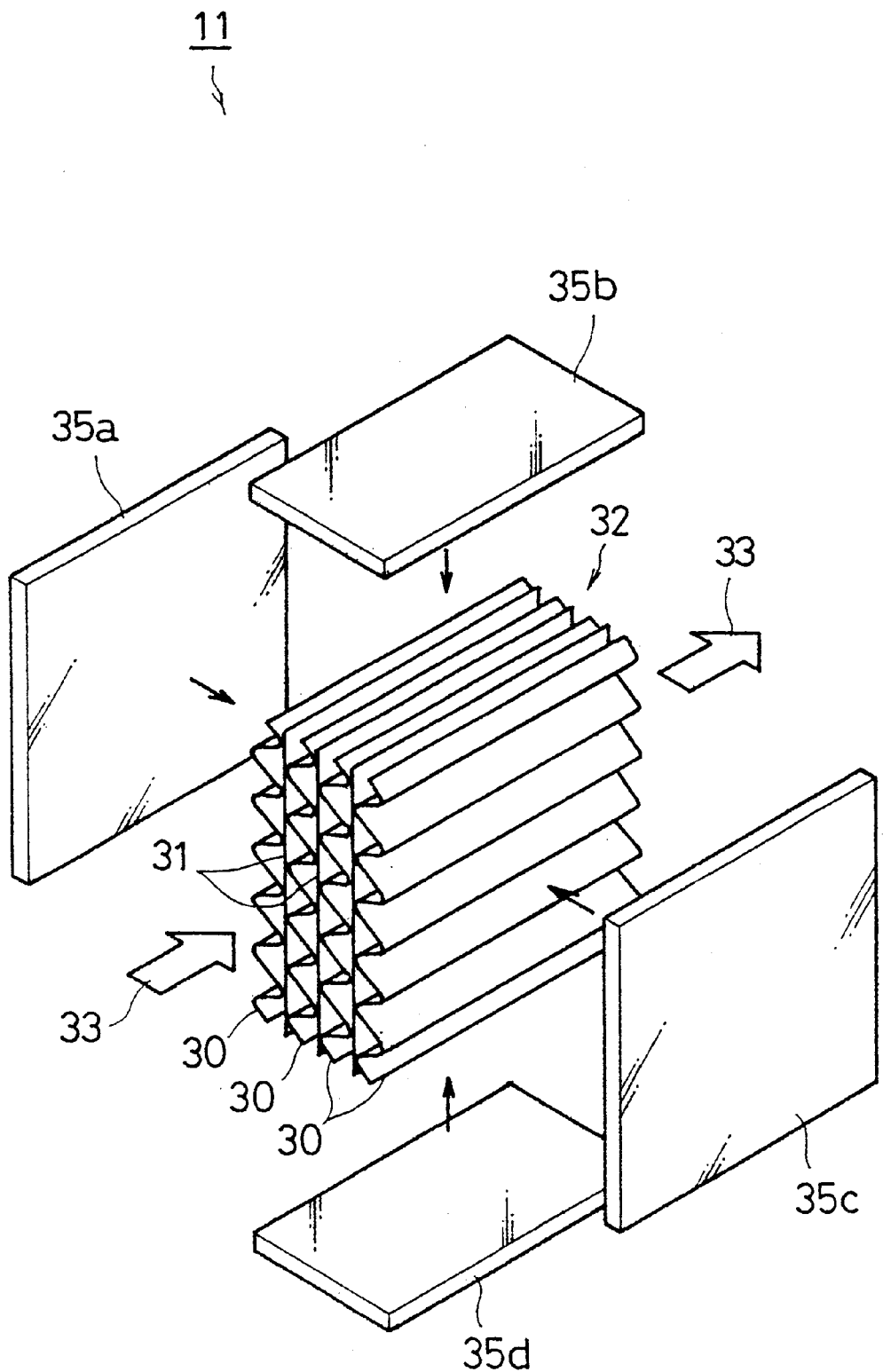
FIG. 2 is a schematic exploded view of a filter related to the invention.

FIG. 2 is a schematic exploded view of the filter 11. As shown, the filter 11 has a honeycomb structure 32 which is formed by stacking a plurality of corrugated sheet 30 and thin flat sheet 31 in an alternate fashion. Hydrophobic zeolite is firmly fixed to the entire surface of this honeycomb structure 32. In this case, hydrophobic zeolite preferably has an effective pore diameter of more than 7 angstroms. As shown in the figure, the filter 11 is assembled such that the honeycomb structure 32 with hydrophobic zeolite is contained inside a box like open frame which is defined by external frame members 35a, 35b, 35c, 35d, and of which two sides as indicated by arrows 33 are kept open so as to allow the air to flow therethrough. These frame members are made of aluminum. The outer shape and dimension of the filter 11 may be arbitrarily designed to meet the space available for accommodating it.

Now, a brief explanation will be made about an exemplary method for manufacturing the filter 11. Inorganic fibers (ceramic fibers, glass fibers, silica fibers, alumina fibers), organic material (mixture of pulp and fused Vinylon), and calcium silicate are mixed at a weight ratio of 1:1:1, and a paper-thin filtering sheet with a thickness of 0.3 mm is made of this mixture by means of a wet type paper making machine. In the above mixture, calcium silicate may be replaced by clay mineral such as sepiolite including magnesium silicate as a main component, attapulgite, etc. This sheet is processed by a corrugating machine and transformed into a corrugated sheet. The corrugated sheet 30 and the thin flat sheet 31 is alternately stacked up and mutually fixed by a suitable adhesive, thereby forming the honeycomb structure 32 shown in FIG. 2. This honeycomb structure 32 then is treated by heat for one hour using electric furnace kept at 400° C. With this heat treatment, all the organic components is removed away and the honeycomb structure 32 (base filter media) is made porous. In the next, this porous honeycomb structure 32 is immersed for several minutes into a suspension in which hydrophobic zeolite powder with a grain size of several micrometer and inorganic sol binder (silica sol, alumina sol, etc.) are dispersed. After that, the honeycomb structure 32 is further treated by heat at 300° C. for one hour, thereby finishing the filter 11. Since the filter 11 is formed in the way as mentioned above, gaseous organic impurities which might have been included or deposited on the filter constituents can be thoroughly driven out during the heat treatment as mentioned above. Therefore, there is no possibility that the filter itself may act as a gaseous organic impurity source.

Figure 3:
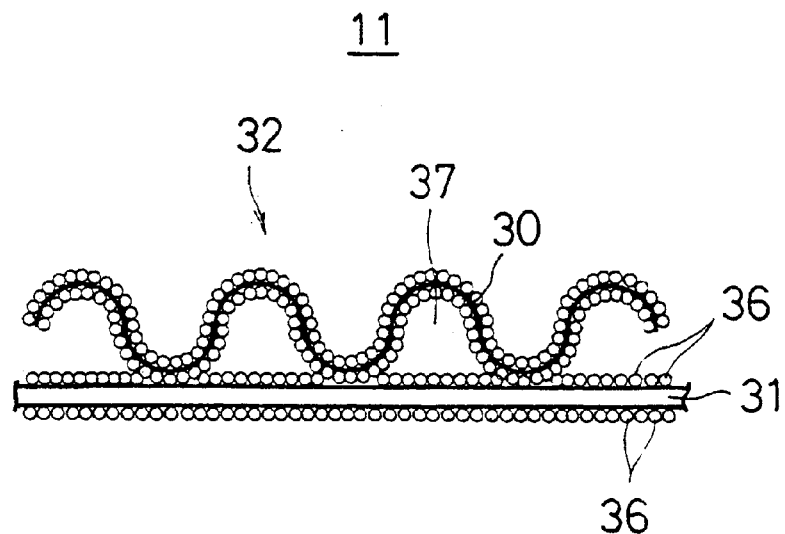
FIG. 3 is a partial enlarged cross sectional view of adsorption layers, which are formed by alternately stacking a corrugated sheet having a round wave form and a thin plain sheet.
Figure 4:
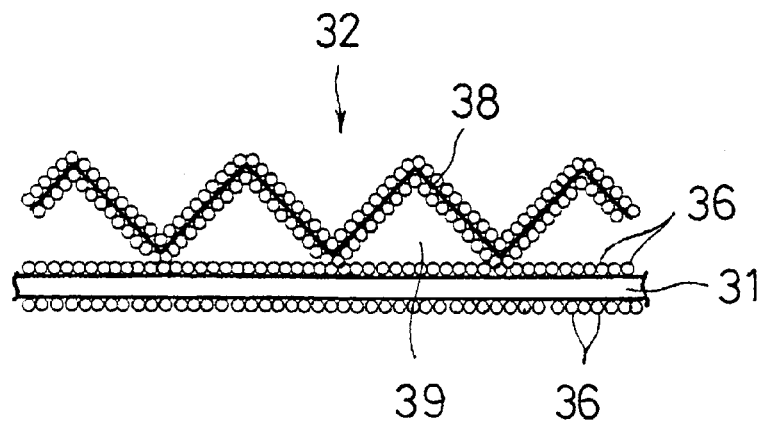
FIG. 4 is a partial enlarged cross sectional view showing adsorption layers, which are formed by alternately stacking a corrugated sheet having a triangle wave form and a thin plain sheet.

In the next, another method for manufacturing the filter 11 will be explained in the following. Up to the formation of the honeycomb structure 32, all the manufacturing steps are identical to those which are described in the above. In the above example, the porous honeycomb structure is impregnated with hydrophobic zeolite powder with a grain size of several microns. In this example, granular hydrophobic zeolite is fixed to the surface of the honeycomb structure 32 by using a proper adhesive. FIG. 3 is an enlarged cross sectional view of the filtering media used for the filter 11 in the current example. The granular hydrophobic zeolite 36 is fixed to the surface of corrugated sheet 30 and thin flat sheet 31 by using incombustible adhesive so as to closely cover the entirety thereof. Then, the honeycomb structure 32 is treated by heat for 2 hours in an electric furnace kept at such a temperature as 100° C. which is lower than the allowable maximum temperature of the adhesive, thereby completely driving out gaseous organic impurities contained in the adhesive and finishing the filter 11. The air to be cleaned passes through the space 37 having an approximately semicircular cross section as shown in FIG. 3. The filter 11 may be also formed by using a honeycomb structure 32 which is formed in combination of corrugated sheet 38 like a triangle wave form and thin flat sheet 31 as shown in FIG. 4, and fixing the granular hydrophobic zeolite to the entire surface of the honeycomb structure 32 by incombustible adhesive. In case of FIG. 4, the air to be cleaned passes through the space 39 having a triangular cross section.

The filter 11 as formed in the above includes nothing inflammable as its constituents. Accordingly, if the filter 11 is installed in the ceiling portion as shown in FIG. 1, safety in view of disaster prevention can be remarkably enhanced comparing to the case of using the prior art chemical filter relying on the inflammable activated charcoal. In addition, in the clean room 1 shown in FIG. 1, if the filter 21 for filtering the introduced outdoor air has the same constitution as the filter 11 for filtering the circulated air, safety from the standpoint of disaster prevention can be still further enhanced comparing to the case of providing the prior art chemical filter relying on the inflammable activated charcoal at the outdoor air intake.

An ordinary medium efficiency air filter, a HEPA filter, and an ULPA filter which are well known as a particle filter, generally employ a base filter media containing a binder which includes some volatile organic components. Therefore, generation of gaseous organic impurities is inevitable if they are used as they are. Accordingly, as to the particle filter 12, it is most preferable to employ that which uses the base filter media including no binder. If the base filter media including a binder is only available, it is preferable to treat it by heat to drive out volatile organic substance before use of it as the base filter media for the particle filter. Also, as to the sealing member for fixing the base filter media to the filter frame, the same attention is to be paid in selection thereof. That is, it is important to select a sealant including no volatile organic substances or to make an air-tight pressure contact between base filter media and the filter frame by means of a physical or mechanical means without using any sealant.

Figure 5:
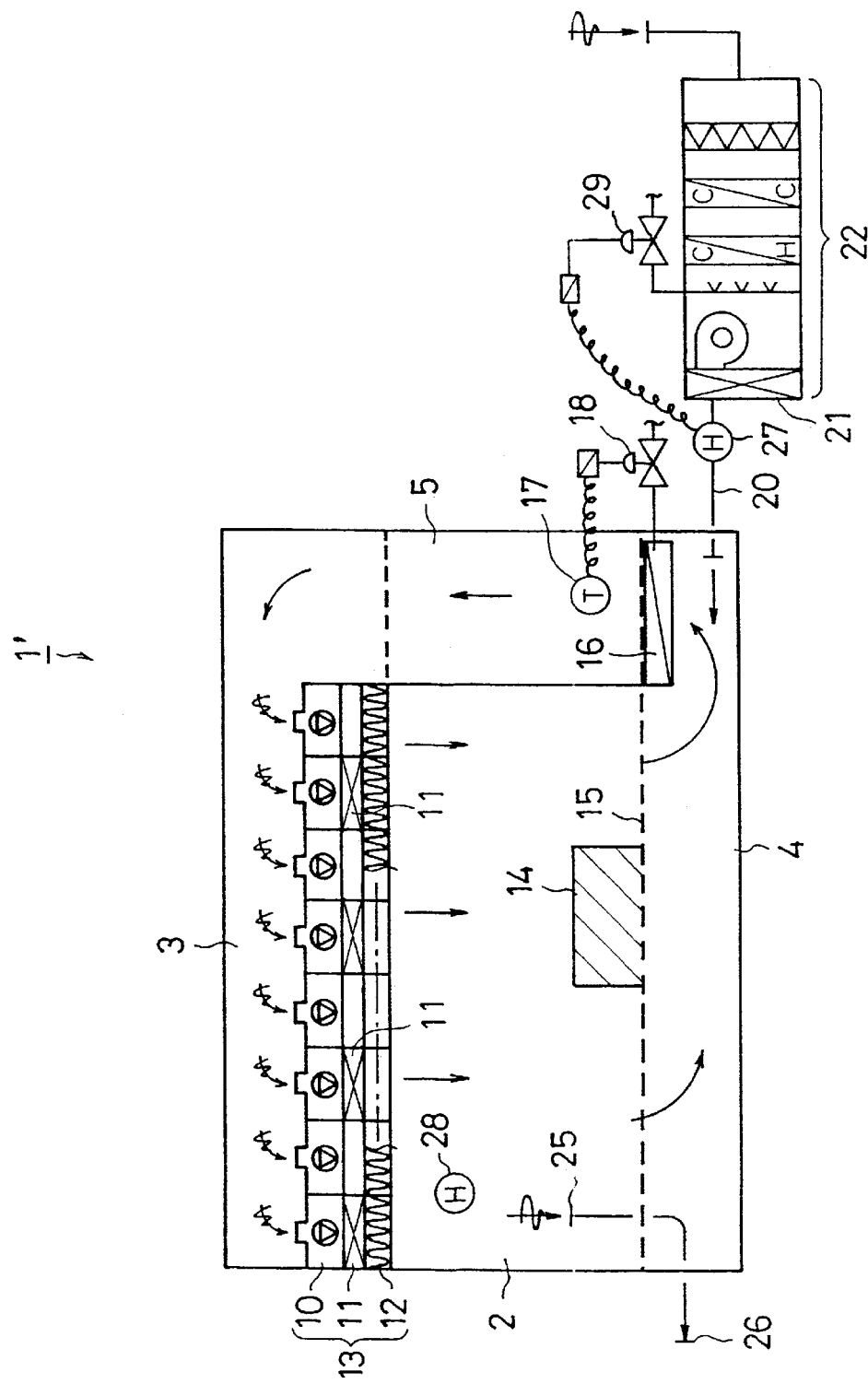
FIG. 5 is a schematic illustration for explaining the constitution of another clean room according to the first embodiment of the invention.

FIG. 5 is a diagrammatic representation of another clean room 1' according to the first embodiment of the invention. In this clean room 1', the filter 11 with the hydrophobic zeolite fixed honeycomb structure is installed in the ceiling portion 3 of the clean room 1' so as not to entirely cover it but to cover it in part. In this example, the number of filters as installed is reduced to a half of those which are used in the clean room 1 as shown in FIG. 1. Except the number of filters, there is no difference between both clean rooms 1 and 1' shown in FIGS. 1 and 5. Therefore, like parts thereof are designated with the like reference numerals, and detailed description thereabout will not be repeated.

A source of contaminants contaminating the substrate surface of LSI, LCD, etc. can exist even in the clean room in which they are manufactured. Because the clean room can not help being constituted with materials including such contaminants and using things containing the same. In general, high-molecular organic compounds having a high boiling point are considered to act as a source of hazardous organic contaminants, for instance organic siloxane generated from some sealants, phosphoric ester from a flame retardant contained in some building materials, phthalate from a plasticizer contained in some building materials, HMDS from an agent facilitating close adhesion of the photoresist, BHT from an antioxidant contained in cassettes. These contaminants are less included in the introduced outdoor air. Accordingly, a role of the filter 11 is to remove such high-molecular organic compounds from the air circulating through the clean room, thereby reducing the concentration of such organic compounds. The concentration of the organic substance in the clean room shows its maximum value immediately after starting the operation of the clean room. However, it gradually goes down with the passage of time, due to removal of the organic substance from the circulating air, and finally it is stabilized at a value when removal and generating of the organic substance is balanced. The quantity of organic substances removed during one cycle of the air circulation in the clean room 1' of FIG. 5 is a half of that which is removed by the clean room 1 of FIG. 1. In other words, as a matter of course, the clean room 1' of FIG. 5 takes a considerably longer time before reaching its equilibrium state with respect to the organic substance concentration than the clean room 1 of FIG. 1. Furthermore, the equilibrium concentration the clean room 1' can reach finally, becomes higher than that which the clean room 1 can do. Accordingly, comparing to the clean room 1 of FIG. 1, the clean room 1' of FIG. 5 includes such a disadvantageous feature that it needs a longer time for reducing the organic substance concentration and that the concentration it can realize is higher than that which the apparatus 1 can do. However, considering the initial installation cost of the filter 11 and also maintenance cost for inevitable periodical replacement of the same, it might be worthy of taking account of such arrangement as the clean room 1' from the standpoint of manufacturing cost reduction.

A filter 100 according to the second embodiment of the invention will now be described with reference to FIG. 6.

This filter 100 has a structure similar to that which is shown in FIG. 2, except that in this filter 100, zeolite powder is fixed to the entire surface of a honeycomb structure 112 with the help of an inorganic binder of which the effective pore diameter is larger than that of the zeolite powder. The filter 100 is formed by alternately stacking up a plurality of corrugated sheets 110 and thin flat sheets 111 inside the space defined by frame members 115a, 115b, 115c, and 115d, so as to direct them roughly in parallel with the air flow 113, all the surfaces of corrugated sheet and thin flat sheet being covered by the zeolite powder fixed thereto with the help of the inorganic binder. The outer shape and dimension may be arbitrarily designed so as to meet the space available for installation of the filter 100.

Figure 7:
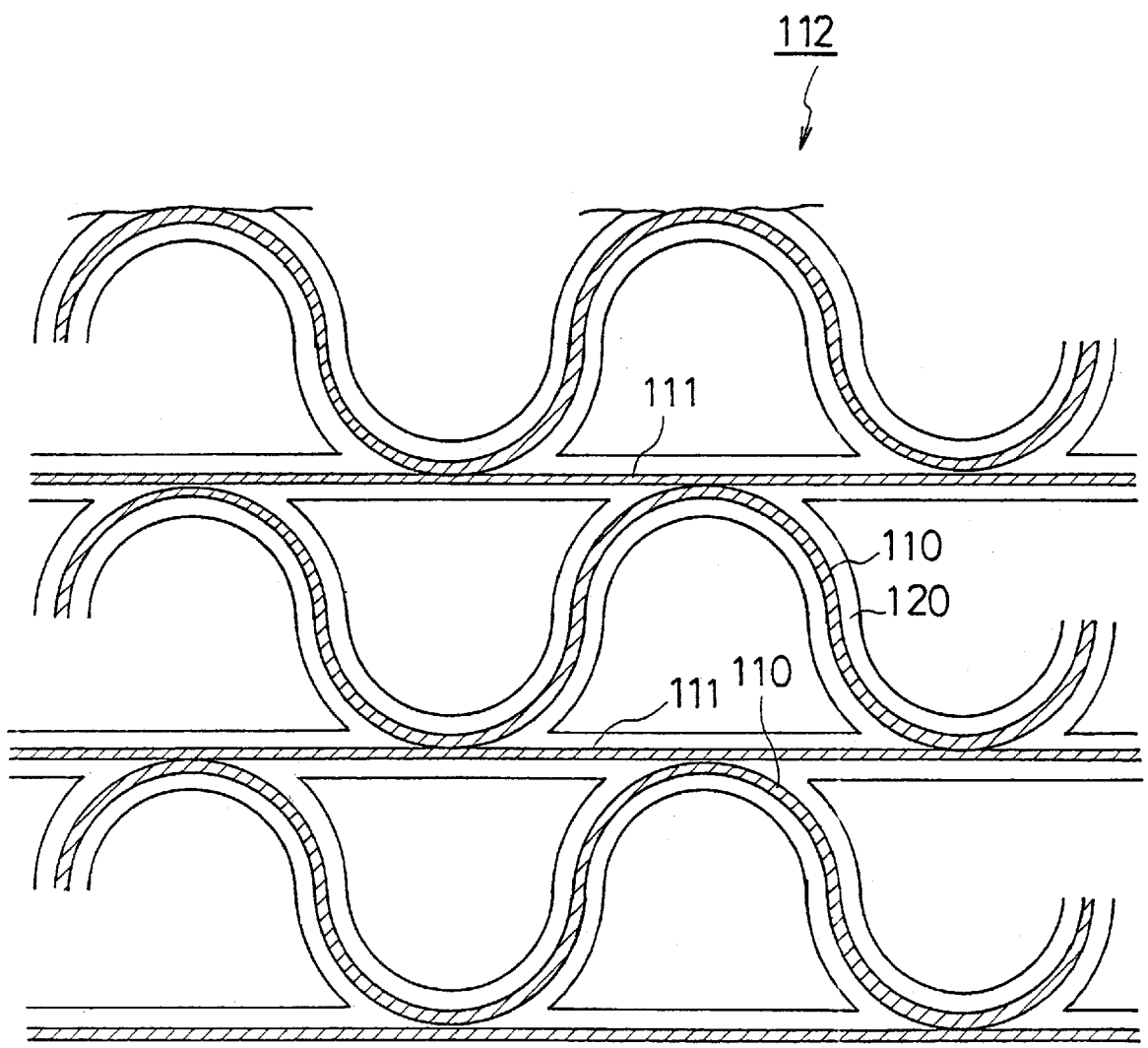
FIG. 7 is an enlarged cross sectional view of a filter on the surface of which an adsorption layer is formed.

An example of the method of manufacturing the filter 100 will be now explained in the following. The honeycomb structure is formed in the same way as previously described in the above. Removal of organic components from the honeycomb structure leaves a number of pores with a size of microns on the surface of the honeycomb structure, thereby the porous honeycomb structure being realized. These pore s are filled with the adsorbent and binder in the later process. In the next, this porous honeycomb structure 112 is immersed for several minutes in a suspension in which hydrophobic zeolite powder and an inorganic substance as a binder are dispersed, the inorganic substance being capable of adsorbing gaseous organic impurities and having an effective pore diameter larger than that of zeolite, for instance clay mineral, diatom earth, silica, alumina, mixture of silica and alumina, aluminum silicate, activated alumina, porous glass, etc. After this treatment, the honeycomb structure 112 is further treated by heat at 300° C. for about one hour. With this heat treatment, zeolite powder is firmly fixed to the entire surface of the honeycomb structure 112 using the inorganic substance (binder), and adsorption layers as shown in FIG. 7 are formed. In this way, the filter 100 is finished. The above suspension may include at least sodium silicate, silica sol, or alumina sol, as an adhesion assisting inorganic agent. These inorganic substances are used as the inorganic sol binder in the previous example. In the current example, however, they are used as the adhesion assisting agent for strengthening adhesion between zeolite powder and the above inorganic substance (binder), and also for reinforcing binding force with which zeolite powder and the above inorganic substance (binder) is fixed to the surface of the honeycomb structure 112 (including the inside surface of cells as elements of the honeycomb structure 112). The filter 100 formed in this way includes nothing inflammable, and gaseous organic impurity components included in the constituents of the filter 11 are completely driven out by the above-mentioned heat treatment. Therefore, the filter 100 can not be a gaseous organic impurity source by itself.

Another method for manufacturing the filter 100 will be described in the following. Up to the formation of the honeycomb structure 112, all the manufacturing steps are identical to those which are described in the above. Thus, the repetitive explanation thereabout will be omitted. This method is characterized in that granular zeolite pellets which are pelletized from the zeolite powder are fixed to the surface of the honeycomb structure 112 by using a proper adhesive. When forming zeolite pellets using the zeolite powder, this powder is mixed with an inorganic substance which can adsorb gaseous organic impurities, has an effective pore diameter larger than that of zeolite, and has the function as a binder for binding zeolite powder mutually. When suitable amount of water and inorganic adhesion assisting agent are added to the above mixture, there can be obtained a viscous and plastic product like a clay which is convenient for pelletization. The inorganic substance used as the binder and the inorganic adhesion assisting agent may be the same as used in the above-mentioned manufacturing method.

Still another method for manufacturing the filter 100 will be described in the following. Up to the formation of the honeycomb structure 112, all the manufacturing steps are identical to those which are described in the above. Thus, the repetitive explanation thereabout will be omitted. This method is also characterized in that granular zeolite pellets which are pelletized from a mixture of zeolite powder and an inorganic substance used as a binder are fixed to the surface of the honeycomb structure 112 with the use of a proper adhesive. In this method, the inorganic substance used as a binder is not always required 'to be capable of adsorbing gaseous organic impurities and to have an effective pore diameter larger than that of zeolite'. The very difference exists in the structure of the pellet surface. Namely, the pellet is coated with the inorganic substance capable of adsorbing gaseous organic impurities and having an effective pore diameter larger than that of zeolite.

Figure 8:
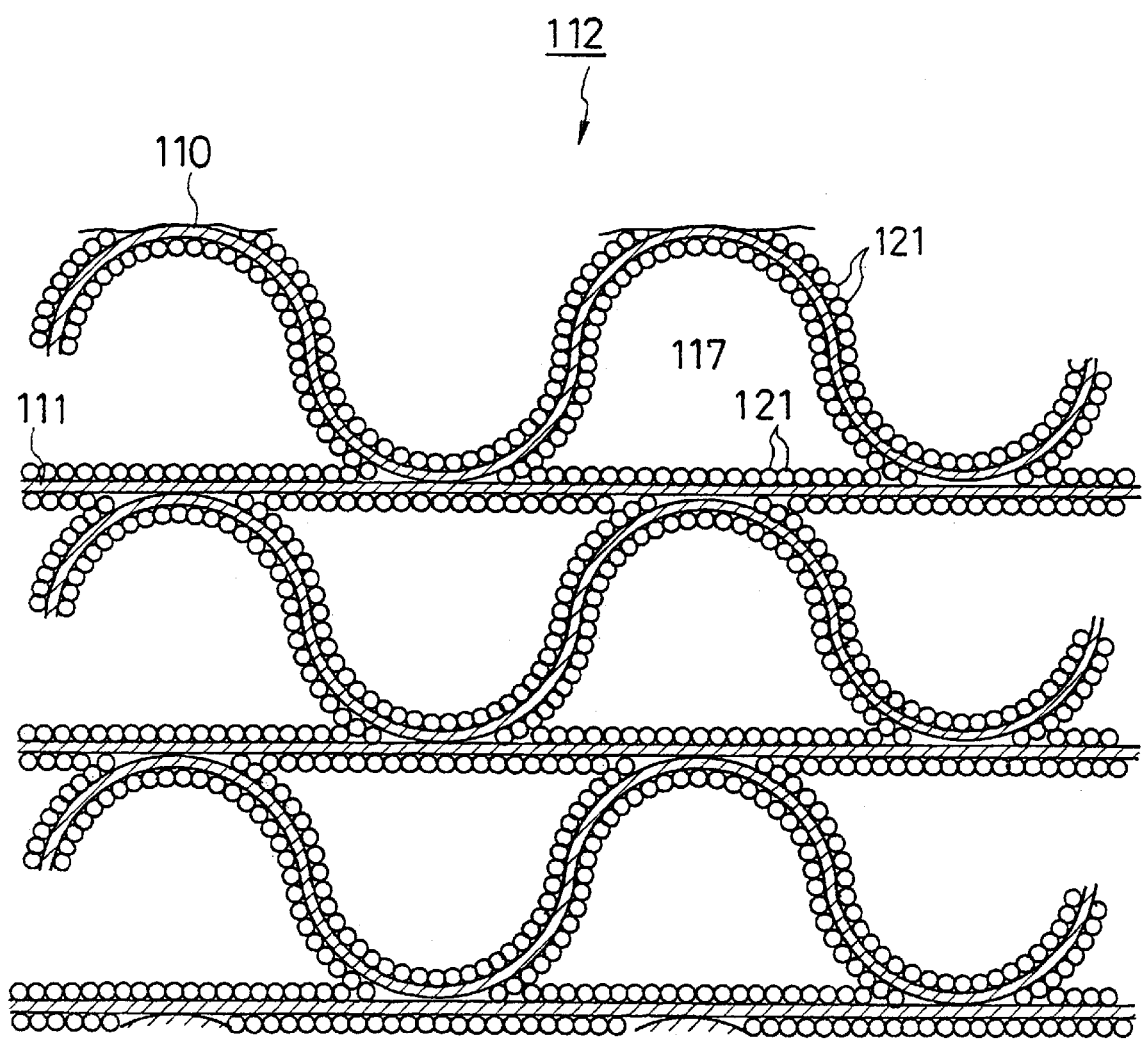
FIG. 8 is an enlarged cross sectional view of a filter to the surface of which pellets are secured.

FIG. 8 is an enlarged cross sectional view of a filter 100, in which the pellets 121 pelletized from zeolite powder according to the above-mentioned method are fixed, by means of a flame retardant adhesive, to the entire surfaces of the corrugated sheet 110 and the thin flat sheet 111 which form the honeycomb structure 112. This flame retardant adhesive is preferably a heat-resistive adhesive selected from a polyimide or polyamideimide group. The air to be cleaned passes through the space 117 having an approximately semicircular cross section. Then, the honeycomb structure 112 with pellets fixed to the surface thereof is treated by heat for 2 hours in an electric furnace kept at such a temperature as 100° C. which is lower than the allowable maximum temperature of the adhesive, thereby thoroughly driving out gaseous organic impurity components contained in the adhesive. The filter 100 is finished in this way.

As mentioned in the above, since the filter 100 includes nothing inflammable as its constituents, if it is installed in the ceiling portion of the clean room, safety from the standpoint of disaster prevention can be remarkably enhanced comparing to the case of using the prior art chemical filter relying on the inflammable activated charcoal. The cross sectional shape of the individual air path formed in the honeycomb structure is not limited to the semicircular shape. It may be designed to have an arbitrary shape.

There is a possibility that various gaseous organic impurities may be generated in various working space in which the manufacture of products requiring high precision such as LSI's, LCD's, etc. are carried out, for instance a clean room, a clean bench, a clean chamber, various storage compartments for storing products requiring cleanliness, and other devices locally securing a clean space called as a mini-environment. However, it is generally considered that most of gaseous organic impurities acting as contaminants to the substrate of LSI, LCD, etc. might be high-molecular organic compounds having a high boiling point, for instance organic siloxane generated from some sealants used in the clean room, phosphoric ester from a flame retardant contained in some building materials, phthalate from a plasticizer contained in some building materials, HMDS from an agent facilitating close adhesion of the photoresist, BHT from an antioxidant contained in cassettes. Zeolite, especially synthetic zeolite called as a molecular sieve has a uniform effective pore diameter, but it can not adsorb gaseous molecules larger than that effective pore diameter. For instance, zeolite having an effective pore diameter of 8 angstroms can adsorb DOP and DBP of which the molecular size is smaller than 8 angstroms while it can not adsorb BHT and siloxane of which the molecular size is larger than 8 angstroms. However, the filter 100 according to the second embodiment of the invention can adsorb BHT and siloxane which are not adsorbed by zeolite, utilizing the adsorption function of the inorganic substance mixed with zeolite as a binder.

Zeolite crystals do not form a lump-shape by themselves, they need the help of a binder when they are pelletized and fixed to the surface of the honeycomb structure 112 in the form of a layer. So far, a clay mineral such as talc, kaolin mineral, bentonite, etc. have been used as such a binder. The total volume per unit weight (g) of these conventional binders of which the pore diameters distribute in the range of 15 through 300 angstroms, is 0.07 cc/g, 0.06 cc/g, and 0.03 cc/g, respectively, and the specific surface per unit weight of the same is no more than 28 $m^2/g$, 21 $m^2/g$, and 23 $m^2/g$, respectively.

Because of having regarded the air or gas permeability of these binders important so far, these binders have been applied to the base filter media such that they keep a vent aperture of 500 angstroms or more between binder particles adjacent to each other or between the zeolite particle and the binder particle. In other words, vent apertures created by the application of the conventional binder are macro-apertures, which might give an excellent gas permeability but give less physical adsorption. The particle surface of talc, kaolin mineral, and bentonite having been used as a binder so far, includes not so many pores facilitating the physical adsorption of the gaseous organic impurities. Application of the conventional binder like this is based on the way of thinking that the binder should fill the role of mechanically securing zeolite powder on the supporter (i.e. base filter media), and that the amount of zeolite powder supported by the supporter is to be preferably made as large as possible while the ratio of the binder to the zeolite powder is to be preferably made as small as possible. In other words, the conventional binder is just requested to support the zeolite powder on the supporter surface and also to provide excellent vent for introducing the object gas to be removed to the surface of the zeolite powder affixed on the supporter surface. Consequently, the binder has been less required to have adsorption ability.

Figure 9:
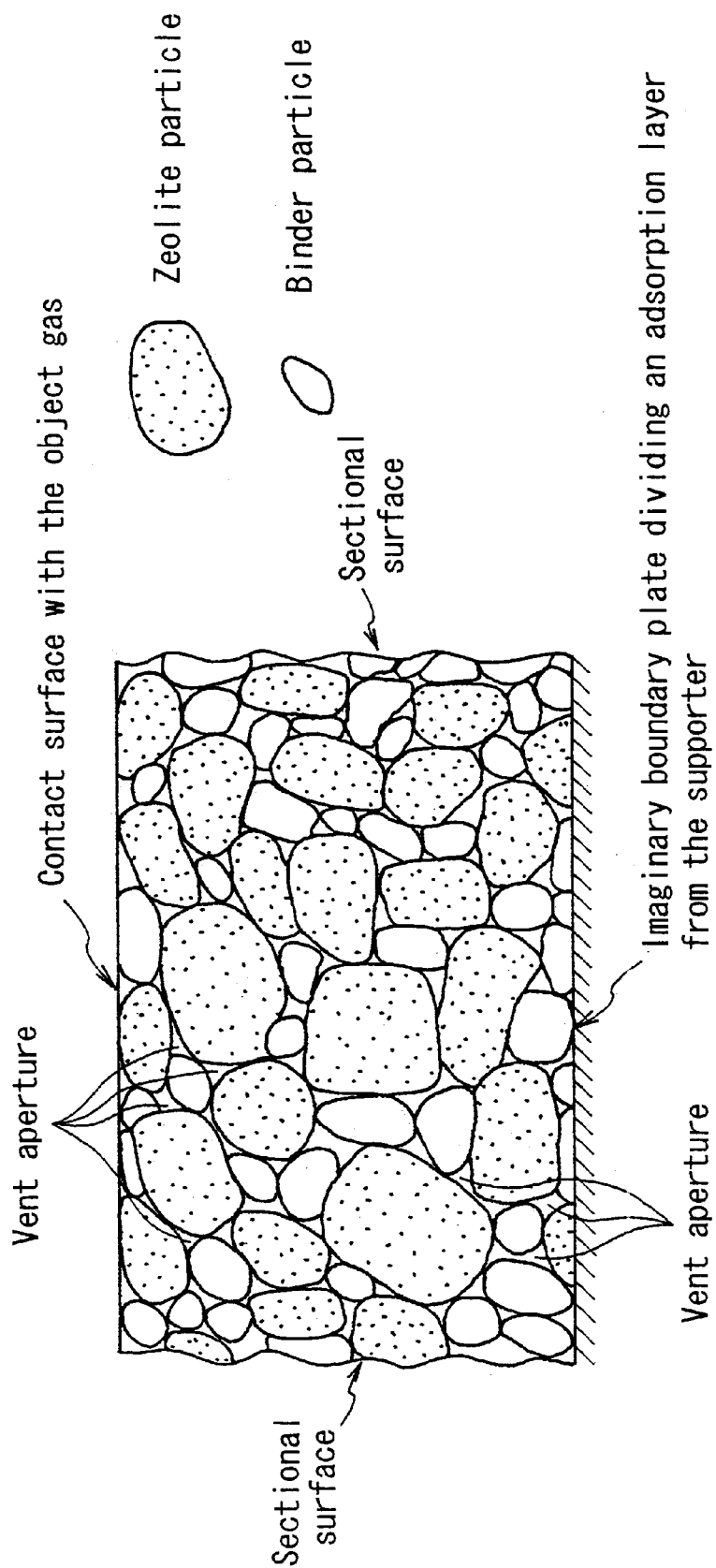
FIG. 9 is an enlarged cross sectional view of an adsorption layer according to the invention.

In contrast with this, in case of the binder employed in the filter 100 according to the invention, although it may form similar vent apertures to that which the conventional binder forms between binder particles adjacent to each other or between the zeolite particle and the binder particle, the binder particles used in the invention include fine pores facilitating the physical adsorption on their own surfaces, for instance pores having a diameter of less than 20 angstroms, and meso-pores having a diameter between 20 and 500 angstroms. Therefore, the surface of the binder itself makes it possible to adsorb BHT and siloxane which can not be adsorbed by zeolite. Furthermore, since the excellent gas permeability is still secured, the objective gas can easily reach the powder surface of the zeolite. Consequently, the selective adsorption characteristic of the zeolite powder can be maintained as usual, i.e. not adsorbing molecules larger than its effective pore diameter but excellently adsorbing those which are smaller than its effective pore diameter. It can be said that the power of physically adsorbing gaseous molecules is lined up in the order of pore, meso-pore, and macro-pore, and that the macro-pore almost does nothing as to the physical adsorption. FIG. 9 is an enlarged cross sectional view of an adsorption layer which is formed by fixing the zeolite powder on the surface of the supporter with the help of the inorganic binder in the form of a particle. The object gas to be removed enters from the surface of the adsorption layer (contact surface with the objective gas), further enters inside the adsorption layer creeping in the vent apertures created between zeolite particles and binder particles, and then flows out from the adsorption layer. In this way, the objective gas will repeatedly impinge on microscopic particles of zeolite and the binder as well, thereby being adsorbed in those pores existing on the surfaces of respective particles.

Figure 10A:
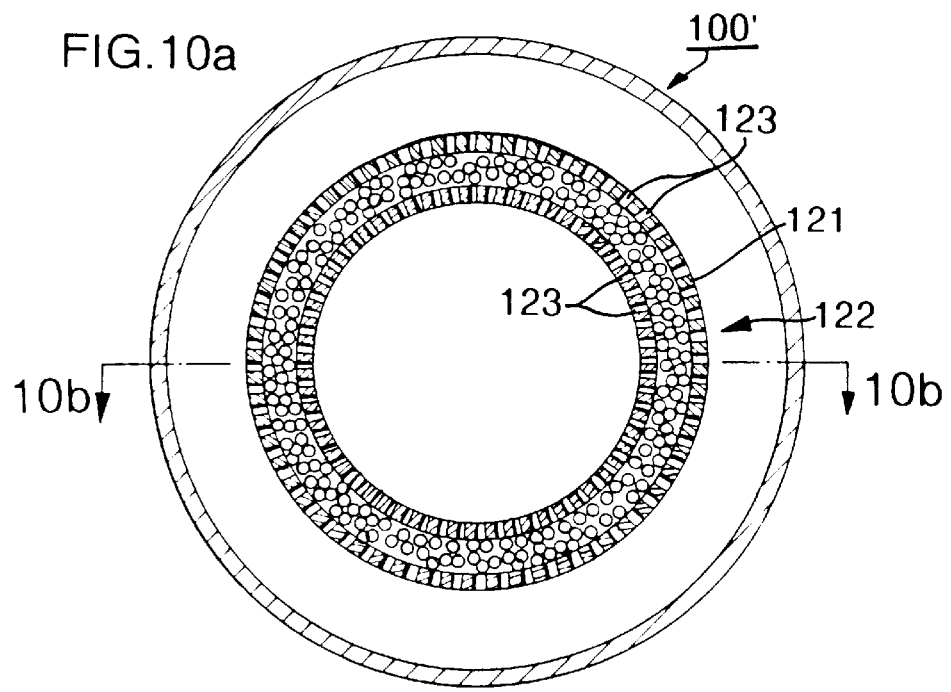
FIGS. 10(a) and 10(b) are schematic exploded cross sectional views of the other filter according to the second embodiment of the invention.
Figure 10B:
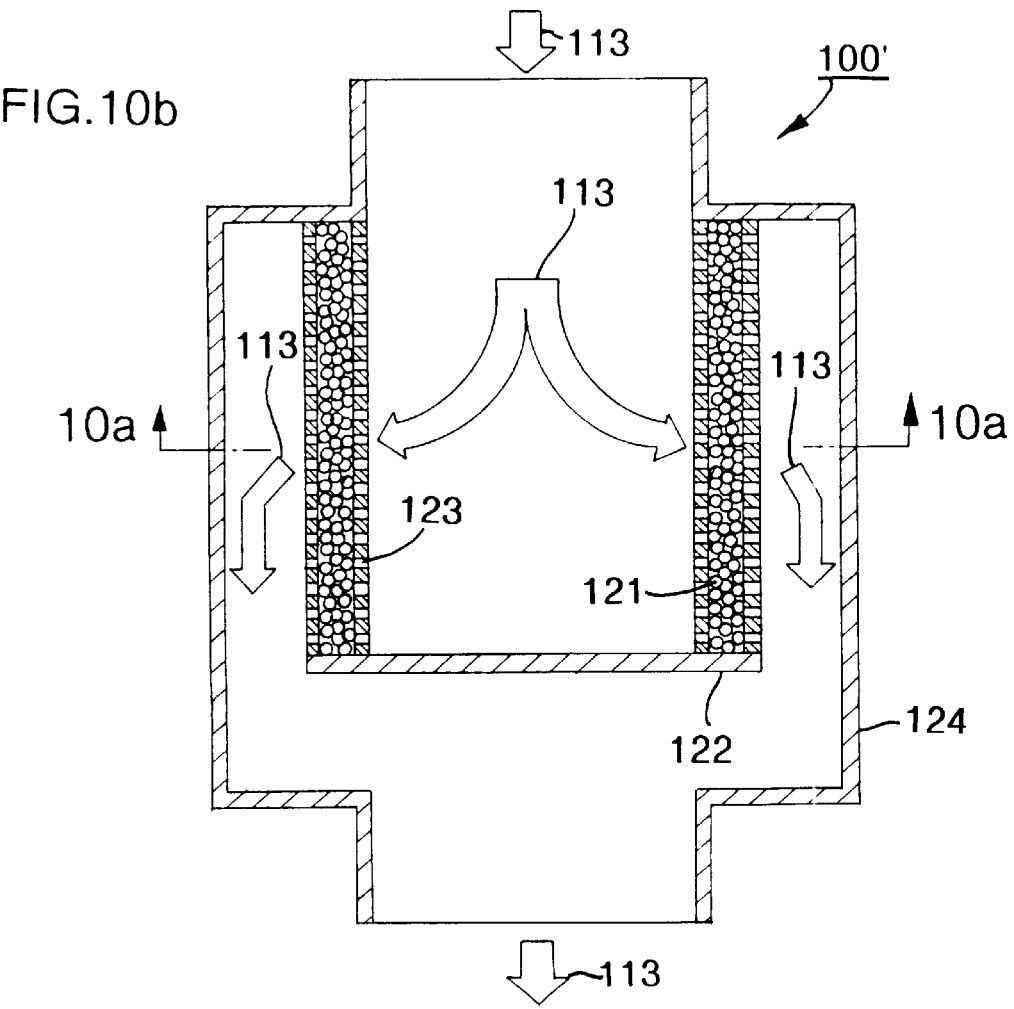

Accordingly, the object of the invention can be achieved by providing the filter 100 having the adsorption layer 120 which is formed by fixing the zeolite powder to the surface of the honeycomb structure 112 with the help of an inorganic substance as a binder having pores on its surface, the size of this pore being larger than the effective pore diameter of zeolite and mainly falling in the range defined as so-called meso- or micropore. In the similar way, the filter 100 may be formed by fixing zeolite pellets 121, which are pelletized from the zeolite powder with the help of the above inorganic substance as a binder, to the surface of the honeycomb structure 112. Furthermore, as will be seen from FIGS. 10(a) and 10(b) showing two cross sectional views taken on lines A—A and B—B, respectively, the object of the invention can be achieved by a filter 100' which is formed as follows. At first, there is prepared a doubled cylindrical casing 122 surrounded by an outermost casing 124 and the doubled cylindrical casing further including an inside cylindrical casing of which the double walls are provided with a number of vent openings 123. Pellets 121 are formed by pelletizing zeolite powder with the help of an inorganic substance as a binder. This inorganic substance has pores on its surface, the size of the pore being larger than the effective pore diameter of zeolite and mainly falling in the range defined as a so-called meso-pore or pore. The space between the double walls is filled up with the pellets 121, thereby forming a pellet filled cylindrical adsorption layer. The object air to be cleaned first flows in the inside of the doubled cylinder case 122 and then flows out through the space between the doubled cylinder casing 122 and the outermost casing 124 after passing through the pellet filled cylindrical adsorption layer, following the arrows 113 as shown.

Accordingly, the filter 100 is formed by fixing an adsorbent to the surface of the honeycomb structure 112, the adsorbent being in the form of the mixture of synthetic zeolite powder of which the particle size is several microns and the effective pore diameter is 8 angstroms, and a binder which is acid-treated montmorillonite (activated clay) having a size of several microns, or in the form of pellets which are made by pelletizing the above mixture. Furthermore, the filter 100' is formed by filling up its casing with the adsorbent in the form of pellets as mentioned above. Montmorillonite is a clay mineral having a chemical composition described as $Al_4Si_8(OH)_4 \cdot nH_2O$ and its name comes from a place name 'Montmorillon' in France, which produces this chemical substance. When montmorillonite is treated by acid, the pore volume and specific surface of montmorillonite having the pore diameters of 15 to 300 angstroms becomes 0.37 cc/g and about 300 m²/g, respectively. The pore volume of the pore diameter 40 to 600 angstroms comes to occupy 22% of the total pore volume. Therefore, if the acid-treated montmorillonite (activated clay) is used as a binder for the synthetic zeolite having the effective pore diameter of 8 angstroms, the pore of this binder can physically adsorb BHT and siloxane which have a molecular size larger than 8 angstroms and can not be adsorbed by zeolite.

In case of talc, kaolin mineral, and bentonite having been used as a binder so far, the macro-pore thereof has a large volume, but the micro- and meso-pore have a small inner surface and volume are so small that their physical adsorption power is small, naturally. On one hand, sepiolite which is a kind of fabric porous clay mineral includes the pore of 10 angstroms and the meso-pore of 200 angstroms, and their inner surface and volume are large, so that their physical adsorption power naturally becomes large. Acid-treated montmorillonite, synthetic stevensite, synthetic amesite, synthetic fraipontite, a complex of fine silica particles and micro-crystals of aluminosilicate such as synthetic fraipontite, etc. has a large physical adsorption power like sepiolite. These porous clay minerals have the pore volume and specific surface of more than 0.2 cc/g and 100 m²/g, respectively, in their pore diameter range of 15 to 300 angstroms. Fabric porous clay minerals such as sepiolite and palygorskite, acid-treated montmorillonite (activated clay), various porous synthetic clays, etc. are preferably employed as the second adsorption layer according to the invention, which will be described later.

DOP and DBP are the majority of organic contaminants which are detected on the substrate surface of LSI and LCD handled in the clean room. These are much contained in the material made of vinyl chloride and have a molecular diameter in the range of 6 to 8 angstroms. Accordingly, if there is selected and used zeolite which has a pore diameter larger than 7 angstroms, it can remove DOP and DBP which are the majority of substrate surface contaminants among the gaseous organic substances. On one hand, gaseous organic impurities having an molecular diameter larger than the effective pore diameter of the zeolite, can be removed by using an inorganic substance as a binder for zeolite, the inorganic substance having an effective pore diameter larger than that of the zeolite.

Strong adsorption power which a zeolite crystal shows to the moisture and polarized substances, depends on the static electricity of cation corresponding to the number of aluminum atoms in the skeleton texture of zeolite. If a weight ratio between silica and alumina contained in the zeolite crystal ($SiO_2/Al_2O_3$) increases, the number of cations is decreased, thereby the crystal becoming more hydrophobic. Up to the stage where the ratio $SiO_2/Al_2O_3$ is 2 through 5, the crystal shows a hydrophilic nature. If the weight ratio $SiO_2/Al_2O_3$ is around 20 or exceeds this value, the hydrophilic nature of the zeolite disappears and the hydrophobic nature dominantly comes out.

Figure 11:
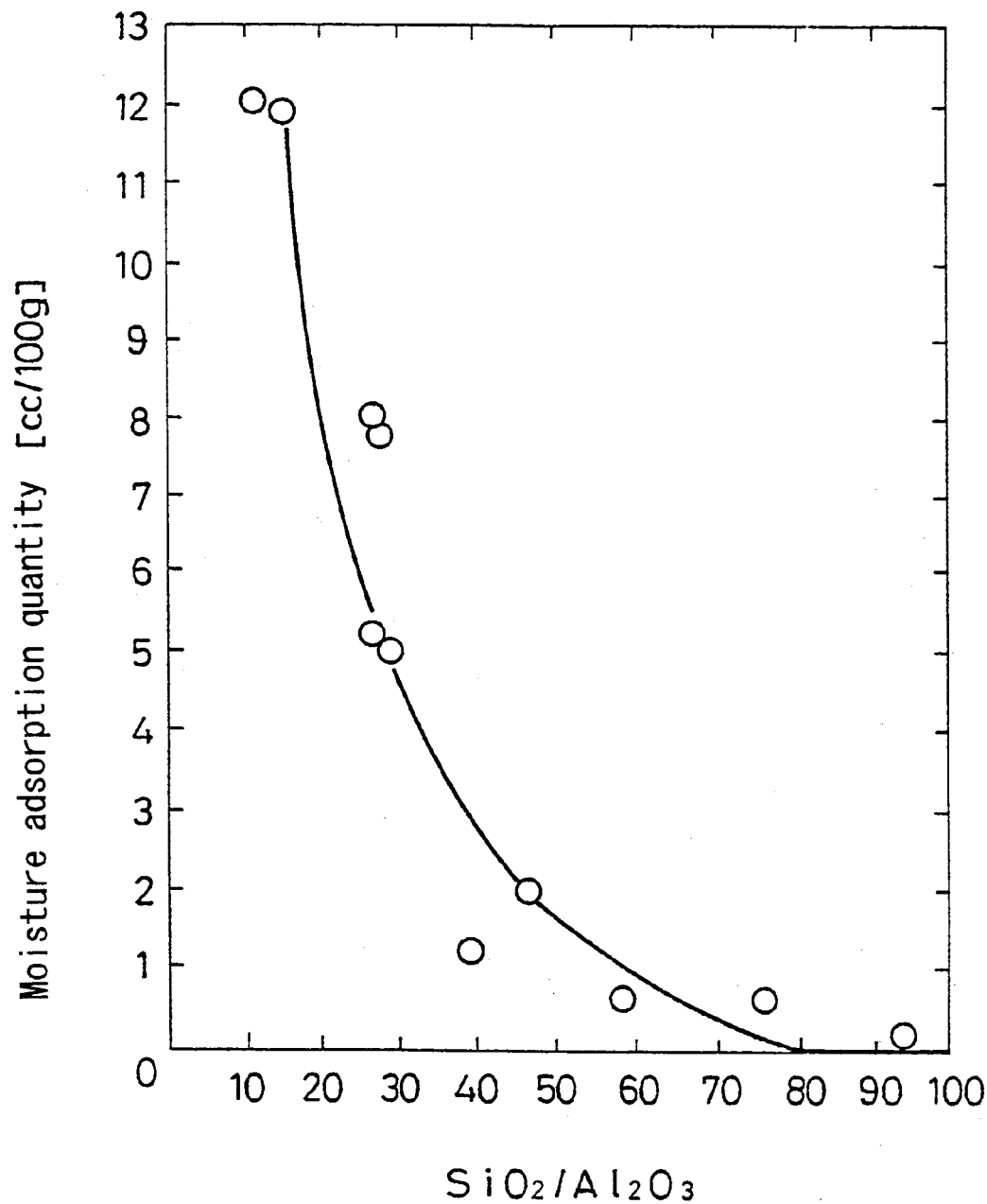
FIG. 11 is a graph showing a relation between the weight ratio of silica/alumina (SiO$_2$/Al$_2$O$_3$) and moisture adsorption quantity per zeolite of 100 g (25° C., relative humidity 50%)
Figure 12:
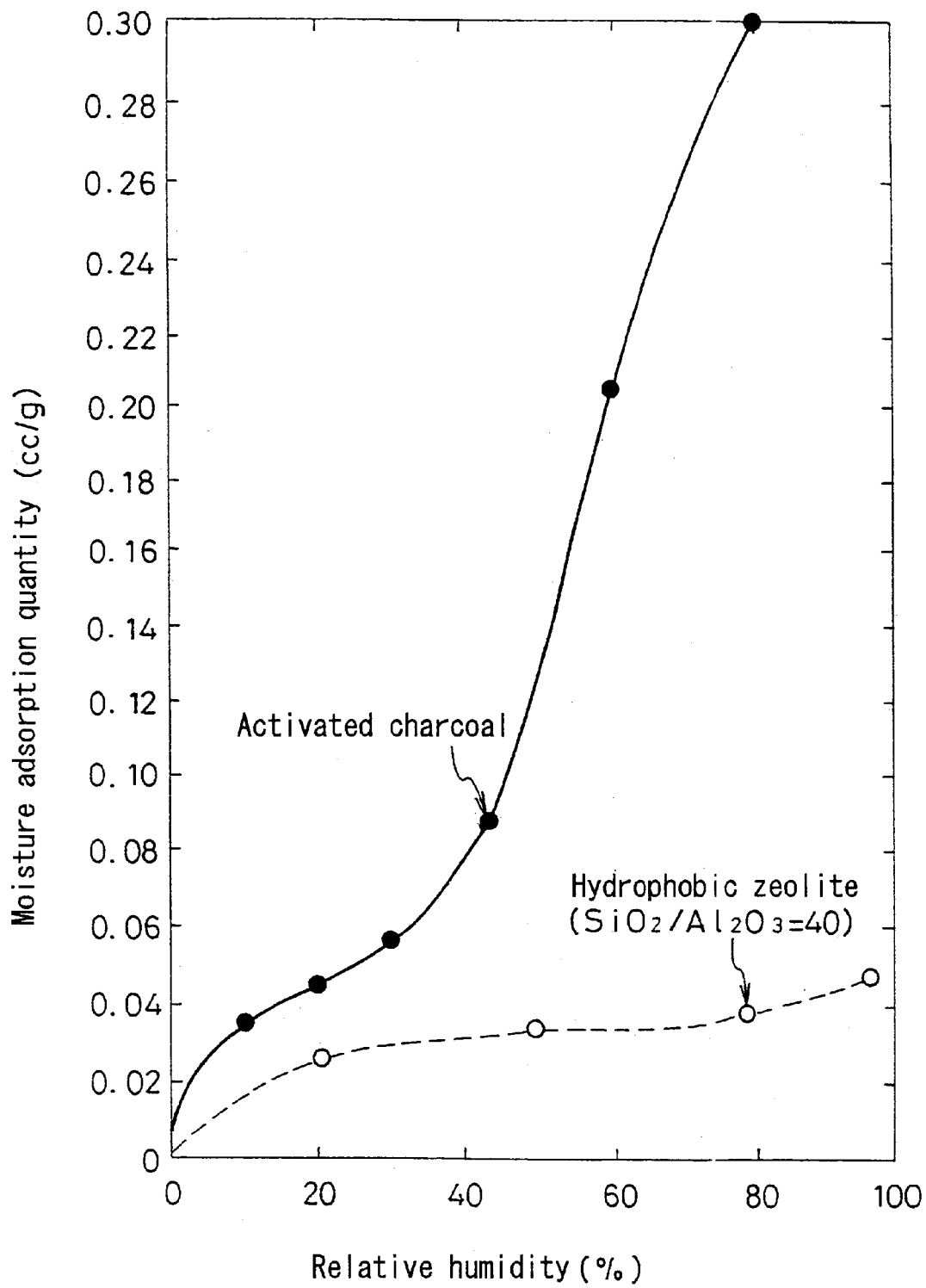
FIG. 12 is a graph showing moisture adsorption isotherms by hydrophobic zeolite and activated charcoal at 25° C.

FIG. 11 is a graph showing the relation between the weight ratio of $SiO_2/Al_2O_3$ and the moisture adsorption quantity per zeolite of 100 g (cc/100 g). When a value of $SiO_2/Al_2O_3$ in the range of more than 20, the moisture adsorption quantity is decreased and no moisture adsorption occurs when the value of $SiO_2/Al_2O_3$ becomes more than 80. FIG. 12 shows a moisture adsorption isotherm of hydrophobic zeolite when $SiO_2/Al_2O_3$ is 40 and it also shows, for comparison, the same of the activated charcoal made of coconut husk. At the relative humidity of 50%, the moisture adsorption quantity by the activated charcoal is 0.11 cc/g while the same by zeolite is 0.03 cc/g. When zeolite adsorbs moisture, the adsorption capacity of gaseous organic substances by zeolite is reduced corresponding to the moisture volume adsorbed thereby, comparing to the case of adsorbing no moisture. In other words, the effective time zeolite can maintain its adsorption ability, i.e. the life time of zeolite as an adsorbent is shortened corresponding to the moisture volume adsorbed thereby. Consequently, zeolite is preferably hydrophobic in order to remove gaseous organic impurities flying about in the clean room, of which the relative humidity is ordinarily kept at 30% to 60%.

On one hand, it may be possible to use hydrophilic zeolite. Silicon wafer handled in the clean room or the like is more or less oxidized naturally and carries a natural silicon dioxide film on its surface, so that the silicon wafer surface becomes hydrophilic. Also, it is known well that the glass substrate handled in the similar working space is hydrophilic due to the physical properties of glass itself. Such organic impurities that exist in the clean room air and contaminate the hydrophilic surface of the silicon wafer covered by the natural silicon dioxide film and the glass substrate, have a hydrophilic group which has a good affinity for the hydrophilic surface. In short, previously described organic surface contaminants are high molecular hydrophobic organic substances which have a high boiling point and a chemical structure like a double-bonded carbon and a benzene ring, thus having a hydrophobic group as a matter of course. However, these organic substances also have a hydrophilic group causing the surface contamination. As described above, since the electronic material like the silicon wafer is hydrophilic and organic substances to be adsorbed have also a hydrophilic group, it becomes possible to use hydrophilic zeolite.

The silica/alumina ratio of hydrophilic zeolite is 2 to 5 while the same of hydrophobic zeolite is 20 or more. The life time of hydrophobic zeolite as the adsorbent for organic substances is longer than hydrophilic zeolite. However, since hydrophobic zeolite is produced by treating hydrophilic zeolite with acid to remove aluminum component and then drying it by heat, the former becomes more expensive than the latter. Cost-down of hydrophilic zeolite can be achieved relatively with ease by mass production thereof, but the same of hydrophobic is not so easy.

The filter according to the invention as shown in FIG. 8 can be manufactured as follows. Up to the formation of the honeycomb structure, all the manufacturing steps are identical to those which are described previously. Thus, the repetitive explanation thereabout will be omitted. At first, zeolite pellets are prepared by using zeolite powder and an inorganic substance as a binder. This inorganic substance is selected from inorganic substances which can adsorb gaseous organic impurities and have an effective pore diameter larger than that of zeolite. The effective pore diameter preferably falls in the range of meso-pore diameter or pore diameter as defined previously. City water is added to and mixed with zeolite powder and the binder i.e. the above selected inorganic substance, thereby forming a clayish mixture. This clayish mixture is processed with the help of a pelletizing machine to produce pellets having a diameter of 0.3 to 0.8 mm. The pellets are then blown against the supporter with high speed air jet. In this case, the surface of the supporter is treated in advance by an inorganic flame retardant adhesive. It is not always needed that the supporter is in the form of the honeycomb structure. It may have such a three-dimensional mesh structure as a rock wool. This mesh structure may show a high resistance against the objective air to be cleaned flowing therethrough, but it may give the object air more opportunities to get in contact with adsorbents than the honeycomb structure.

Figure 13:
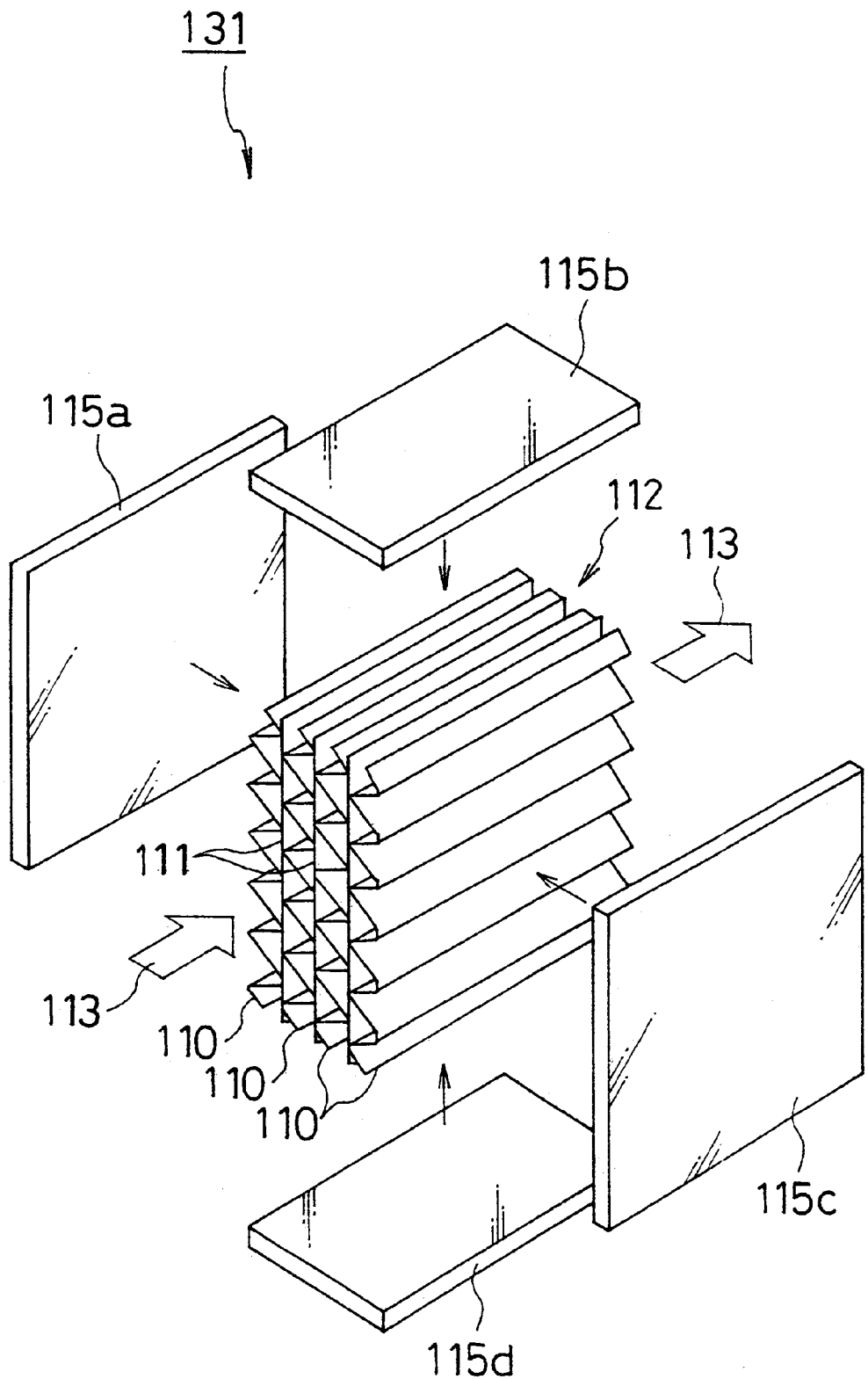
FIG. 13 is an exploded view of a filter according to the other embodiment of the invention.

FIG. 13 is an exploded view of another filter 131 according to the second embodiment of the invention. In this filter 131, since its honeycomb structure 112 is identical to that of the filter 100 shown in FIG. 6, like components in both figures are designated like reference numerals and the detailed description thereof will not be repeated here.

Figure 14:
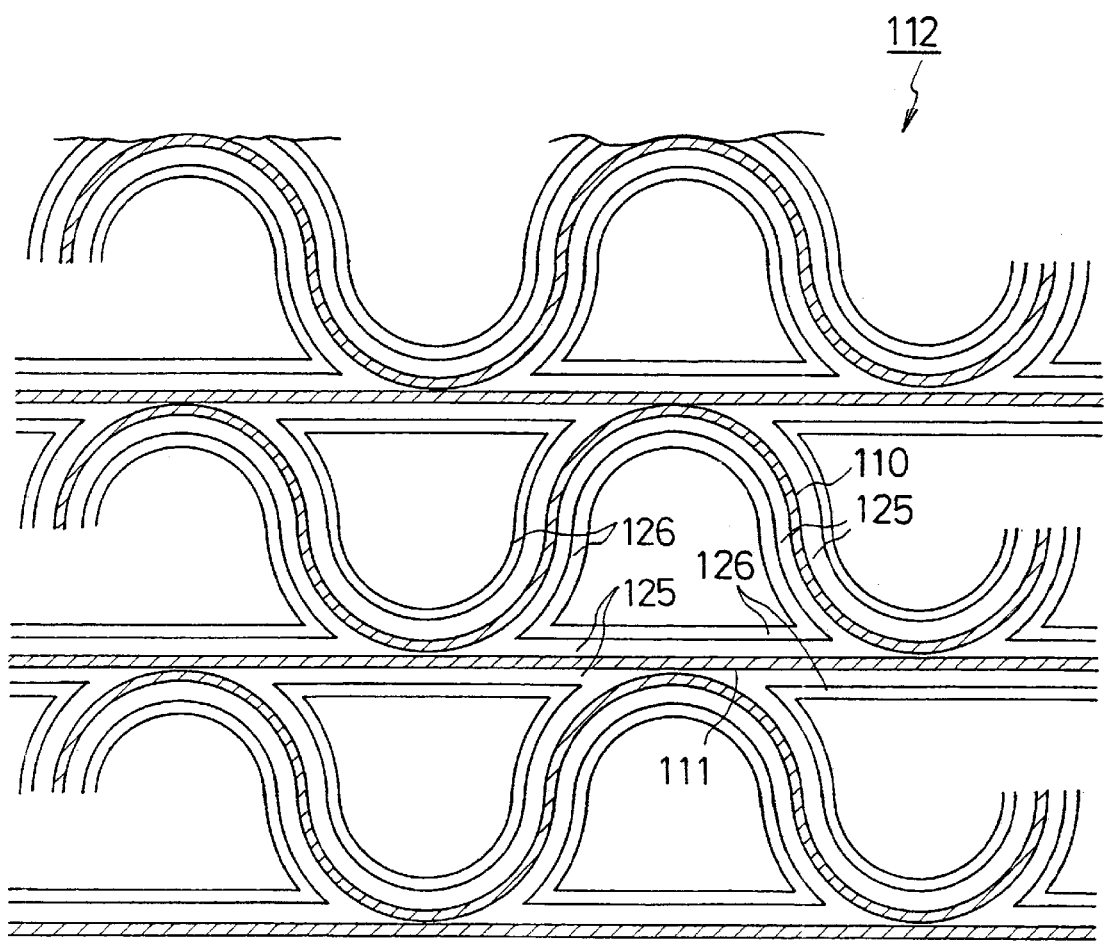
FIG. 14 is an enlarged cross sectional view of a filter, on the surface of which first and second adsorption layers are formed.
Figure 15:
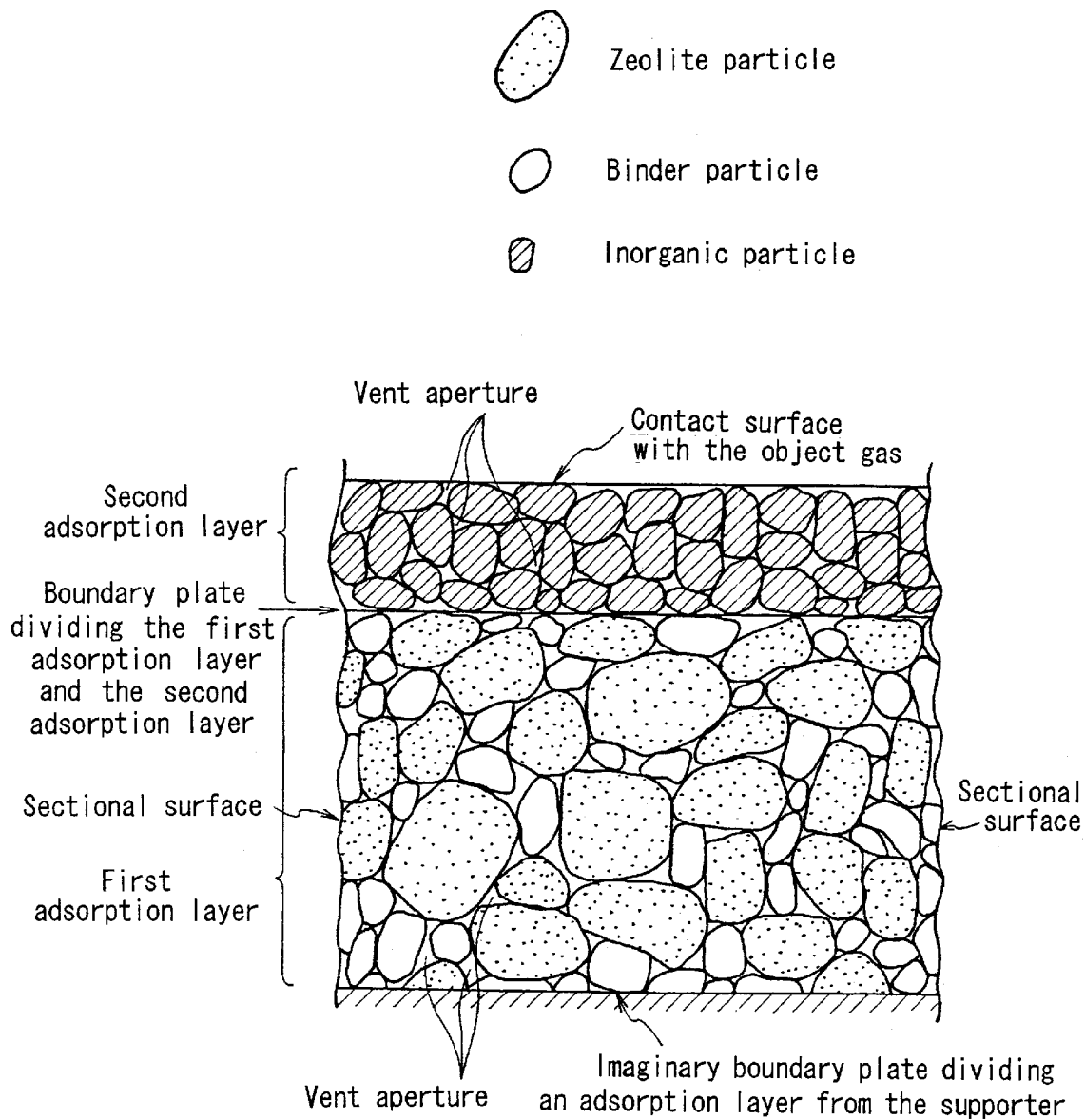
FIG. 15 is an enlarged cross sectional view of a complex adsorption layer consisting of first and second adsorption layers.

As shown in FIG. 14, in this filter 131, the first adsorption layer 125 is formed by fixing zeolite to the surface of the honeycomb structure 112 which is formed by alternately stacked up corrugated sheet 110 and thin flat sheet 111, using a binder made of an inorganic substance which is capable of adsorbing gaseous organic impurities and have an effective pore diameter larger than that of zeolite. Furthermore, the second adsorption layer 126 is formed by fixing the same inorganic substance to the first adsorption layer 125 so as to overlie on the first adsorption layer. The external shape and dimension of the filter 131 may be arbitrarily designed taking account of the space in which it is installed. However, the inorganic substance used as the binder for forming the first adsorption layer 125 is different from that which is used for forming the second adsorption layer 126, and it is not always required to have the ability to adsorb gaseous organic impurities. Furthermore, the effective pore diameter of the inorganic substance used as the binder for forming the first adsorption layer 125 may be smaller than that of zeolite. For instance, there may be used clay minerals such as talc, kaolin mineral, and bentonite which have been used as a binder so far and include few pores facilitating the physical adsorption of the gaseous organic impurities. Also, there may be used an inorganic adhesion assisting agent such as sodium silicate, silica sol, and alumina sol. FIG. 15 is an enlarged cross sectional view of a complex adsorption layer consisting of first and second adsorption layers.

An example of the method of forming the filter 131 will be explained in the following. At first, the porous honeycomb structure is manufactured. Up to the steps before forming the adsorption layers, the same method as described in the above is applicable, so that the description thereabout is omitted. In the next, the honeycomb structure 112 is immersed for a several minutes in a suspension in which zeolite powder and the powder of the clay mineral such as talc, kaolin mineral, and bentonite which have been used as a binder so far, and then, the honeycomb structure 112 is further treated by heat at 300° C. for about 1 hour, thereby forming the first adsorption layer. After this, the honeycomb structure 112 provided with the first adsorption layer is immersed for a several minutes in a suspension in which there is dispersed the fine powder of an inorganic substance which has an effective pore diameter larger than zeolite and is capable of adsorbing gaseous organic impurities, the inorganic substance being for instance a porous clay mineral, diatom earth, silica, alumina, a mixture of silica and alumina, aluminum silicate, activated alumina, porous glass, etc. Then, the honeycomb structure 112 is further treated by heat at 300° C. for about 1 hour, thereby forming the second adsorption layer. As porous clay minerals described above, there are available hydrated magnesium silicate clay mineral such as sepiolite and palygorskite, activated clay, acid clay, activated bentonite, a complex of micro-crystal of aluminosilicate and microscopic particles of silica, etc. In the way as described above, there is achieved the honeycomb structure 112 having the first adsorption layer 125 coated with the second adsorption layer 126. The inorganic substance used for forming the first and second adsorption layers 125, 126 may include at least one inorganic adhesion assisting agent such as sodium silicate, silica sol, and alumina sol. The inorganic adhesion assisting agent plays a role in assisting firm adhesion of zeolite powder and the inorganic binder which are forming the first adsorption layer 125, to the pore s of the honeycomb structure 112, and also assisting firm adhesion of the inorganic substance forming the second adsorption layer 126, to the first adsorption layer 125. The honeycomb structure 112 obtained in this way has nothing inflammable, and gaseous organic impurity components are completely driven out when the honeycomb structure 112 is treated by heat. Therefore, the honeycomb structure 112 can not be a source of gaseous organic impurities by itself. The filter frame 115 as shown in FIG. 13 is preferably made of a material such as aluminum, which neither generates gaseous organic substance, nor includes inflammable materials. Furthermore, the adhesive for fixing the honeycomb structure 112 to its external frame, or the sealant for sealing the gap between the external frame and the honeycomb structure is to be preferably selected from materials which neither generates gaseous organic substance, nor includes inflammable components. Also, it may be possible that the entire filter 131 assembled by fitting the honeycomb structure 112 to its frame 115, is treated by heat, thereby driving out gaseous organic impurities which might still exist in the fire retardant adhesive or sealant used in assembly process of the filter 131. In this way, the filter 131 can be finished with materials which neither generate gaseous organic substances, nor include inflammable matter.

It should be noted that, in this invention, the structure of the supporter to which the adsorbent such as zeolite is fixed, is not limited to the honeycomb structure 112 as previously described in connection with FIGS. 6 and 13. In the example shown in FIG. 13, the air to be cleaned is made to flow in the direction (arrow 113) in parallel with contact lines made between the thin flat sheet and the corrugated sheet. However, it may be possible for these contact lines to be formed such that they have a certain angle with respect to the air flow direction. Furthermore, it is not always needed for such contact lines to be parallel. It may be possible for adjacent corrugated sheet to be stacked up via a thin flat sheet such that the contact lines made between the thin flat sheet and one corrugated sheet (e.g. upper or lower to the flat sheet) are made to intersect those which are made between the same thin flat sheet and the other corrugated sheet (e.g lower or upper one to the same). Actually, however, in the corrugated sheet arrangement like this, the wave form of the adjacent corrugated sheet can not be in phase, so that it becomes possible to eliminate such a thin flat sheet that has been prepared for preventing corrugated sheet from being closely stacked up in phase. It will be understood that the supporter can be formed in a variety of shapes. Of course, despite the variation of supporter structure, the adsorbent such as zeolite can be fixed to any supporter in the same method as previously described according to the invention.

Next, there will be described a method for manufacturing another filter according to the invention, in which there will be used a supporter having the three-dimensional mesh structure such as rock wool or ceramic made supporter which is manufactured by the method as previously described. In this example, pelletized zeolite is fixed to the supporter surface by means of a proper adhesive. Zeolite pellets are made of a mixture of zeolite powder and an inorganic substance as a binder. Then, these zeolite pellets are coated with an inorganic substance which is capable of adsorbing gaseous organic impurities and has an effective pore diameter larger than that of zeolite. Coated zeolite pellets are formed by immersing zeolite pellets in the suspension in which the inorganic substance for coating use is dispersed, and then dried under the proper condition. In this case, in order to increase the mechanical strength of the coated layer, it may be possible to add an inorganic colloidal solution as an inorganic adhesion assisting agent to the above suspension, thereby having the coated inorganic substance contain the inorganic adhesion assisting agent. The sort of the inorganic substance and the inorganic adhesion assisting agent which are coated is the same as mentioned in the above.

The above filter according to the invention can be realized by blowing the pellets against the three-dimensional mesh structure with high speed air jet. In this case, this three-dimensional mesh structure is impregnated in advance with a proper inorganic adhesive.

Figure 16:
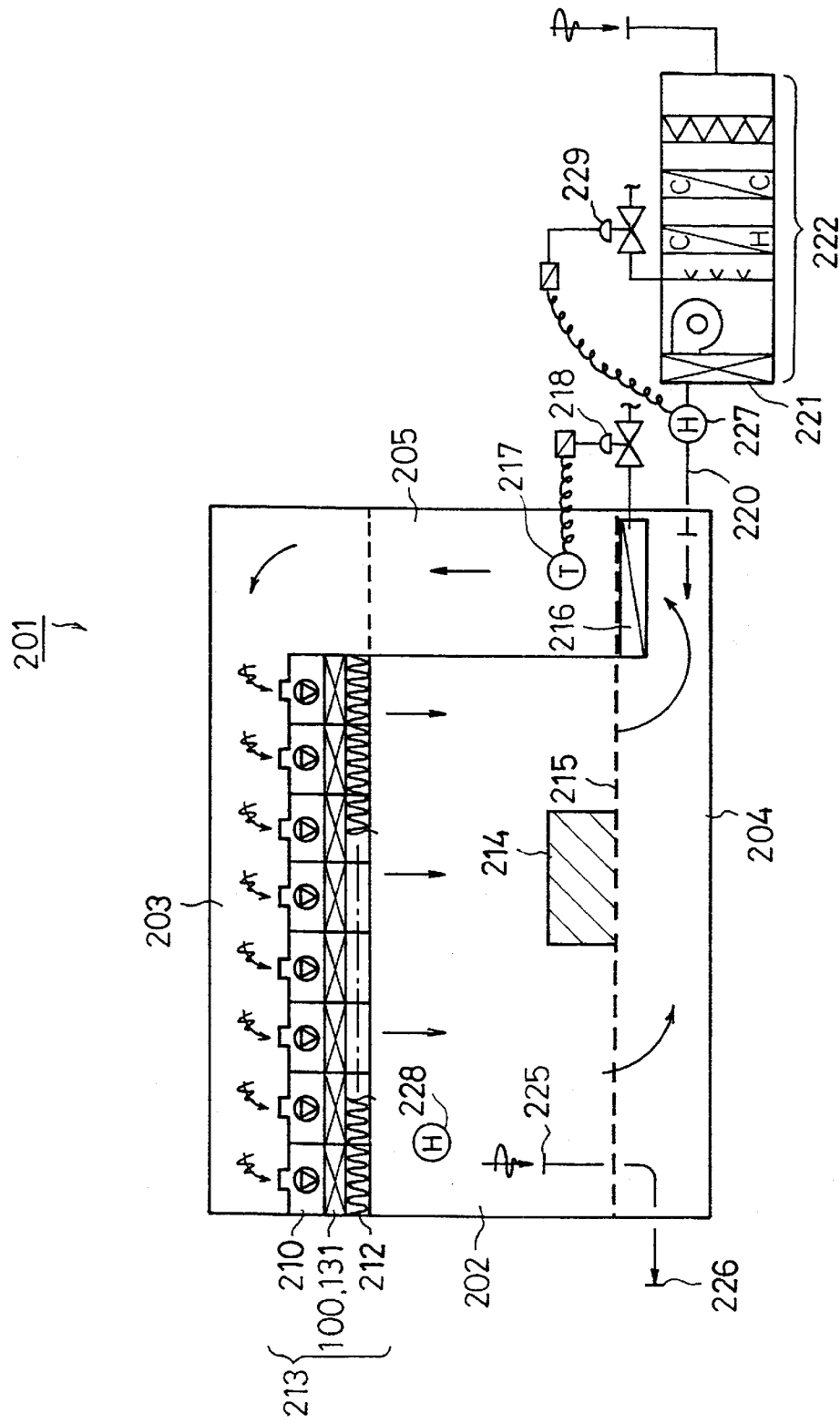
FIG. 16 is a schematic illustration for explaining the constitution of an air cleaning system according to the second embodiment of the invention.

FIG. 16 is a schematic illustration for explaining the constitution of another clean room 201 according to the second embodiment of the invention. The clean room 201 has a constitution basically similar to that which has been previously described in connection with FIG. 1. Namely, it includes a working space 202 for manufacturing LSI's, LCD's, etc., a ceiling portion 203 and a floor portion 204 which define the upper and lower parts of the working space 202, and a return path 205 arranged on the side of the working space. On the ceiling portion 203, there is arranged a clean fan unit 213 which includes a fan unit 210, a filter 100 or 131 as previously described, and a particle filter 212 for removing particle impurities. A semiconductor manufacturing apparatus 214 is located in the working space 202 and acts as a kind of a heat source. The under-floor portion 204 is partitioned off with grated panels 215 having a number of holes or perforations. A condensation coil of the non-dew type 216 is arranged in the under-floor portion 204 in order to deal with the sensible heat load of the semiconductor manufacturing apparatus 214. A temperature sensor 217 is set up in the return path 205 to detect the temperature therein. A valve 218 for regulating the chilled water flow is controlled such that the temperature detected by the sensor 217 and the relative humidity in the return path are kept at respective preset constant levels, without causing any dew to appear on the surface of the condensation coil 216. With operation of the fan unit 210, the air in the clean room 201 begins to circulate at a regulated air flow rate in the order of ceiling portion 203—working space 202—under-floor portion 204—return path 205—ceiling portion 203. During this air circulation, the air is cooled through the non-dew type condensation coil 216, and gaseous organic impurities and particulate impurities contained in the clean room air are removed through the filter 100 or 131 and particle filter 212 of the clean fan unit 213, respectively. The outdoor air is suitably supplied to the under-floor portion 204 of the clean room 201 through an outdoor air intake path 220. In this outdoor air intake path 220, there are provided a filter 221 which includes hydrophilic zeolite for removing gaseous organic impurities contained in the outdoor air, a unit type air conditioner 222 which performs removal of dusts in the outdoor air and controls the temperature and humidity of the introduced outdoor air, and a humidity sensor 227 which is set up in the outdoor air intake path 220. A valve 229 for regulating the pressure of supply water in the humidity control portion of the unit type air conditioner 222 is controlled such that the humidity detected by the sensor 227 is kept at a preset level. In the working space 202, there is provided another humidity sensor 228, by which the humidity of the working space 202 is detected. The outdoor air introduced to the under-floor portion 204 of the clean room 201 through the outdoor air intake path 220 is introduced to the working space 202 through the return path 205 and the ceiling portion 203. The air amount comparable to that which is introduced to the working space 202 is exhausted from an exhaust opening 225 via a return gill 226. Although not shown, when installing filters 100 or 131 in the ceiling portion 203 of the clean room 201, it may be possible, as described referring to FIG. 5, to dispose them so as not to cover the entire ceiling portion 203 but to cover it in part.

A filter 311 according to the third embodiment of the invention will now be described in detail in the following.

Figure 17A:
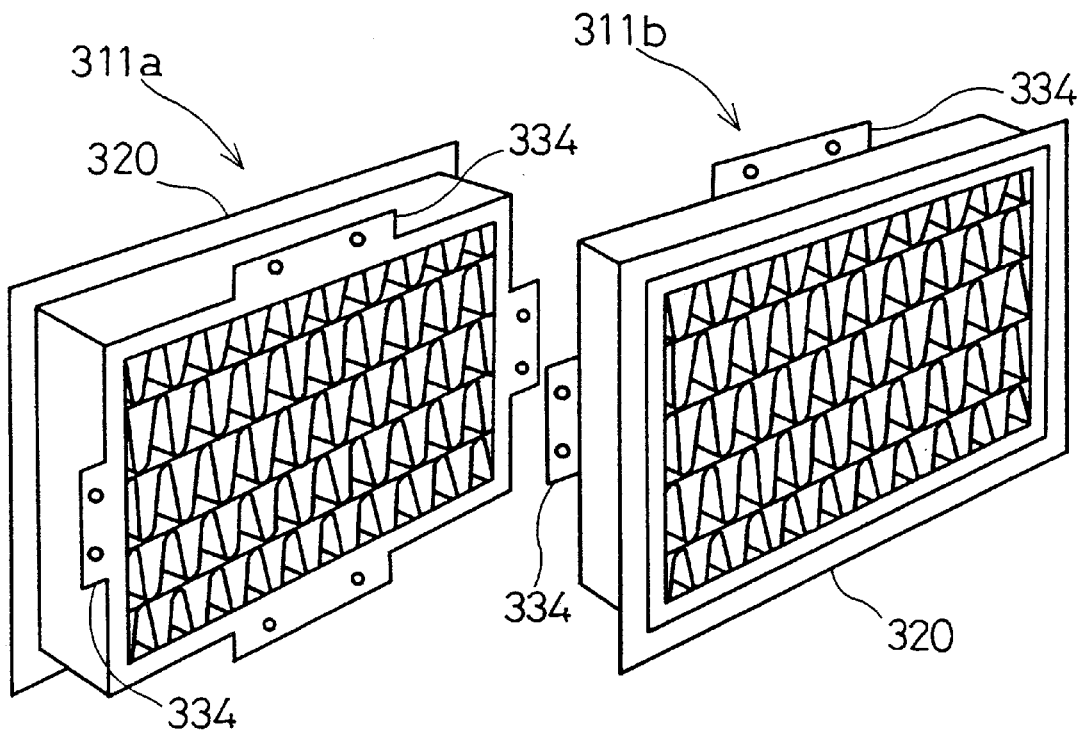
FIG. 17a is a perspective view of filter portions according to the third embodiment of the invention.
Figure 17B:
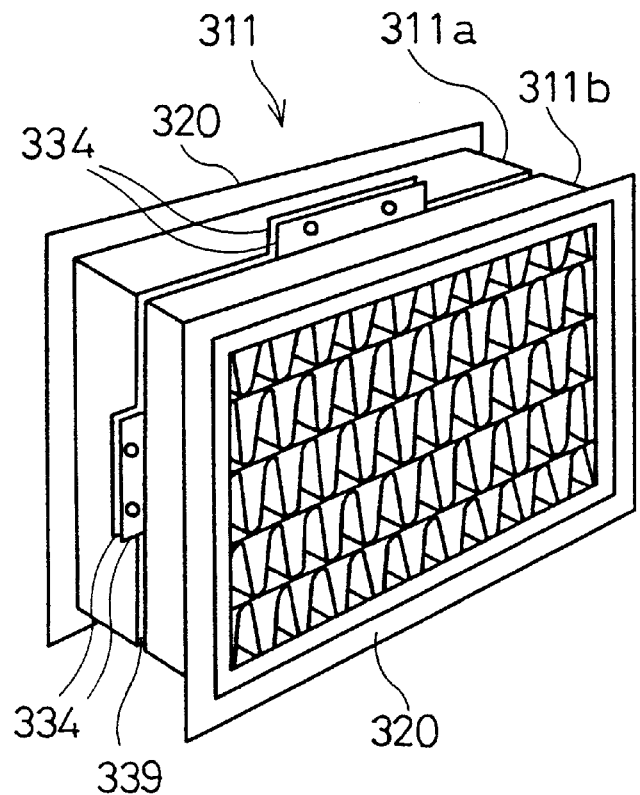

FIG. 17a is a perspective view of filter portions according to the third embodiment of the invention and FIG. 17b is a perspective view of a filter finished by assembling the filter portions as shown in FIG. 17a. As shown in FIG. 17a, this filter 311 consists of the first and second filter portions 311a and 311b, the former including synthetic zeolite for removing gaseous organic impurities contained in the object air to be cleaned and the latter including an inorganic adsorbent which has an effective pore diameter larger than that of synthetic zeolite and is capable of removing gaseous organic impurities which can not be removed by synthetic zeolite. As shown in FIG. 17b, these filter portions 311a and 311b are coupled to each other by screwing the flanges 334 of their filter frames. In this case, it is preferable to insert a fluororesin gasket 339 generating less gaseous impurities between filter portions. The coupled filter 311 are screwed on respective ducts (not shown) located on the up- and downstream sides of the filter by means of its flanges 320. Except the fluororesin gasket 339, all the components of these filter portions are made of only materials which are neither inflammable nor generate gaseous organic impurities.

FIG. 18 is a schematic exploded view of first and second filter portions 311a and 311b. These are formed in the almost same way as the filter 11 as shown in FIG. 2. That is, as shown in FIG. 18, the filter 311 is formed having a honeycomb structure 332 similar to the previously described, namely, a plurality of corrugated sheet 330 and thin flat sheet 331 being alternately stacked up inside a space which is defined by aluminum frame members 335a, 335b, 335c, and 335d, and front and rear frame members 320, 334, so as to have an opening against the flow direction 333 of the air to be cleaned. In this case, as described in the above, synthetic zeolite is fixed to the entire surface of the honeycomb structure 332 for the first filter portion 311a while an inorganic adsorbent having an effective pore diameter larger than that of synthetic zeolite, is fixed to the honeycomb structure for the second filter portion 311b. As will be described later, the effective pore diameter of synthetic zeolite is preferably more than 7 angstroms. As will be also described later, the inorganic adsorbent is preferably selected from diatom earth, silica, alumina, mixture of silica and alumina, aluminum silicate, activated alumina, porous glass, hydrated magnesium silicate clay mineral, activated clay, activated bentonite, etc. Just for reference, the physical properties of pores of the inorganic adsorbent will be indicated in Table 2.

TABLE 2

| Test Piece (Powder) | Specific Surface (m²/g) by BET Method | Pore Volume (cc/g) by N₂ Adsorption 15 to 300 angstroms |
| --- | --- | --- |
| diatom earth | 200 | 0.25 |
| silica gel | 400 | 0.61 |
| alumina gel | 250 | 0.60 |
| $Al_2O_3 \cdot 3SiO_2$ | 225 | 0.60 |
| acti'd $Al_2O_3$ | 300 | 0.30 |
| porous glass | 400 | 0.15 |
| Sepiolite | 295 | 0.33 |
| acti'd clay | 300 | 0.37 |
| acti'd bentonite | 87 | 0.23 |

At this point, there will be briefly explained an example of a method for manufacturing the filter portions 311a and 311b. All the steps taken until completion of the honeycomb structure 332 are identical to those which are described in the above. The honeycomb structure 332 for the first filter portion 311a is immersed in a suspension in which there are dispersed synthetic zeolite powder with a grain size of several microns, and an inorganic sol binder such as silica sol, alumina sol, sodium silicate, etc. On the other hand, the honeycomb structure 332 for the second filter portion 311b is immersed in a suspension in which there are dispersed an inorganic sol binder such as silica sol, alumina sol, sodium silicate, etc., and inorganic adsorbent powder which has a grain size of several micron and an effective pore diameter larger than that of the synthetic zeolite, and may be selected from diatom earth, silica, alumina, mixture of silica and alumina, aluminum silicate, activated alumina, porous glass, hydrated magnesium silicate clay mineral, activated clay, activated bentonite, etc. After both of porous honeycomb structures 332 are impregnated with the above-mentioned materials for several minutes, they are treated by heat at 300° C. for one hour, thereby finishing the first and second filter portions 311a and 311b. Silica sol or alumina sol as used in the above treatment are a mono-dispersed suspension which contains primary particles with a size in the order of one to several tens nanometers. However, when the primary particles are attached onto the surface of the honeycomb structure and treated by heat, Silica sol or alumina sol is transformed into silica gel or alumina gel as their three-dimensional aggregation. Therefore, the filter portion 311b may be obtained by immersing the porous honeycomb structure 332 in a suspension in which only the inorganic sol binder such as silica sol or alumina sol is dispersed, and then treating it by heat.

As described in the above, the filter 311 composed of the first and second filter portions 311a and 311b includes nothing inflammable as its constituents, and also the gaseous organic impurities, which are contained in the filter constituents and possibly contaminate the substrate surface, can be removed during the heat treatment of the first and second filters, so that there can be no chance for the filter 311 to be the gaseous organic impurity source by itself.

Figure 19:
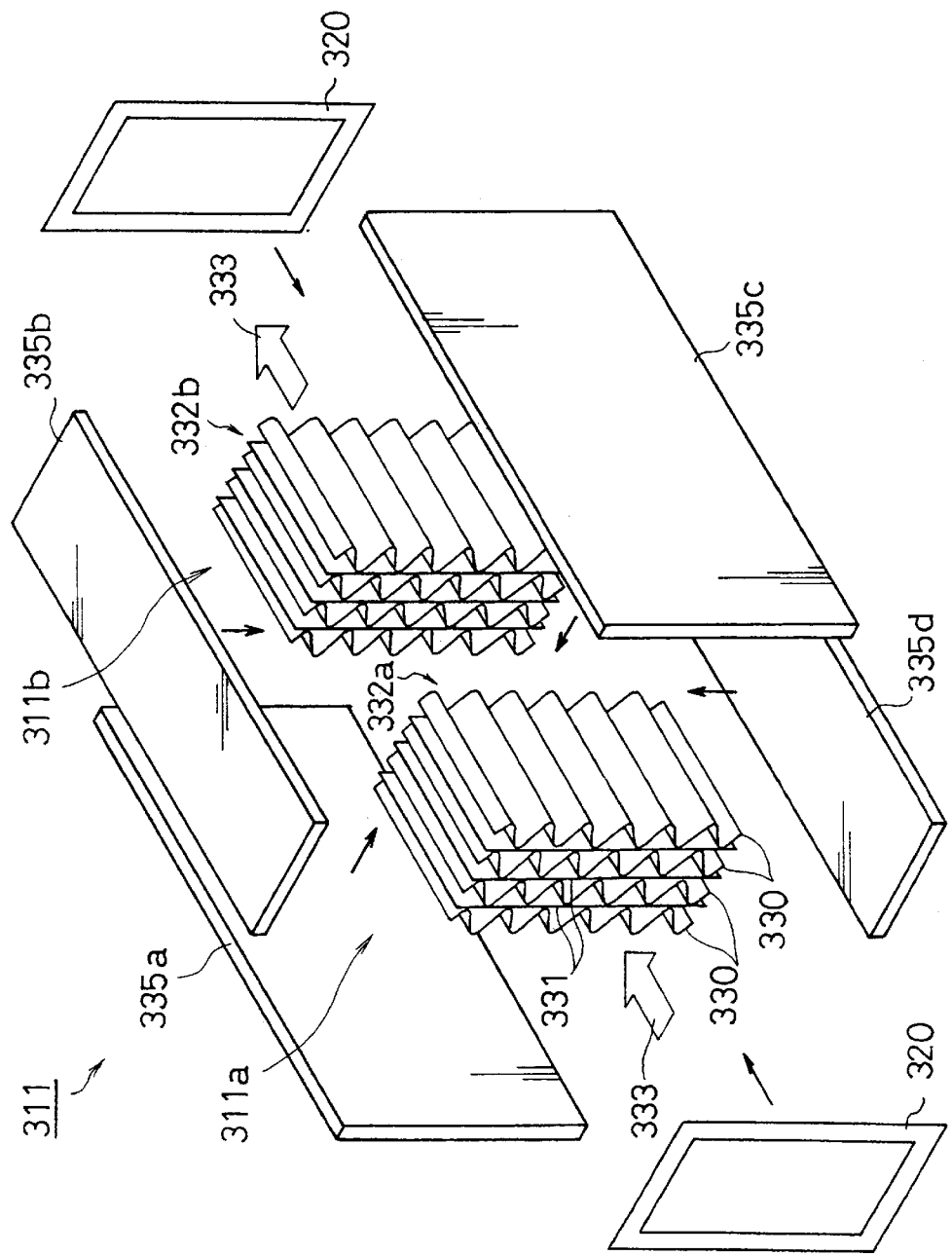
FIG. 19 is an exploded view of the other filter according to the third embodiment of the invention.

FIG. 19 is a schematic exploded view of the filter 311 in order to illustrate another way of combining the first filter portion 311a with the second one 311b. As will be seen from FIG. 19, the frame of the filter 311 is first assembled by using aluminum external frame members 335a, 335b, 335c, 335d, which are made longer comparing to those which are shown in FIG. 18, and front and rear frame members 320. Next, the honeycomb structures 332a and 332b, which have received the same treatment as those for the first and second filter portions 311a and 311b, are inserted and arranged in the inner space defined by the above frame members. In this case, both honeycomb structures 332a and 332b may be arranged so as to be adjacent to each other or to be separated from each other at a certain distance within the above inner space defined by the above frame members. FIG. 19 shows that honeycomb structures 332a and 332b are accommodated in the inner space according to the way of the latter arrangement, thereby completing the first and second filter portions 311a and 311b.

Figure 20:
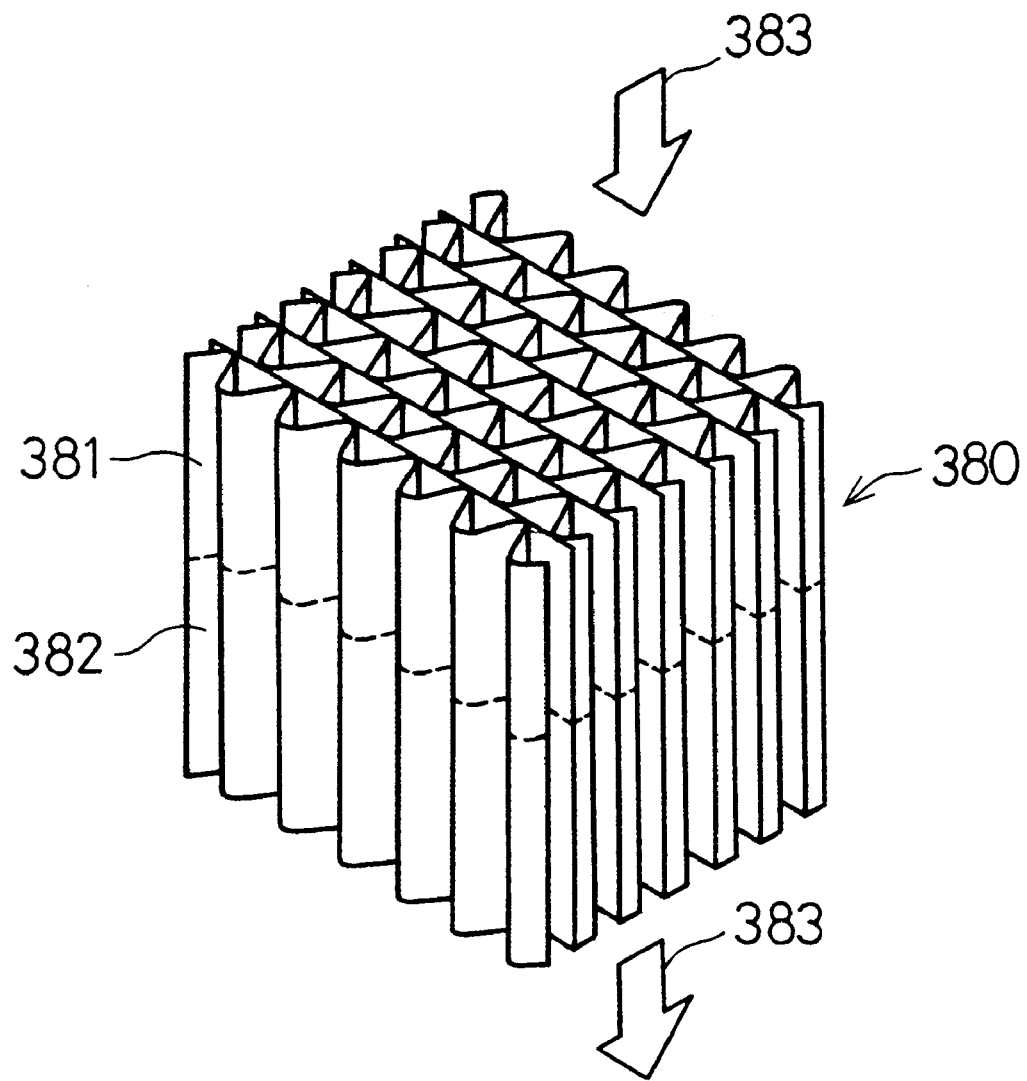
FIG. 20 is a perspective view of a filter according to the other embodiment of the invention.

FIG. 20 is a perspective view showing another arrangement of the filter 311 according to the invention. As shown in the figure, the honeycomb structure 380 is divided into two regions by an imaginary boundary surface which is set in an equidistant position from both ends of the honeycomb structure 380 in such a manner that it meets the air flow direction 383 at right angles. Pellets pelletized from synthetic zeolite or the powder thereof are fixed to the surface of one half region of the honeycomb structure 380, thereby forming the first filter portion, while adsorbent pellets pelletized from an inorganic adsorbent or the powder thereof are fixed to the surface of the other half region of the honeycomb structure 380, thereby forming the second filter portion, the inorganic adsorbent having an effective pore diameter larger that of zeolite. In the example as shown, the about half upstream region 381 of the honeycomb structure 380 with respect to the air flow direction 383 is immersed in a suspension in which synthetic zeolite is dispersed, and is then dried, thereby forming an inorganic material layer made of synthetic zeolite on the surface of the upper stream region 381. On the other hand, the remaining half downstream region 382 of the same is immersed in another suspension in which an inorganic adsorbent is dispersed, and is then dried, thereby forming another inorganic material layer made of the inorganic adsorbent on the surface of the above remaining half downstream region 382, the inorganic adsorbent being selected from diatom earth, silica, alumina, mixture of silica and alumina, aluminum silicate, activated alumina, porous glass, hydrated magnesium silicate clay mineral, activated clay, activated bentonite, etc. The above two inorganic layers may be formed either overlapping with or being separated from each other in the vicinity of the boundary between upstream and downstream regions 381 and 382. The filter 311 according to the invention can be completed by inserting and fixing the honeycomb structure 380 to such an aluminum frame as shown in FIG. 19. The upstream side 381 of the honeycomb structure 380 as framed corresponds to the first filter portion 311a while the downstream side 382 of the same corresponds to the second filter portion 311b. When installing the filter 311 in the clean room, it may be arbitrarily determined which filter portion, the first filter portion 311a including synthetic zeolite or the second one 311b including the inorganic adsorbent, would take an upstream position with respect to the air flow coming in the filter 311.

Although the above filter 311 composed of the first and second filter portions 311a and 311b may display an excellent ability in removal of organic impurities, the inventors still know, as will be described later, that an equally excellent but more compact filter may be realized by first forming an inorganic material layer made of synthetic zeolite on the surface of the supporter as the first adsorption layer, and additionally forming another inorganic material layer made of an inorganic adsorbent over the first adsorption layer as the second adsorption layer.

The method of forming the filter portions 311a and 311b is not limited to that which has been described in the above. Pellets pelletized from synthetic zeolite or the above-mentioned inorganic adsorbent may be fixed to the sheet-type base filter media (supporter) in the same way as mentioned in the above.

Figure 23A:
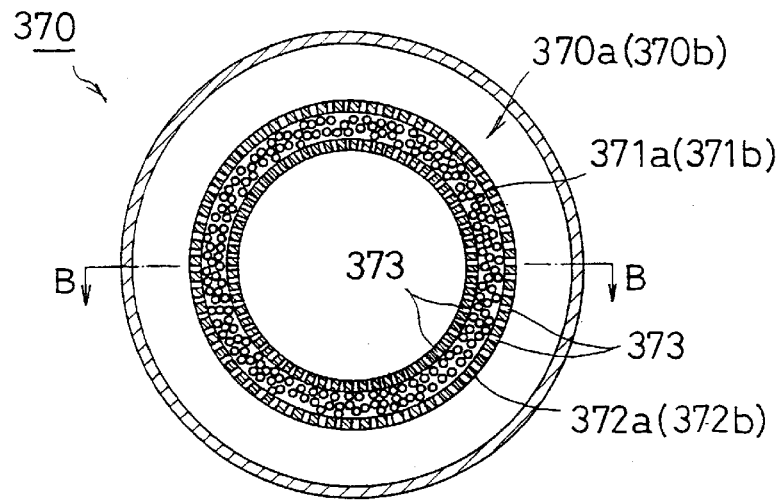
FIG. 23a is a cross sectional view taken on line A—A of FIG. 23b, showing a filter which is formed by filling a casing with pellets.
Figure 23B:
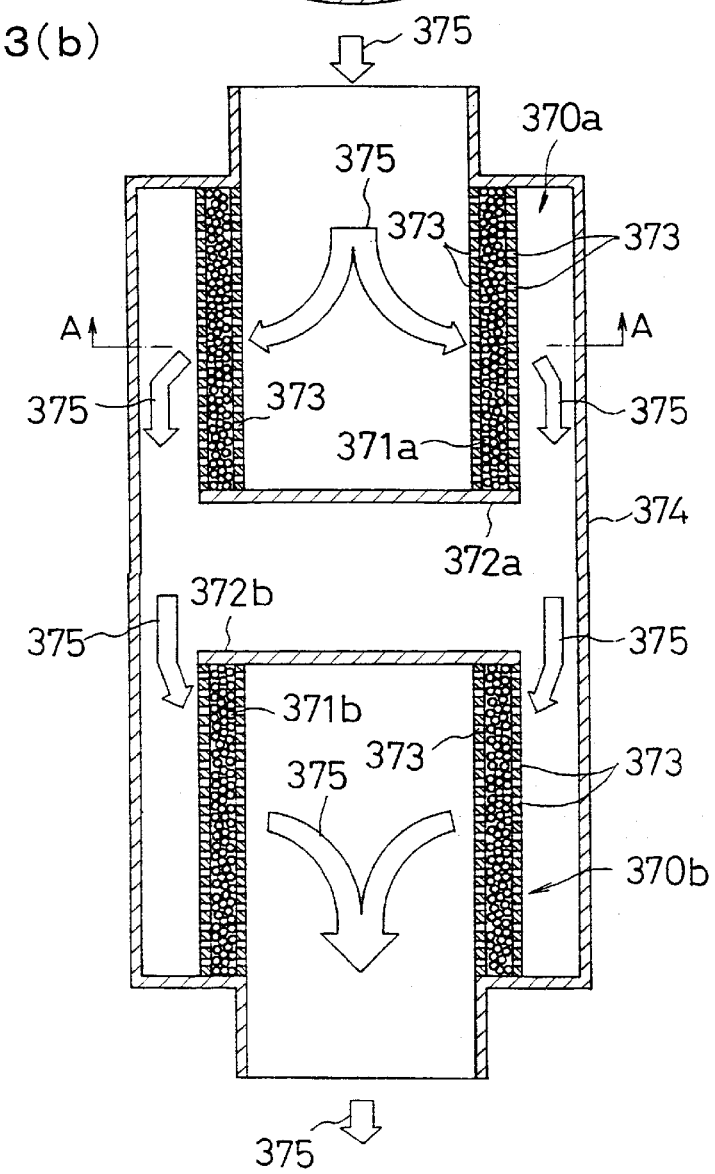

FIG. 23a is a cross sectional view taken on line A—A of FIG. 23b, showing a filter 370 according to the another embodiment of the invention, which is formed by filling a casing with pellets, and FIG. 23b is a cross sectional view taken on line B—B of the FIG. 23a. The filter 370 is composed of the first and second filter portions 370a and 370b. The first filter portion 370a includes a hollow cylindrical casing 372a filled with pellets 371a made of synthetic zeolite, the casing 372a having outer and inner walls which are provided with a lot of vent apertures 373. Similarly, the second filter portion 370b includes a hollow cylindrical casing 372b filled with pellets 371b made of the above-mentioned inorganic adsorbent, the casing 372b having outer and inner walls which are provided with a lot of vent apertures 373. As each bottom of both casings 372a and 372b is closed, the air to be cleaned first passes inside-out through the pellet filled layer (371a) of the casing 372a. Then, the air flows through the space between the outer wall of the casing 372a and an outermost cylinder 374, and enters in and passes outside-in through the pellet filled layer (371b) of the casing 372b, and finally flows out from the casing 372b. The air flow direction inside the filter 370 is indicated by several arrows 375 in FIG. 23b. In FIG. 23b, the first filter portion 370a is positioned upstream from the second filter portion 370b, but this positional relation may be reversed.

Figure 21:
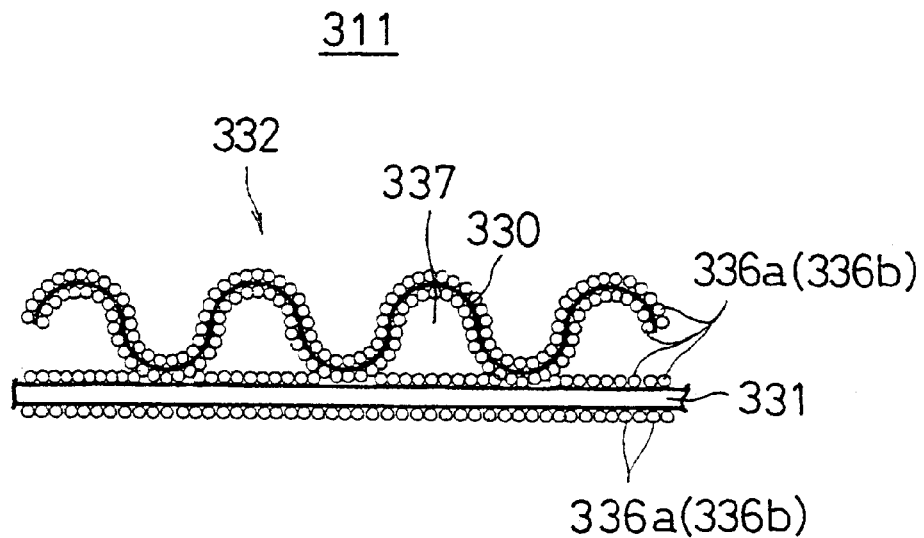
FIG. 21 is a partial enlarged cross sectional view of adsorption layers, which are formed by alternately stacking a corrugated sheet having a round wave form and a thin plain sheet.
Figure 22:
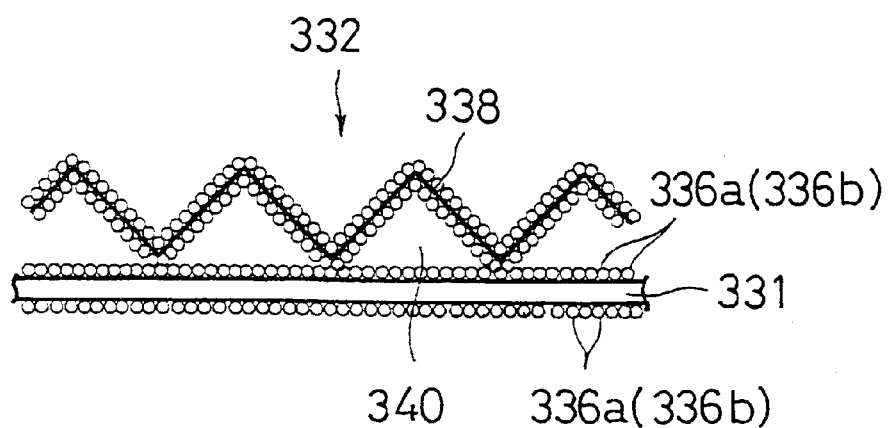
FIG. 22 is a partial enlarged cross sectional view of adsorption layers, which are formed by alternately stacking a corrugated sheet having a triangle wave form and a thin plain sheet.

It is also possible to manufacture a filter utilizing the pelletized adsorbent according to the following method. For instance, FIGS. 21 and 22 respectively show a partial enlarged cross sectional view of adsorption layers formed according to this method. These adsorption layers can be formed by jetting the pellets against a supporter to the surface of which an inorganic incombustible adhesive is applied in advance. In this case, the pellet supporter may be not always required to be of honeycomb structure as mentioned above. It may have a three-dimensional mesh structure like a rock wool. The mesh structure may generally show a high resistance against the object air to be cleaned when it flows therethrough. However, this means that the mesh structure may give the object air more chance of getting in contact with adsorbents than the honeycomb structure. Pellets fixed to the supporter may be produced by the following steps, namely mixing the synthetic zeolite powder or the inorganic adsorbent powder with an inorganic sol binder, adding city water to this mixture thereby forming a clayish mixture, and producing pellets having a diameter of about 0.3 to 0.8 mm from the clayish mixture by means of a pelletizing machine.

As described in the above, since the filters 311 and 370 includes nothing inflammable as its constituents, if these filters are installed in the ceiling portion of the clean room or the like, safety from the standpoint of disaster prevention can be remarkably enhanced comparing to the case of using the prior art chemical filter relying on the inflammable activated charcoal.

In general, it is believed that most of the gaseous organic impurities, which are generated in the clean room used as the working space for manufacture of semiconductor devices or the like and act as substrate surface contaminants of LSI's, LCD's, etc., might be high-molecular organic compounds having a high boiling point, for instance organic siloxane generated from some sealants, phosphoric ester from a flame retardant contained in some building materials, phthalate from a plasticizer contained in some building materials, HMDS from an agent facilitating close adhesion of the photoresist, BHT from the antioxidant contained in cassettes. Accordingly, a source of these organic contaminants exists in various articles and materials which constitute the clean room itself and are used for manufacturing products therein. However, it is not so often that such contaminants are contained in the outdoor air introduced in the clean room. Accordingly, the main role of the filters 311 and 370 is to remove the high-molecular organic compounds having a high boiling point, which are generated inside the clean room, carried by the air circulating therethrough, and cause the surface contamination.

In the next, there will be described various functions and effects of the clean room and filters embodied according to the invention.

Figure 24:
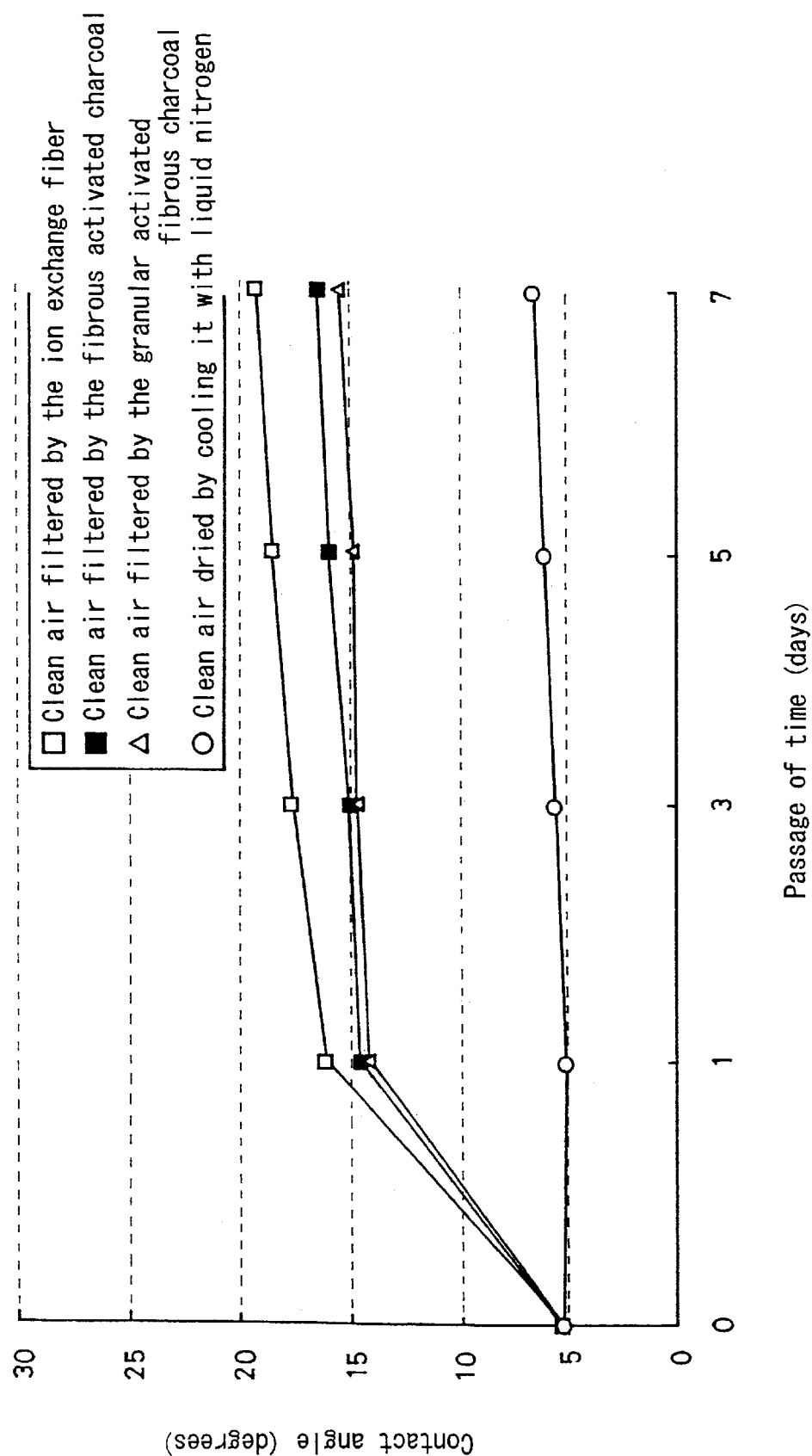
FIG. 24 is a graph showing contact angle change on a silicon wafer surface when exposing it to the air which is filtered by various chemical filters.
Figure 25:
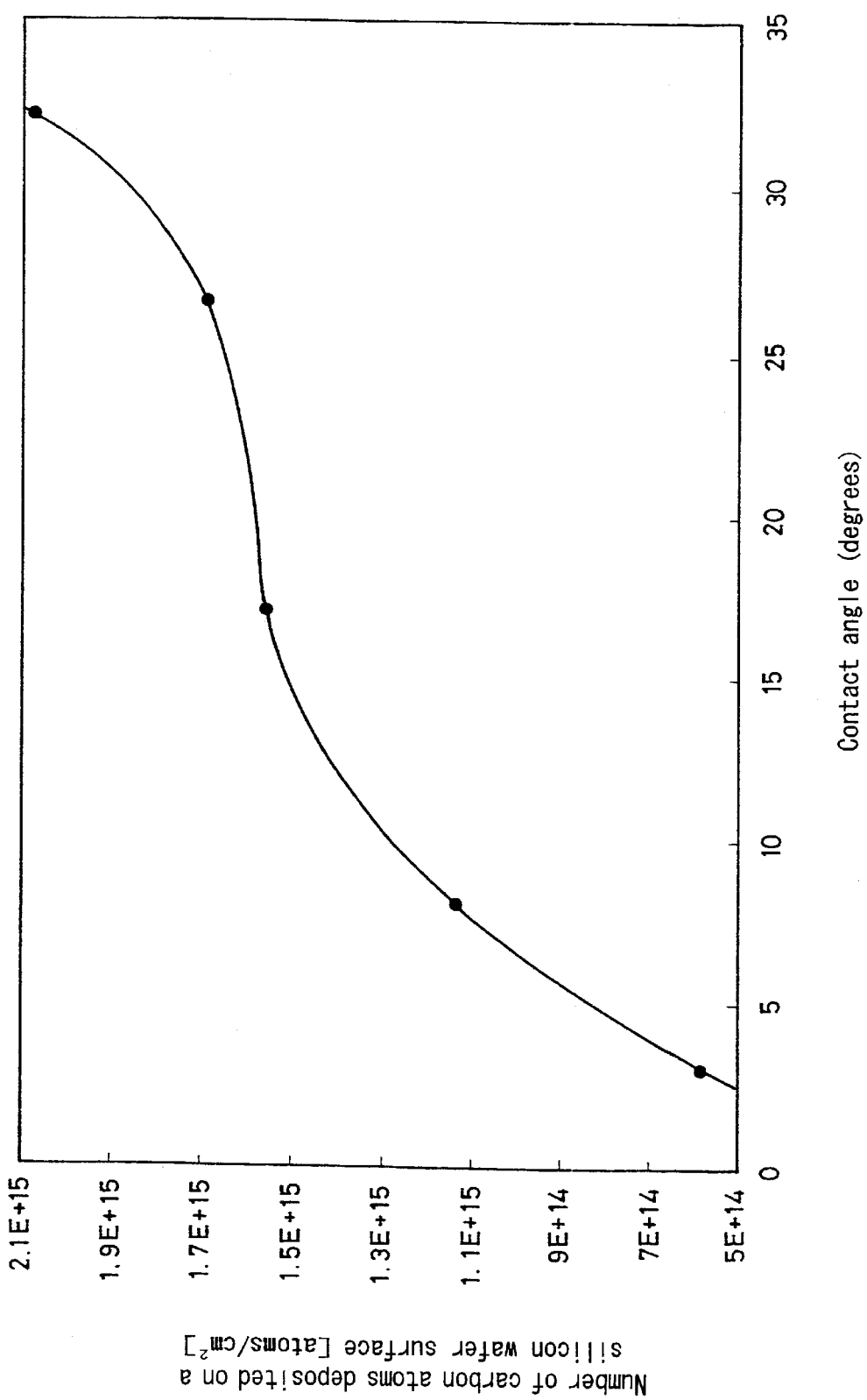
FIG. 25 is a graph showing a relation between the number of carbon atoms deposited on a glass substrate surface and the contact angle on the same.

For comparison study on ability of different filters, the clean room air was filtered by using various kinds of filters, and cleanliness thereof was evaluated by measuring the change with the passage of time regarding the contact angle between a silicon dioxide film formed on a silicon wafer and a water droplet dropped thereon. The clean room air to be evaluated was prepared according to four kinds of ways, namely filtering the clean room air with respective two kinds of commercial chemical filters, one including granular activated charcoal and the other including fibrous activated charcoal, filtering the same with a chemical filter including ion exchange fiber, and having the clean room air dried by cooling it with liquid nitrogen, thereby condensing and removing impurities contained therein. FIG. 24 is a graph showing the results of the above evaluation on cleanliness of the clean room air. As the silicon dioxide film and a glass plate become free from organic contaminants immediately after rinsing of them, their surfaces have an affinity for water, in other words they become hydrophilic, thus indicating a small contact angle. Contrary to this, if their surfaces are once contaminated with organic substances, they come to shed water well, in other words they become hydrophobic, thus indicating a large contact angle. When leaving a glass plate in the clean room air and measuring a contact angle between its surface and a very much purified water droplet dropped thereon with the passage of time, it is known that there exists a certain mutual relation between the contact angle measured by water droplet method and the degree of surface contamination measured by the XPS (X-ray photoelectron spectroscopy) method. An example of this is shown in FIG. 25. With regard to the silicon dioxide film formed on a silicon wafer, almost similar relation exists between the contact angle and the surface contamination by organic impurities. Like this, there exists a very strong mutual relation between the water contact angle on the substrate surface and the surface contamination by organic substances.

The following can be read from the measurement results shown in FIG. 24. The ion exchange fiber is mainly used for adsorbing and removing water-soluble inorganic impurities, so that it can not adsorb any organic substances. Conversely, it can even generate gaseous organic substances. Therefore, when leaving a test piece (silicon wafer covered with silicon dioxide film) all day long in the clean room air filtered by the ion exchange fiber filter, the contact angle shows increase of about 10°. On one hand, in case of leaving the test piece in the above-mentioned dried clean room air all day long, since gaseous organic impurities are hardly contained therein, no increase in the contact angle is observed. In case of leaving the test piece in the clean room air filtered by the above-mentioned two kinds of activated charcoal filters, no favorable result is obtained despite that their protection ability against the surface contamination by organic substances is much expected, and the contact angle shows increase of about 10°, eventually. The reason why these activated charcoal filters fail to give full play to their ability might exist in their constituent materials such as binder, adhesive, sealant, and so forth, which possibly generate a considerable quantity of gaseous organic impurities. Thus, their adsorption power might have been consumed in large part for adsorbing impurities which are generated by themselves. In order to avoid the secondary impurity source like this, it might be considered to use a filtration tower, especially a metallic filtration tower. However, the filtration tower might be not always advantageous when considering its high pressure loss or vent resistance as previously described.

Next, the clean room according to the invention as shown in FIG. 1 was prepared and a test piece is left in the clean room and exposed to the air circulating therethrough. Before being left, the test piece was sufficiently rinsed so as to make its surface free from organic contaminants. Each of filters installed in the clean room includes a honeycomb structure, to the surface of which hydrophobic zeolite powder is firmly fixed. The contact angle was measured immediately after rinsing the test piece, and also measured after exposing it to the clean room air for 3 days, thereby determining increase in the contact angle caused by this 3-day exposure. This 3-day exposure cycle i.e. rinsing—contact angle measurement—3-day exposure—contact angle measurement, was repeated every 15 days, thereby measuring the adsorption ability change of the filter with the passage of time. In this measurement, the flow rate of the air circulating in the clean room was set as 5000 m$^3$/min while the quantity of hydrophobic zeolite fixed to the honeycomb structures was set as 5000 kg in total. This means that hydrophobic zeolite of 1 kg was used at a flow rate of 1 m$^3$/min. The outdoor air was introduced in the clean room at a rate of 200 m$^3$/min, which corresponds to 4% of the total circulating air volume. The entire volume of the clean room was 3120 m$^3$ and the air circulation rate was set as 100 times per hour.

For comparison study, the above-mentioned 3-day exposure cycle was repetitively carried out every 15 days with respect to a test piece similar to the above-mentioned, after replacing the filters containing hydrophobic zeolite by conventional chemical filters of the felt type which is composed of fibrous activated charcoal and a polyester binder having a low boiling point. In this case, the fibrous activated charcoal of 1 kg was used at a flow rate of 1 m$^3$/min. For further comparison study, the above-mentioned 3-day exposure cycle was repetitively performed every 15 days with respect to a test piece similar to the above-mentioned under the circumstances where neither filter according to the invention, nor conventional chemical filter was installed in the clean room, namely, no special countermeasure was taken against gaseous organic impurities contained in the clean room air.

According to the experiments by the inventors, it has been statistically determined that a contact angle of 3° in average is made between the surface of the test piece and a pure water droplet dropped thereon when measuring it immediately after rinsing the test piece. Then, in order to evaluate the cleanliness of the air circulating in the clean room, it is assumed that to keep a contact angle of less than 6° after the 3-day exposure test is a requirement necessary for preventing quality of product from deterioration thereof caused by gaseous organic impurities.

Figure 26:
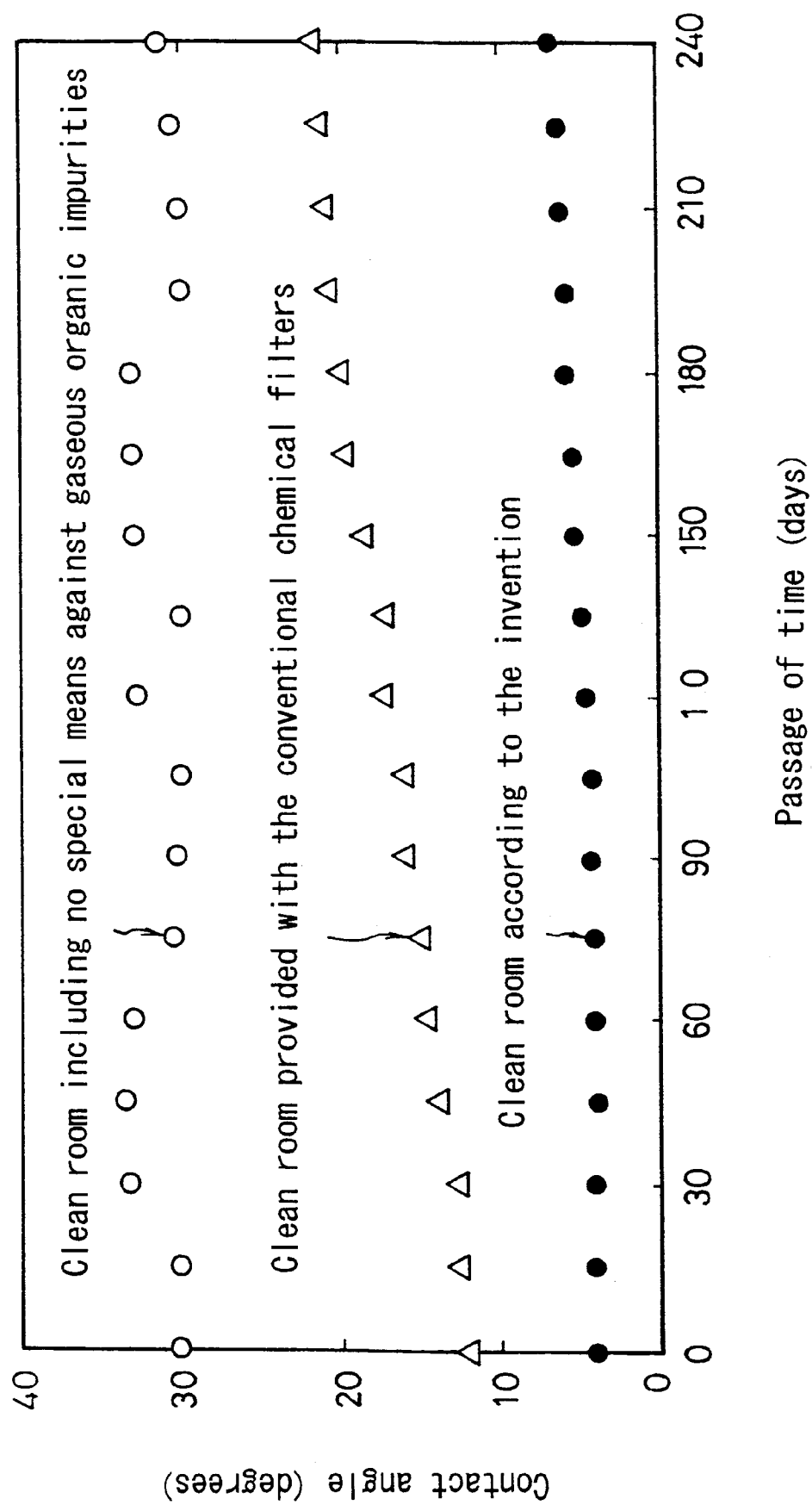
FIG. 26 is a graph showing contact angle change with the passage of time when exposing a silicon wafer covered by a silicon dioxide film formed thereon to various ambiences for 3 days immediately after rinsing it.

FIG. 26 is a graph showing results of contact angle measurement, more specifically the contact angle change with the passage of time which was measured after performing the 3-day exposure test every 15 days in the air filtered by different filters, namely (1) in the air circulating through the clean room provided with air filters according to the invention, (2) in the air circulating through the clean room provided with conventional chemical filters, and (3) in the air circulating through the clean room including no special means against gaseous organic impurities.

As will be understood from the figure, the test piece exposed to the above air (3) increased its contact angle from 3° (immediately after rinsing) to 26°–30° after the first 3-day exposure test. In case of exposing the test piece to the air (1) cleaned by the filter including the hydrophobic zeolite adsorption layer, its contact angle was kept lower than 4° after the first 3-day exposure test. With the passage of time, however the adsorption ability of the hydrophobic zeolite layer gradually went down, so that there was increased the concentration of gaseous organic impurities in the air passing through the adsorption layer. In other words, the contact angle of the test piece exposed to the air for a preset period of time was increased with increase of time the air passes through the hydrophobic zeolite adsorption layer. However, it will be understood from FIG. 26 that it takes about 6 months until the contact angle of the test piece exposed to the air (1) increases up to 6°, even if the 3-day exposure test is periodically performed every 15 days. On one hand, in case of exposing the test piece to the air (2) filtered by the conventional chemical filter, its contact angle was increased up to 12° even after the first 3-day exposure test. This might be possibly caused by gas originated from polyester having a low boiling point, which is used as a binder for supporting activated fibrous charcoal. Accordingly, this gas flows out downstream from the chemical filter without being filtered and directly contaminates the test piece surface. According to the filter of the invention, as briefly described in the above in connection with the method of manufacturing it, as the filter contains no organic material as its constituent, there is no chance for any gaseous organic impurity to be generated therefrom. In case of the conventional chemical filter, the adsorption ability of the activated charcoal also went down with increase of time the air flows therethrough. The contact angle of the test piece exposed to the air filtered with the conventional chemical filter was increased up to 20° when 6 months has passed.

Figure 27:
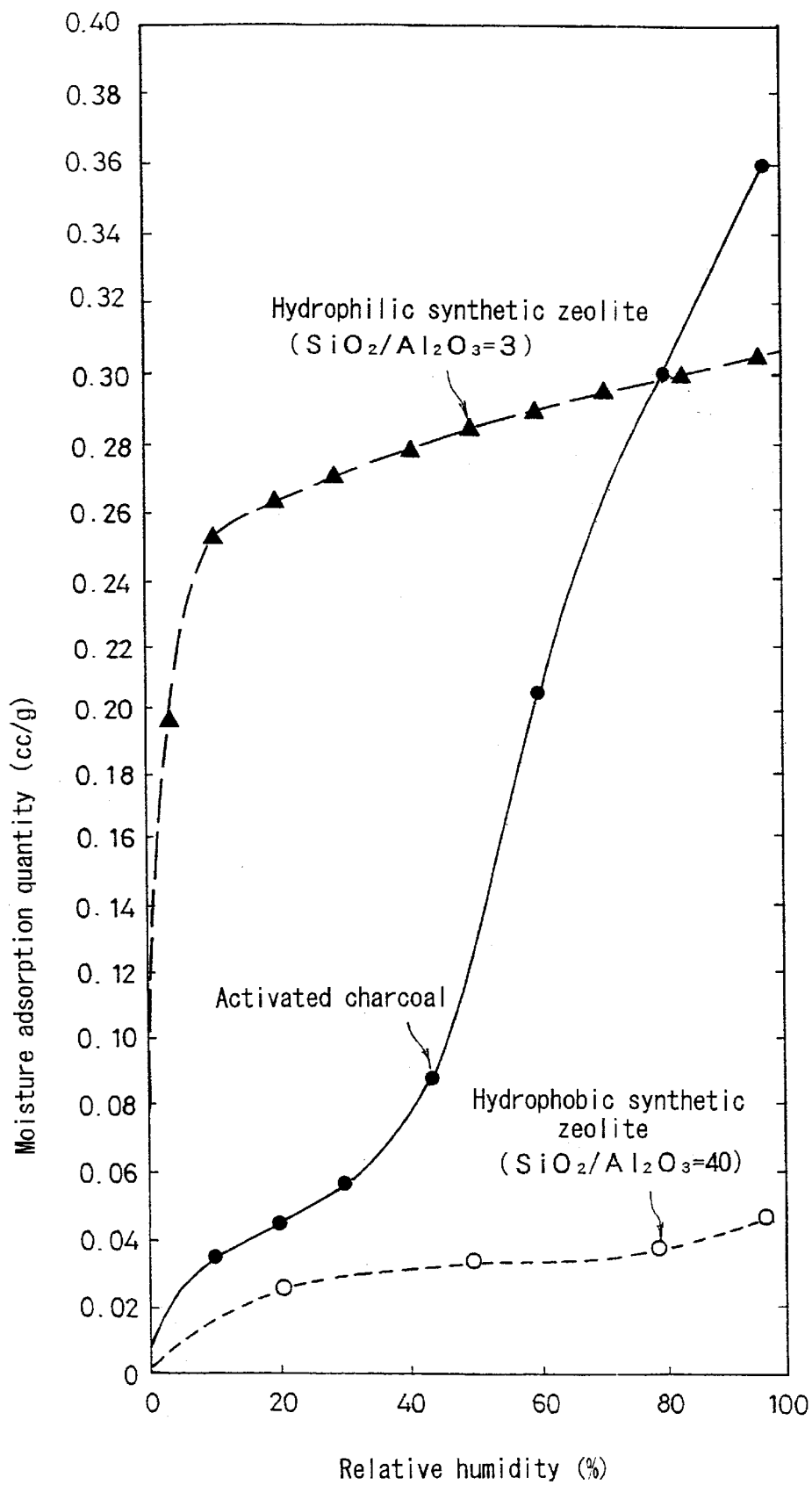
FIG. 27 is a graph showing moisture adsorption isotherm of synthetic zeolite and activated charcoal.

Various studies have been made on hydrophobic zeolite. As known well, main components of zeolite are silica ($SiO_2$) and alumina ($Al_2O_3$), and the relation between the weight ratio ($SiO_2/Al_2O_3$) and the moisture adsorption quantity of zeolite has been already discussed referring to FIG. 11. FIG. 27 shows a moisture adsorption isotherm of hydrophobic zeolite when an air temperature is 25° C. and $SiO_2/Al_2O_3$ is 40. For the purpose of comparison, FIG. 27 also shows a moisture adsorption isotherm of activated charcoal. At the relative humidity of 50%, the moisture adsorption quantity (cc) per activated charcoal (g) was 0.11 cc/g while the same per hydrophobic zeolite (g) was 0.03 cc/g.

In order to evaluate the performance of various adsorbents with respect to a very small quantity of organic impurities contained in the clean room air (23° C., 40% RH), a comparison study was performed using six adsorbents, which are hydrophilic and hydrophobic zeolite having an effective pore diameter of 6 angstroms, hydrophilic and hydrophobic zeolite having an effective pore diameter of 8 angstroms, activated charcoal made of a natural raw material such as coconut husk, and activated charcoal made of a synthetic material such as petroleum pitch. Each adsorbent of 0.04 g was charged in a column having a sectional area of 0.15 cm$^2$, to which the clean room air was supplied at a flow rate of 3 lit./min. Table 3 indicates various conditions employed in the experiment. The quantity of the adsorbent as charged in the column, the section of the column, the air flow rate, and flow speed are commonly set regardless of a sort of adsorbent. However, the charged density, charged volume, charged depth of respective adsorbents in the column and the time of getting in contact with respective adsorbents were varied depending on the grain size and density of respective adsorbents. On one hand, there was provided a container for contact angle measurement, which had a capacity of one liter and was made of a material which generates no gaseous organic impurities by itself. The container inlet was connected with the above-mentioned column, and the air passing through the adsorbent in the column was supplied to the container at a flow rate of 3 lit./min. and flows out from the exit thereof. The test piece (silicon wafer covered by a silicon dioxide film) was placed in the container and kept for 20 hours therein, and then the contact angle was measured. The adsorption power change with passage of time was measured with respect to each of the six adsorbents by continuously repeating a 20-hour exposure cycle i.e. 'rinsing the test piece—20-hour exposure—contact angle measurement.'

TABLE 3

| Sort of Adsorbent | Appearance & Size | Charged Density (g/cc) | Quantity Charged |
|---|---|---|---|
| Hydrophilic Zeolite (6 angstroms) | 0.30–0.85 mm | 0.58 | 0.04 g |
| Hydrophobic Zeolite (6 angstroms) | | | |
| Hydrophilic Zeolite (8 angstroms) | 0.30–0.85 mm | 0.42 | |
| Hydrophobic Zeolite (8 angstroms) | | | |
| Activated Charcoal (coconut husk) | 0.30–0.85 mm | 0.36 | |
| Activated Charcoal (petroleum pitch) | 0.6–0.9 mm | 0.52 | |

| Sort of Adsorbent | Column Area | Volume Charged (cc) | Thickness of Layer (mm) | Flow Rate |
|---|---|---|---|---|
| Hydrophilic Zeolite (6 angstroms) | 0.15 cm$^2$ | 0.069 | 4.6 | 3.0 1/min |
| Hydrophobic Zeolite (6 angstroms) | | | | |
| Hydrophilic Zeolite (8 angstroms) | | 0.096 | 6.5 | |
| Hydrophobic Zeolite (8 angstroms) | | | | |
| Activated Charcoal (coconut husk) | | 0.11 | 7.4 | |
| Activated Charcoal (petroleum pitch) | | 0.078 | 5.2 | |

| Sort of Adsorbent | Flow Speed | Contact Time (sec) |
|---|---|---|
| Hydrophilic Zeolite (6 angstroms) | 3.4 m/s | 0.0014 |
| Hydrophobic Zeolite (6 angstroms) | | |
| Hydrophilic Zeolite (8 angstroms) | | 0.0019 |
| Hydrophobic Zeolite (8 angstroms) | | |
| Activated Charcoal (coconut husk) | | 0.0022 |
| Activated Charcoal (petroleum pitch) | | 0.0016 |

Figure 28:
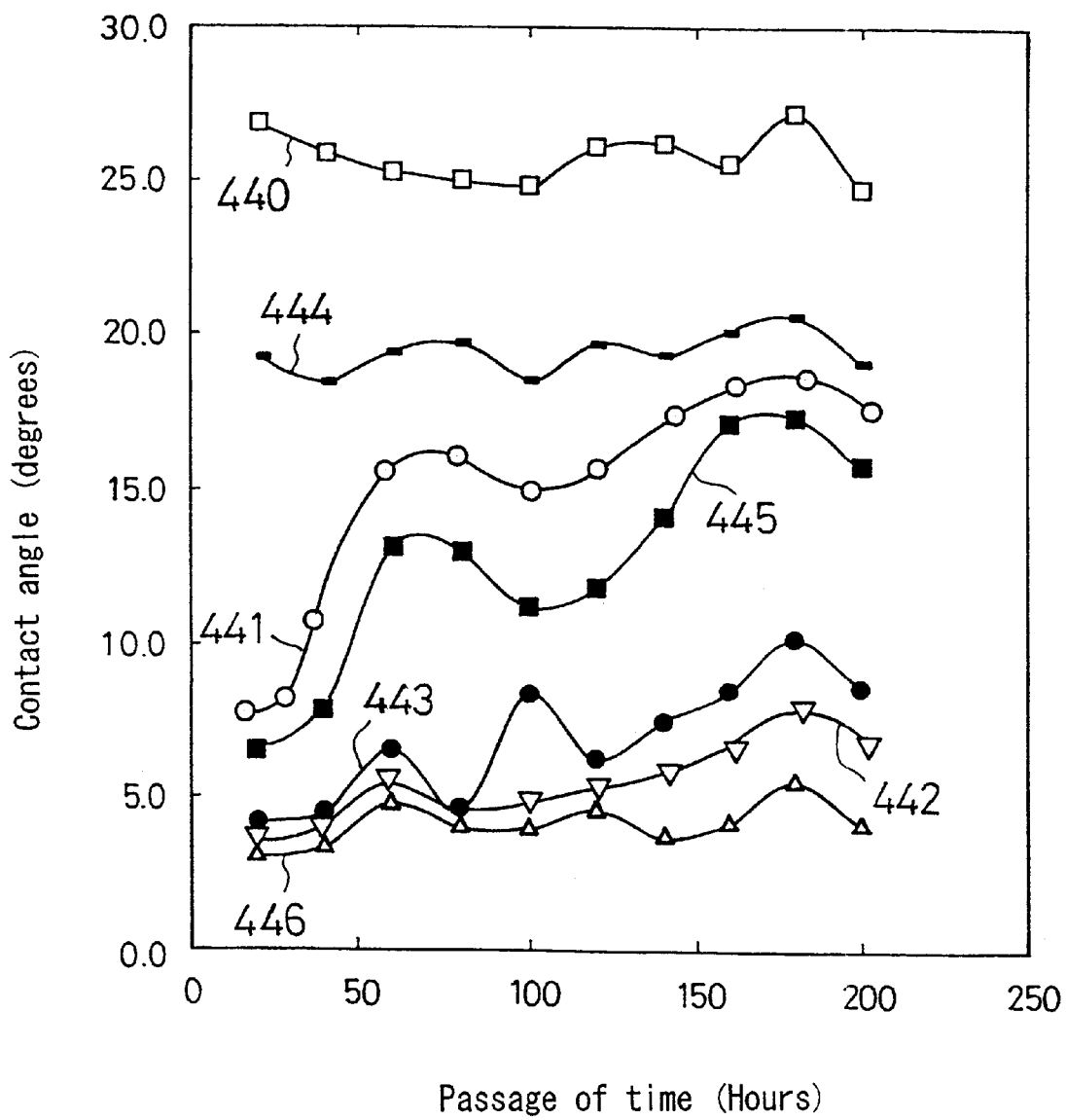
FIG. 28 is a graph showing the adsorption performance of various adsorbents against organic contaminants causing surface contamination.

FIG. 28 shows a graph showing the contact angle change with passage of time with respect to above-mentioned 6 adsorbents. All the test pieces showed a contact angle of about 3° immediately after rinsing it. In this figure, a curve 440 shows the contact angle change of the test piece which was exposed to the clean room air, immediately after rinsing it, before passing through any adsorbent. A curve 441 shows the contact angle change of the test piece which was exposed, immediately after rinsing it, to the clean room air passing through an adsorbent which is hydrophilic zeolite with an effective pore diameter of 6 angstroms. A curve 442 shows the contact angle change of the test piece which was exposed, immediately after rinsing it, to the clean room air passing through an adsorbent which is hydrophilic zeolite with an effective pore diameter of 8 angstroms. A curve 445 shows the contact angle change of the test piece which was exposed, immediately after rinsing it, to the clean room air passing through an adsorbent which is hydrophobic zeolite with an effective pore diameter of 6 angstroms. A curve 446 shows the contact angle change of the test piece which was exposed, immediately after rinsing it, to the clean room air passing through an adsorbent which is hydrophobic zeolite with an effective pore diameter of 8 angstroms. A curve 443 shows the contact angle change of the test piece which was exposed, immediately after rinsing it, to the clean room air passing through an adsorbent of which the main component is activated charcoal made of a natural raw material. A curve 444 shows the contact angle change of the test piece which was exposed, immediately after rinsing it, to the clean room air passing through an adsorbent of which the main component is activated charcoal made of a synthetic material.

The following will be learned from FIG. 28.

1. Regarding excellence of adsorption power, 6 adsorbents can be lined up in the order of the curve 446 (hydrophobic zeolite with an effective pore diameter of 8 angstroms)>the curve 442 (hydrophilic zeolite with an effective pore diameter of 8 angstroms)>the curve 443 (activated charcoal made of a natural raw material)>the curve 445 (hydrophobic zeolite with an effective pore diameter of 6 angstroms)>the curve 441 (hydrophilic zeolite with an effective pore diameter of 6 angstroms)>the curve 444 (activated charcoal made of a synthetic material). The activated charcoal made of a synthetic material has an especially poor adsorption power.

2. Hydrophilic zeolite with an effective pore diameter of 6 angstrom (curve 441) begins to lower its adsorption power when the time of flowing the clean room air therethrough exceeds about 30 hours. Both of hydrophobic zeolite with an effective pore diameter of 6 angstroms (curve 445) and the activated charcoal made of a natural raw (curve 443) begin to lower their adsorption power when the time of flowing the clean room air therethrough exceeds about 50 hours.

3. Hydrophilic zeolite with an effective pore diameter of 8 angstroms (curve 442) may maintain its adsorption power until the time of flowing the clean room air therethrough goes up to 120 hours. Hydrophobic zeolite with an effective pore diameter of 8 angstroms (curve 446) and the activated charcoal made of a synthetic material (curve 444) may maintain their adsorption power until the time of flowing the clean room air therethrough reaches 200 hours.

4. When comparing adsorption power of hydrophilic zeolite having an effective pore diameter of 6 angstroms (curve 441) with hydrophilic zeolite having an effective pore diameter of 8 angstroms (curve 442) in terms of the contact angle at the beginning stage of their use i.e. before their adsorption power begins to go down, it will be understood that the former (curve 441) changes the contact angle from 3° to 7.8° while the latter (curve 442) changes it from 3° to 3.5°. Similarly, when comparing adsorption power between hydrophobic zeolite having an effective pore diameter of 6 angstroms (curve 445) and hydrophobic zeolite having an effective pore diameter of 8 angstroms (curve 446) in terms of the contact angle at the beginning stage of their use i.e. before their adsorption power begins to go down, it is also understood that the former (curve 445) changes the contact angle from 3° to 6.4° while the latter (curve 446) changes it from 3° to 3.1°. From these results, it may be determined that hydrophilic or hydrophobic zeolite having an effective pore diameter of 8 angstroms can completely remove a very small quantity of organic substances contained in the clean room air, while hydrophilic or hydrophobic zeolite with an effective pore diameter of 6 angstroms can not completely remove such organic substances and possibly allow some of them to pass therethrough.

5. Hydrophilic or hydrophobic zeolite with an effective pore diameter of 8 angstroms (curves 442 or 446) and activated charcoal made of a natural material (curve 443) have better adsorption power by far than hydrophilic or hydrophobic zeolite with an effective pore diameter of 6 angstroms (curves 441 or 445) and activated charcoal made of a synthetic material (curve 444). Zeolite can not adsorb any molecular of which size is larger than its effective pore diameter. Consequently, the fact that hydrophilic or hydrophobic zeolite with an effective pore diameter of 8 angstroms (curves 442 and 446) has completely adsorbed a very small amount of organic substances contained in the clean room air, indicates that the molecular size of almost all the organic substances contained in the clean room air is at least less than 8 at the stage where the experiment results as shown in FIG. 28 were obtained. On one hand, the above fact also indicates that hydrophilic or hydrophobic zeolite with an effective pore diameter of 6 angstroms has adsorption power satisfiable to some extent but still permits some of organic substances to pass therethrough. Consequently, it is considered that organic substances which are not caught by these adsorbents may have a molecular size larger than 6 angstroms but smaller than 8 angstroms.

Further comparison study was carried out on the humidity control in the clean room according to the invention. More specifically, there was studied the change of relative humidity in two clean rooms such as shown in FIG. 1, one being provided with hydrophobic zeolite filters according to the invention, and the other being provided with ordinary chemical filters which are made, for instance, in the form of a nonwoven fabric by interweaving fibrous activated charcoal with polyester fibers having a low melting point. For operation, the temperature and humidity of these clean rooms were commonly preset as 23° C. and 50% RH respectively, and other conditions were set equal to each other except difference in a sort of the filter. One humidity sensor was set in the outdoor air intake circuit provided downstream from the air conditioner unit which removes airborne dust particles and regulates the temperature and humidity of the clean room, and the filter for filtering the outdoor air. The water supply valve of the humidity regulator in the air conditioner unit is regulated based on a signal from the humidity sensor. Another humidity sensor was installed in the clean room itself in order to see what influence is given to the relative humidity of the clean room air by different filters. The intake volume of the outdoor air was set as 200 m$^3$/min to the volume of the air which was circulated in the clean room at a rate of 5000 m$^3$/min.

Figure 29:
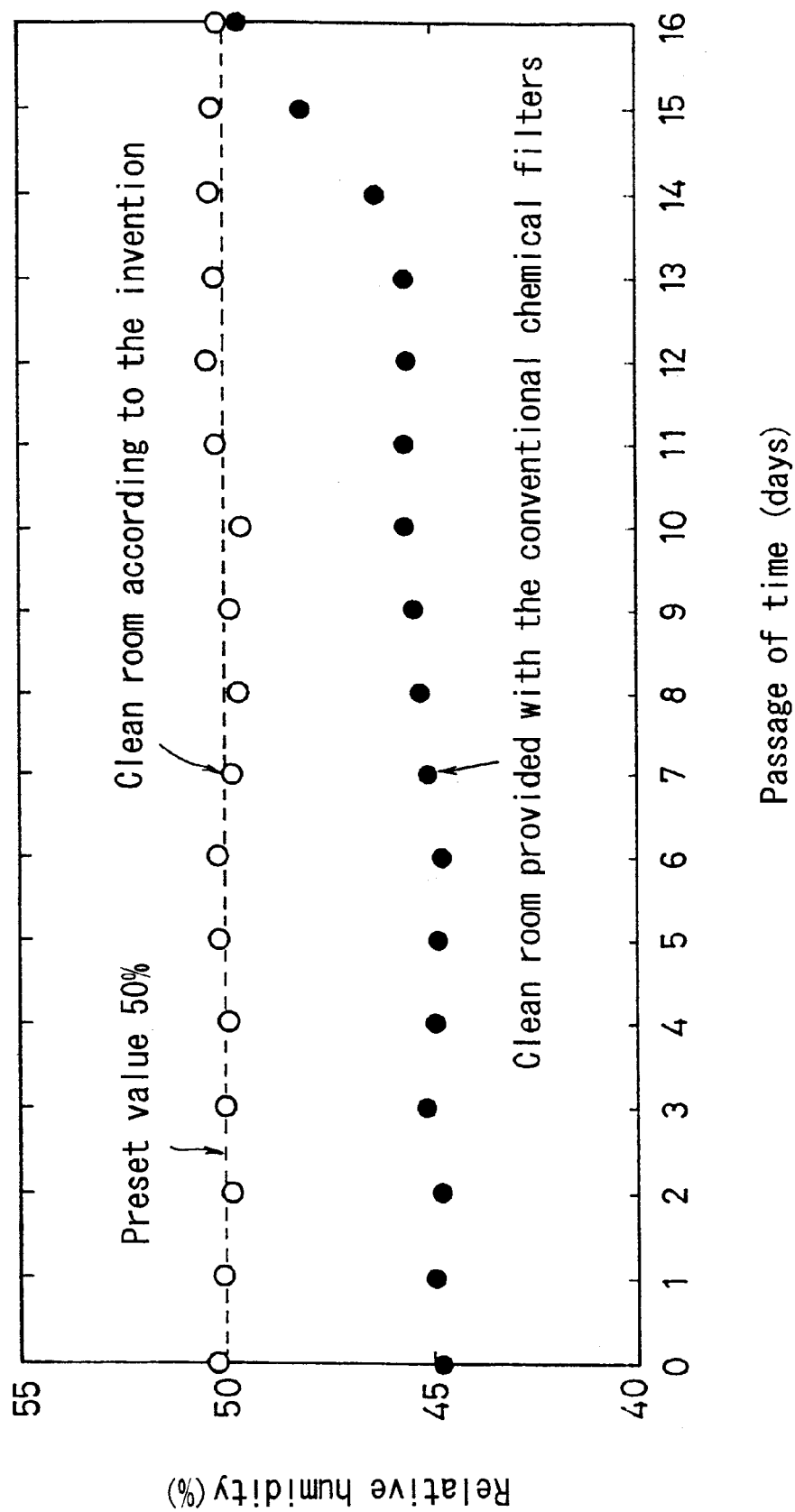
FIG. 29 is a graph showing change of relative humidity which is caused by a clean room with a hydrophobic zeolite and a clean room with a prior art chemical filter.

FIG. 29 is a graph showing the results obtained from the above comparison study. In case of the clean room provided with the above chemical (activated charcoal) filters, since activated charcoal well adsorbs moisture contained in the air passing through the filters, the relative humidity of the clean room air was maintained at a level of about 45% which is lower by 5% than a preset value of 50% for about 2 weeks after starting operation of the clean room, during which the activated charcoal comes to equilibrium with moisture in which condition moisture is no more absorbed by the activated charcoal. Contrary to this, in case of the clean room provided with the chemical (hydrophobic zeolite) filters of the invention, since hydrophobic zeolite scarcely adsorbs moisture contained in the air passing through the filters, the relative humidity of the clean room could be maintained at a level of 50% as preset initially. If the relative humidity becomes lower than the preset value in the process of manufacturing LSI's or LCD's, static electricity is easily generated on the silicon wafer substrate surface or on the glass substrate surface, thereby microscopic particulate contaminants in the air being attracted to the substrate surface, electrostatic breakdown being caused on the substrate surface, and production yield being worsened. Accordingly, in the clean room provided with conventional chemical filters, a drop in the production yield took place for about 2 weeks. Contrary to this, in case of the clean room provided with the filters according to the invention, the relative humidity could be maintained at a preset value, so that there was caused no drop in the production yield.

Figure 30:
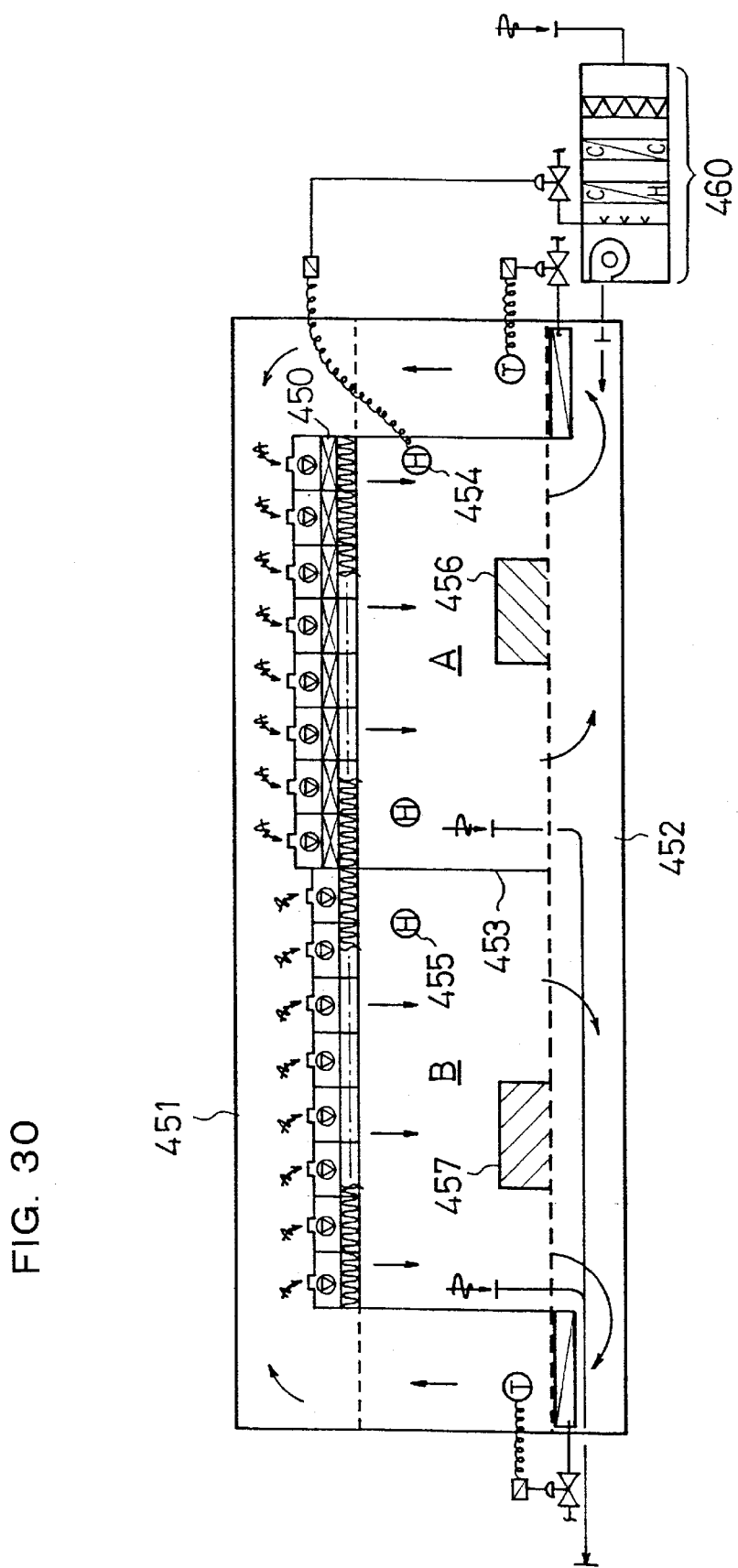
FIG. 30 is an illustration for explaining inconvenience in the prior art humidity control.

Furthermore, another comparison study was made on the humidity control with respect to two clean rooms A and B as shown in FIG. 30, which are provided with different air filters. The clean room A is provided with conventional chemical filters 450 including fibrous activated charcoal as its main filter media, and the clean room B is provided with no chemical filter as such. Both clean room A and B are communicated with each other only through their ceiling portion (supply plenum) 451 and under-floor portion (return plenum) 452. However, their portions other than two plenums are completely isolated from each other by a partition wall 453. Also, as shown in FIG. 30, a humidity sensor 454 is set in the clean room A. In the clean room A, there is provided a device 456 for applying a necessary pretreatment to a silicon wafer before forming a gate oxide film thereon. On one hand, in the clean room B, there is provided a device 457 for applying a silicide process to the silicon wafer. The above two clean room A and B are operated under the condition in which the ambient temperature and relative humidity are preset at 23° C. and 50%, respectively.

Table 4 shows an allowable concentration of chemical contaminants (ppt) necessary for the 25 micrometer process ('98 and thereafter) included in the article entitled 'Forecast Of Airborne Molecular Contamination Limits For The 0.25 Micron High Performance Logic Process' of Technology Transfer #95052812A-TR published by SEMATECH (U.S.A.) on May 31, 1995.

TABLE 4

| Process Step | Max Sit Time | Acid | Alkali | Organic Matter | Dopant |
|---|---|---|---|---|---|
| Pre-Gate oxidation | 4 | 13,000 | 13,000 | 1,000 | 0.1 |
|  |  | 50% | 50% | 75% | 90% |
| Salicidation | 1 | 180 | 13,000 | 35,000 | 1,000 |
|  |  | 50% | 25% | 75% | 75% |
| Contact Formation | 24 | 5 | 13,000 | 2,000 | 100,000 |
|  |  | 50% | 25% | 75% | 75% |

TABLE 4-continued

| Process Step | Max Sit Time | Acid | Alkali | Organic Matter | Dopant |
|---|---|---|---|---|---|
| DUV Photolithography | 2 | 10,000 75% | <u>1,000</u> 90% | 100,000 50% | 10,000 50% |

In the table 4, the values underlined indicate that a strict control should be carried out so as to severely keep those values. Also, the value expressed in percentage (%) indicates reliability of the data from which the allowable values are derived. The maximum allowable concentration of organic impurities is severely set as 1 ppb for the pre-gate oxidation before forming the gate oxide film and 2 ppb for the contact formation, respectively. Therefore, the severe control of organic substances is required for these two processes. However, it is not so severely set for the salicidation and the DUV photolithography, namely 35 ppb for the former and 100 ppb for the latter, respectively. Therefore, no organic substance control is required for the latter two processes.

Figure 31:
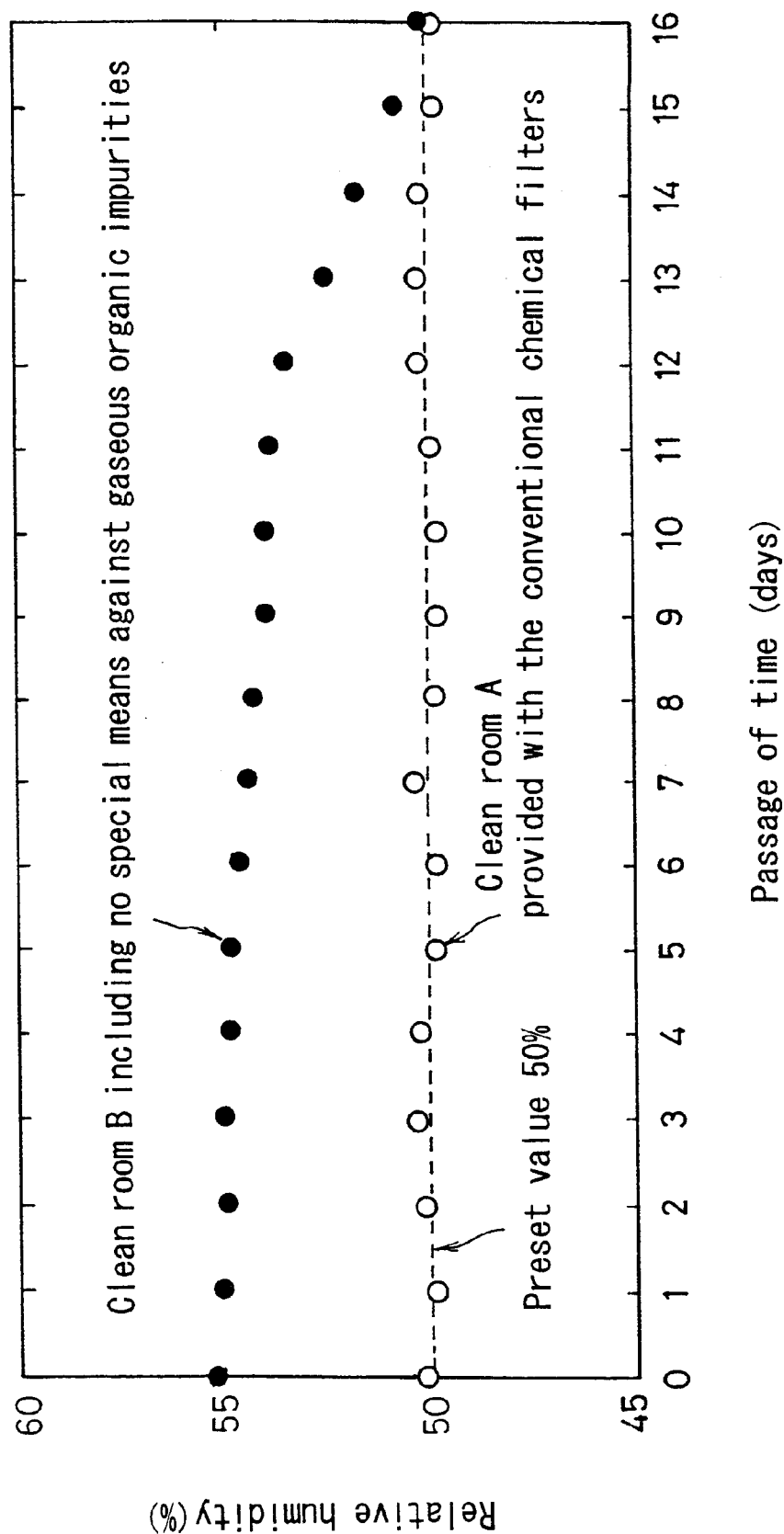
FIG. 31 is a graph showing results of humidity control performed with the system shown in FIG. 30.

FIG. 31 shows the results of humidity measurement performed with regard to clean room A and B. In the clean room A, the chemical filters 450 installed therein well adsorb moisture contained in the air passing therethrough. However, the quantity of moisture adsorbed by the chemical filter is immediately supplemented from the humidity regulating portion of the air conditioner unit 460 in response to the signal from the humidity sensor 454 in the clean room A until the chemical filter (activated charcoal) comes to equilibrium with moisture in which condition moisture is no more absorbed by the activated charcoal, i.e. for the period of about 2 weeks. Consequently, the relative humidity in the clean room can be maintained at a value of 50% as initially preset. Contrary to this, in case of the clean room B provided with no chemical filter, the humidity sensor 455 as set therein honestly displays the influence of excess water supplemented from the humidity regulation portion of the air conditioner unit 460. Namely, the humidity of the clean room B goes up to 55% higher by 5% than the preset value during the about 2-week operation. Therefore, the silicon wafer surface excessively adsorbed moisture and was inconveniently oxidized comparing to the case where the humidity is kept at 50%. When operating the clean room A after replacing its all the conventional chemical filters with those which are provided with hydrophobic zeolite fixed to the honeycomb structure, the relative humidity of the clean room B could be maintained at the level as preset initially, and any inconvenience as mentioned above was not caused.

Next, further comparison study was made with respect to the influence given by two particle filters, one being formed of only materials which do not generate any gaseous organic impurities and the other being formed of materials generating gaseous organic impurities, of which each is disposed downstream from the filter which provided with the hydrophobic zeolite fixed to honeycomb structure. A test piece (silicon wafer covered with silicon dioxide film) was left in the clean room immediately after completely removing organic substances from its surface by rinsing it. Then, the contact angle of the test piece surface was measured immediately after rinsing the test piece, and also measured after exposing the test piece to the clean room air for 3 days, thereby determining increase in the contact angle caused by this 3-day exposure. In case of the particle filter formed of only materials generating no gaseous organic impurities, the contact angle makes such a small change as 3° to 4° even after the 3-day exposure. This means that gaseous organic impurities are almost adsorbed and the particle filter does not generate any gaseous organic impurities by itself. On one hand, in case of the conventional particle filter formed of materials which generates gaseous organic impurities, the contact angle makes such a little larger change as 3° to 5° after the 3-day exposure.

Figure 32:
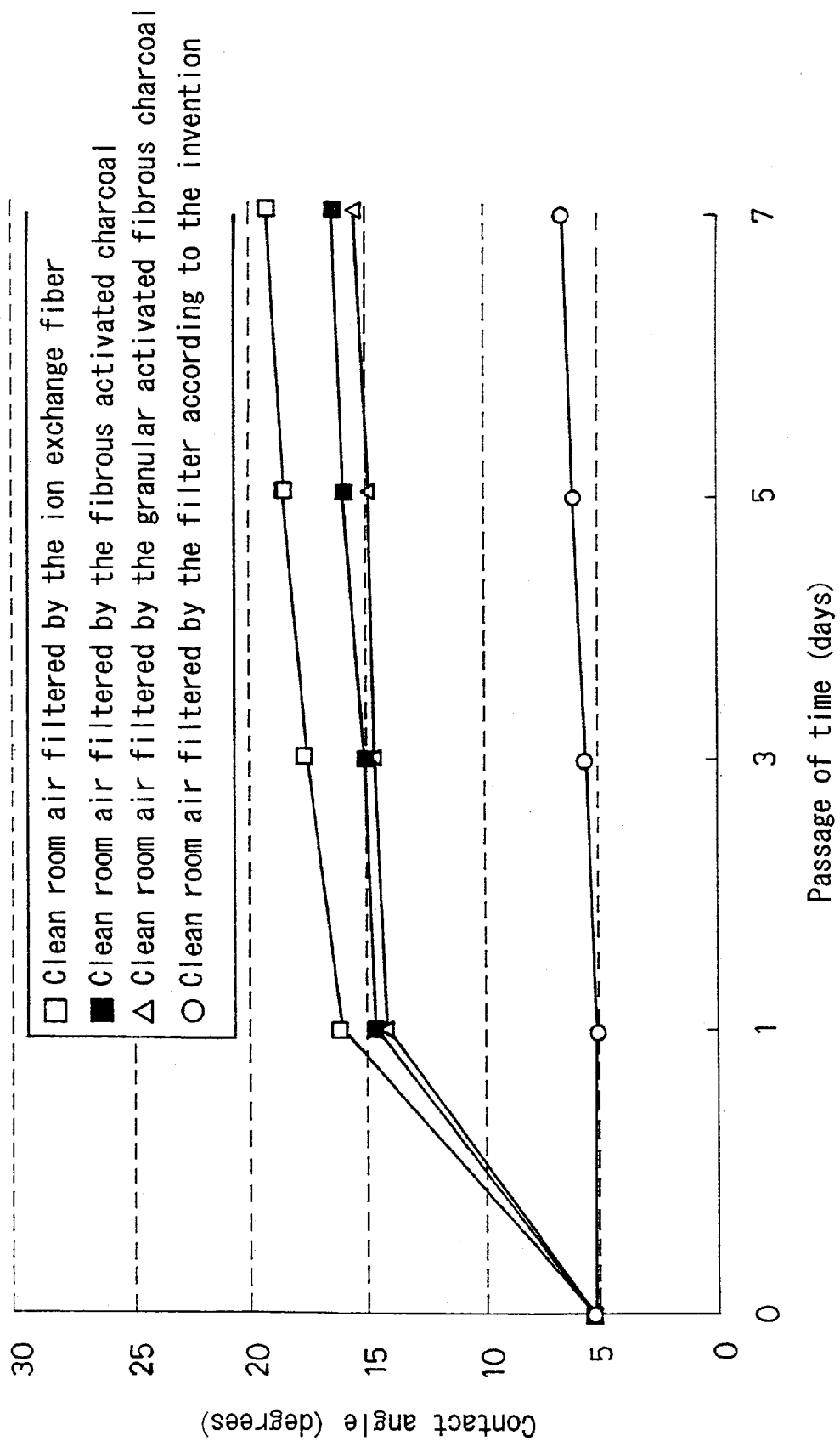
FIG. 32 is a graph showing contact angle change on a silicon wafer surface when exposing it to the air filtered by various chemical filters.
Figure 33A:
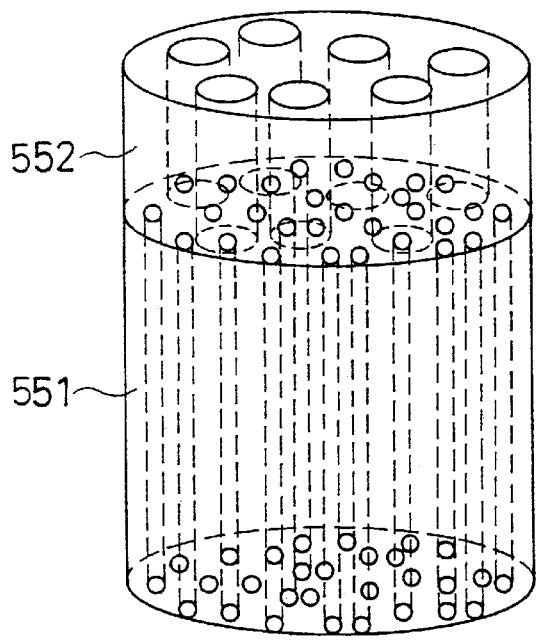
FIGS. 33(a) and (b) are enlarged views of first and second adsorption layers according to the invention A.
Figure 33B:
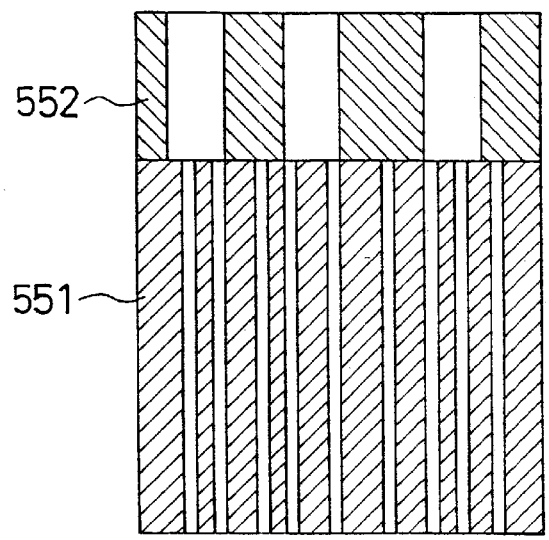
Figure 34A:
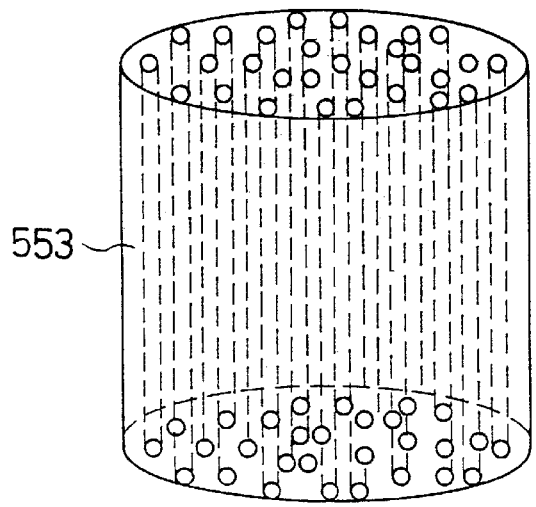
FIGS. 34(a) and (b) are enlarged views of prior art adsorption layer.
Figure 34B:
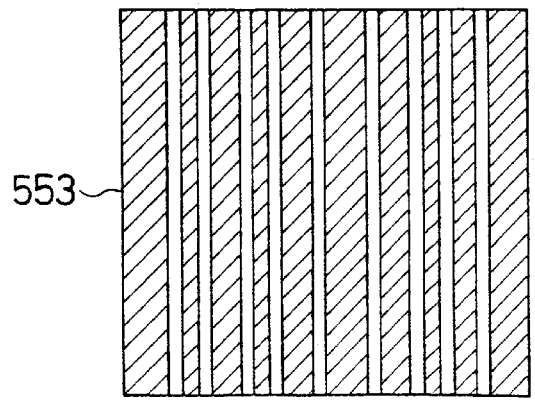
Figure 35A:
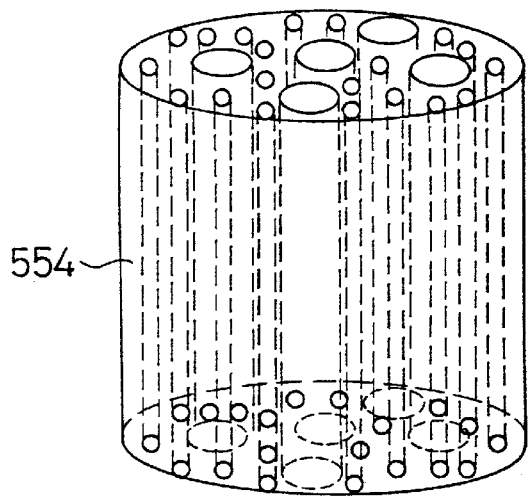
FIGS. 35(a) and (b) are enlarged views of an adsorption layer according to the invention B.
Figure 35B:
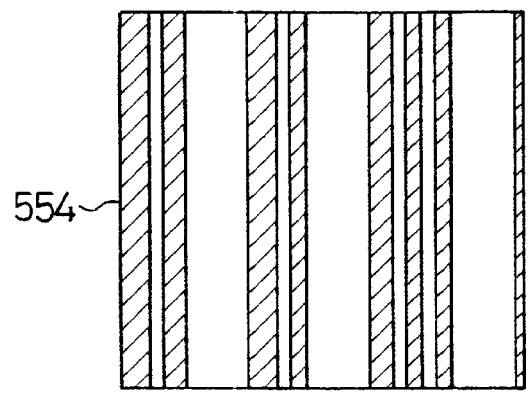
Figure 36A:
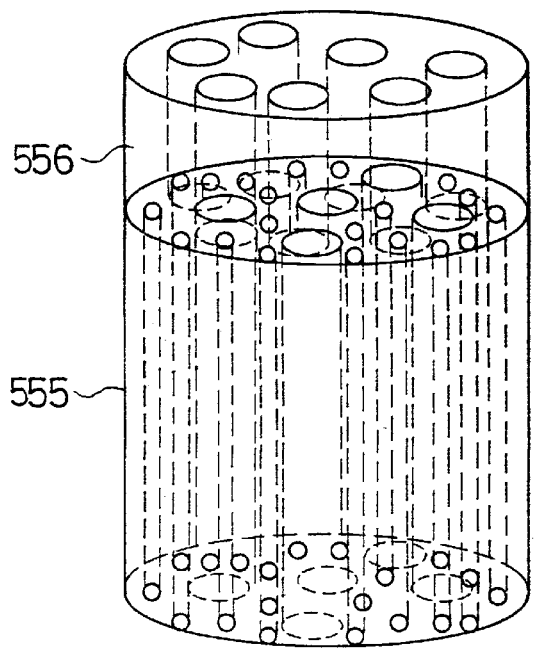
FIGS. 36(a) and (b) are enlarged views of first and second adsorption layers according to the invention C.
Figure 36B:
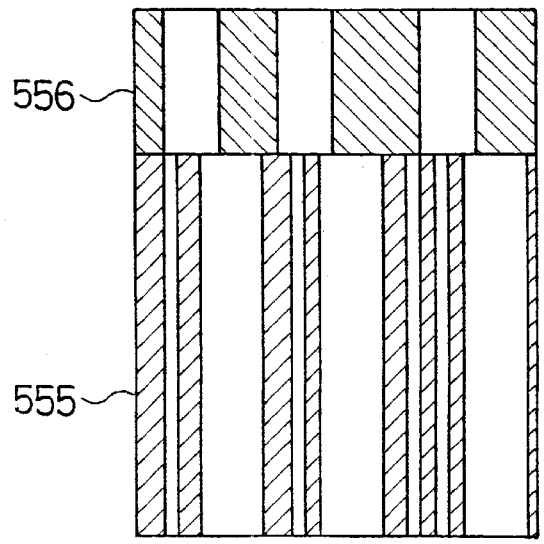
Figure 37A:
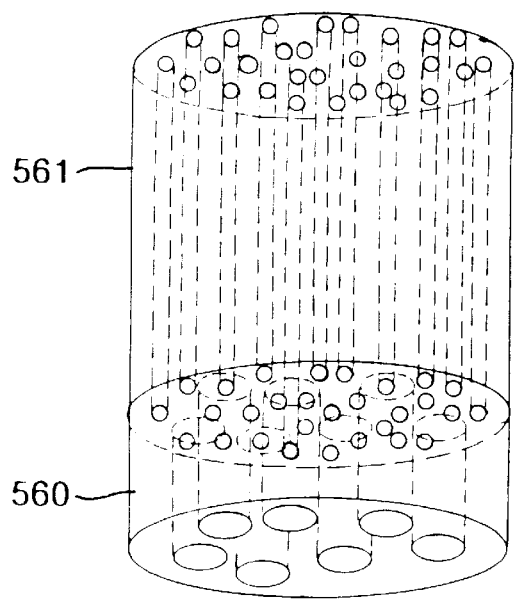
FIGS. 37(a) and (b) are enlarged views of first and second adsorption layers according to the invention D.
Figure 37B:
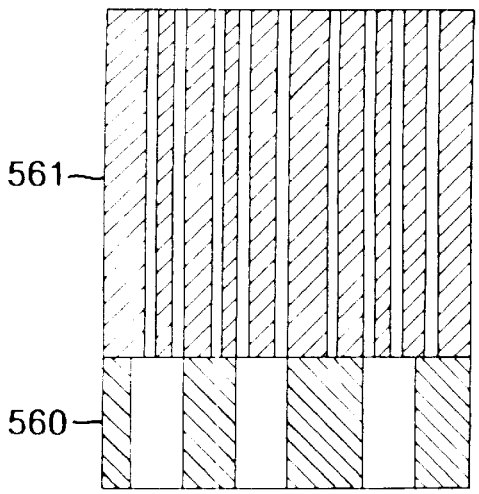
Figure 38A:
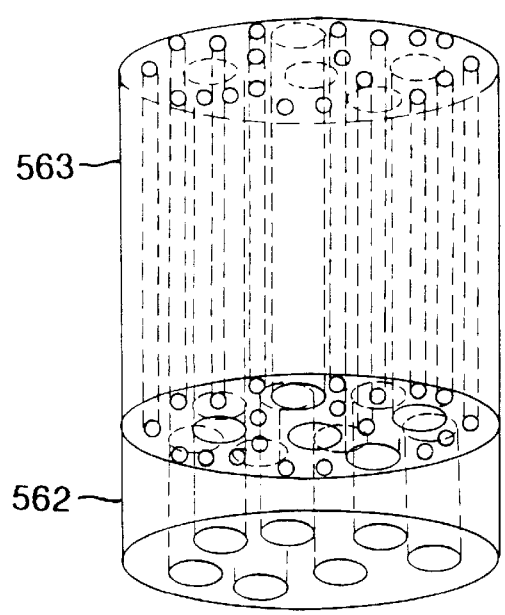
FIG. 38(a) and (b) are enlarged views of first and second adsorption layers according to the invention E.
Figure 38B:
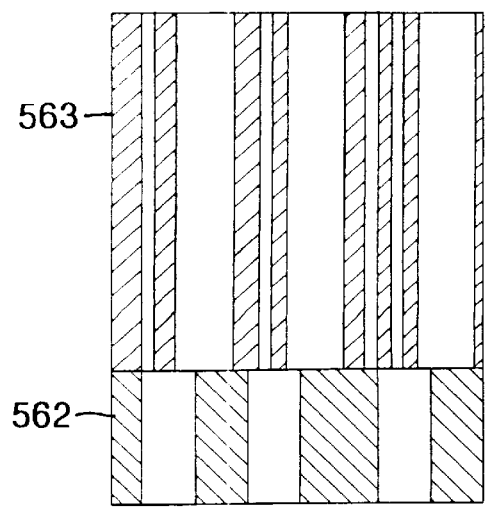

Furthermore, the contact angle change with the passage of time was measured when the test piece being exposed to the clean room air which is filtered by 4 different chemical filters: a chemical filter using granular activated charcoal, a chemical filter using fibrous activated charcoal, a chemical filter using ion exchange fiber, 3 of which are commercially available, and a chemical filter according to the invention. FIG. 32 is a graph showing the results obtained by these contact angle measurements. The above chemical filter according to the invention is formed in the following steps. At first, there are prepared two kinds of suspensions. In the first suspension, there are dispersed a mixture of hydrophobic zeolite powder (size: 4 micrometer; effective pore diameter: 8 angstroms; $SiO_2/Al_2O_3$: 40) as an adsorbent and kaolinite powder (size: 3 micrometer) as the above-mentioned inorganic substance i.e. as a binder, along with silica sol as an inorganic adhesion assisting agent. In the second suspension, there are dispersed activated clay powder (size: 3 micrometer) as an inorganic substance which absorbs gaseous organic impurities and of which the effective pore diameter distributes in the range of 20 to 100 angstroms, along with silica sol as an inorganic adhesion assisting agent. The above-mentioned porous honeycomb structure is first immersed in the first suspension and then dried, thereby forming the first adsorption layer on the surface of the honeycomb structure. In the next, this honeycomb structure is again immersed in the second suspension and dried, thereby forming the second adsorption layer on the above first adsorption layer.

The following will be read from the measurement results shown in FIG. 32. The ion exchange fiber is used mainly for adsorbing and removing water-soluble inorganic impurities, so that it can not adsorb any organic substances. Conversely, it may even generate gaseous organic impurities. Therefore, when leaving a test piece all day long in the clean room air filtered thereby, the contact angle shows increase of about 10°. In case of leaving the test piece all day long in the clean room air filtered by the above-mentioned two kinds of activated charcoal filters, no favorable result was obtained despite that their protection ability against the organic surface contaminant was expected very much, and the contact angle showed increase of about 10°, eventually. The reason why these activated charcoal filters fail to give full play to their ability might exist in their constituent materials such as binder, adhesion assisting agent, sealant, and so forth, which possibly generate a considerable quantity of gaseous organic impurities. Thus, their adsorption power might have been much consumed for adsorbing such gaseous impurities generated by themselves. On one hand, in case of leaving the test piece in the clean room air filtered by the chemical filter according to the invention, gaseous organic impurities were not generated by themselves, so that no increase in the contact angle was observed.

In the next, the protection efficiency of the filter against the surface contaminants was evaluated by measuring the quantity of organic contaminants deposited on the silicon wafer surface. The evaluation was carried out as follows. Two filters were prepared for this purpose, one including the honeycomb structure, on the surface of which the first adsorption (hydrophobic zeolite) layer and the second adsorption (activated clay) layer are formed in sequence in this order, and the other including the honeycomb structure, on the surface of which only the first adsorption (hydrophobic zeolite) layer is formed. The clean room air used for evaluation was contaminated with DOP, DBP, BHT, and decamethyl cyclopenta siloxane ($D_5$) as impurity gases in the range of several hundreds ppt to several ppb. Rinsing the silicon wafer, it was placed upstream from the filter, thereby exposing it to the clean room air doped with the above-mentioned impurities for a preset period of time, and then the quantity of organic impurities deposited thereon was measured. Similarly, this silicon wafer was again rinsed and placed downstream from the filter, thereby exposing it to the clean room air having passed through the filter for the predetermined period of time, and then the quantity of impurities deposited thereon was measured. These measurements were carried out by using gas chromatography-mass spectrometry (GC-MS). The measurement results for the protection efficiency [%] as mentioned later, are shown in Table 5.

TABLE 5

| Gaseous Impurity | Filter of Invention | Filter of Single Layer |
| --- | --- | --- |
| DOP | 99% or more | 95% |
| DBP | 99% or more | 93% |
| BHT | 85% | 40% |
| $D_5$ | 90% | 43% |

A silicon wafer employed for the above evaluation was of p-type and its diameter was 4-inch. Measurement and analysis of organic impurities deposited on the silicon wafer were performed by using an elevated temperature gas desorption device and GC-MS in combination. The protection efficiency of the filter against the surface contaminants was determined by means of gas chromatograph as follows.

The protection efficiency=$(1-(B/A))\times100(\%)$

Where

A: Area of the organic contaminant peak detected on the wafer surface placed upstream from the filter, and B: Area of the organic contaminant peak detected on the wafer surface placed downstream from the filter.

Figure 6:
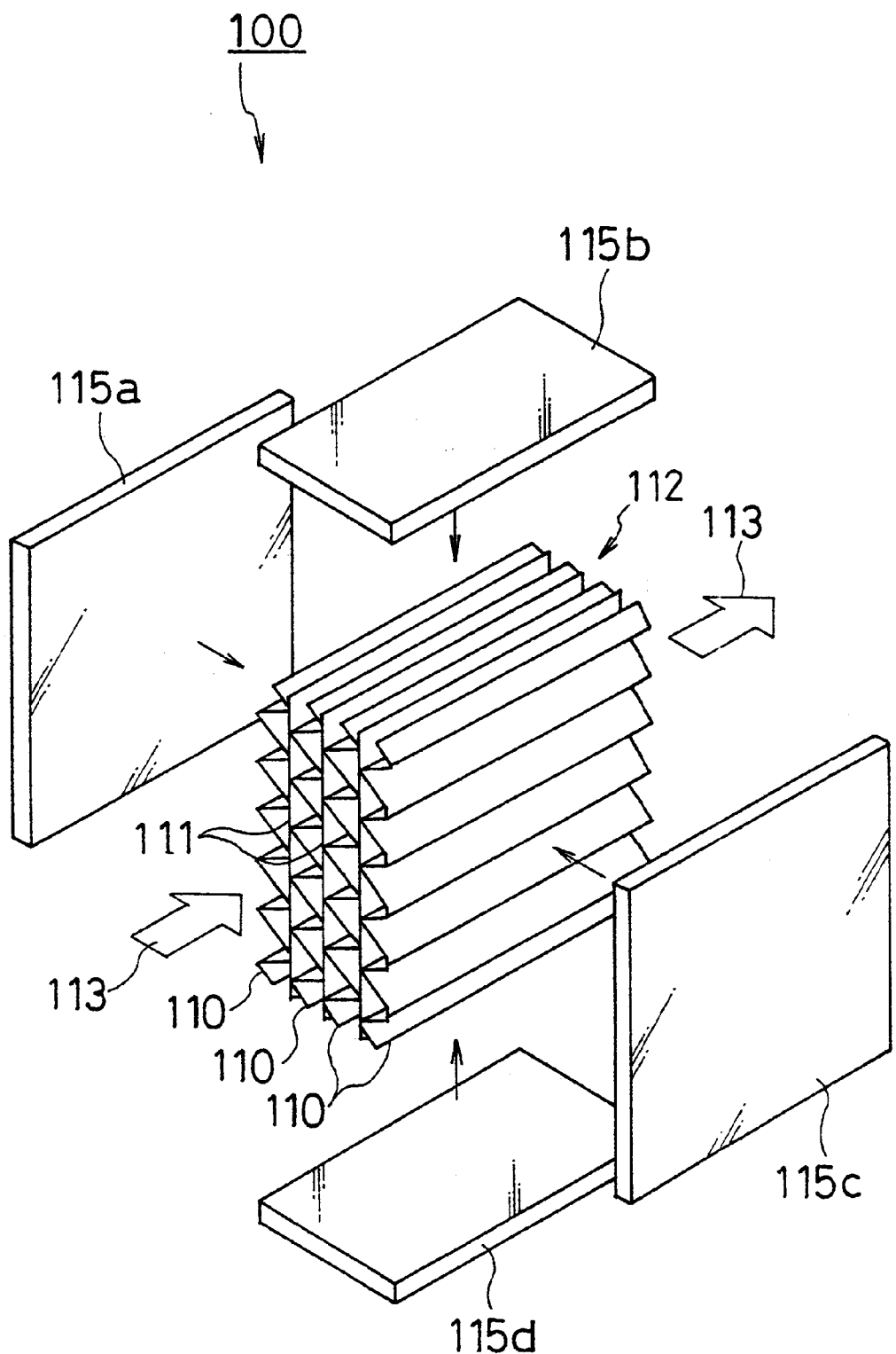
FIG. 6 is a schematic exploded view of a filter according to the second embodiment of the invention.

The filter used for the above measurements had a structure similar to that which is shown in FIG. 6, so-called honeycomb structure, more specifically, this structure being formed by stacking a plurality of corrugated sheet and thin flat sheet in an alternate fashion. The filter had a depth of 10 cm along the direction of the air flow. The air passes through the filter at a face speed of 0.6 m/sec, and the total effective sheet area per unit volume capable of acting on the air passing through the filter (i.e. effective filtration area) was 3000 $m^2/m^3$. This honeycomb structure had the first and second adsorption layers on its surface. The first adsorption layer was formed by immersing the honeycomb structure in the first suspension and drying it while the second adsorption layer was formed by immersing the honeycomb structure already having the first adsorption layer in the second suspension and drying it. In this case, the first suspension consisted of dispersoids which are the mixture of hydrophobic zeolite powder (effective pore diameter: 8 angstrom; size: 3 to 4 micrometer) and kaolinite powder (size: 3 micrometer) as a binder, silica sol as an inorganic adhesion assisting agent, while the above second suspension consisted of dispersoids which are acid treated montmorillonite (activated clay) powder (size: a few micron) and silica sol as an inorganic adhesion assisting agent. The first adsorption layer had a thickness of 100 micrometer and the weight ratio of its first adsorption layer was hydrophobic zeolite:kaolinite:silica=70%:25%:5% while the second adsorption layer had a thickness of 10 micrometer and the weight ratio of its second adsorption layer was acid treated montmorillonite:silica=87%:13%. The weight of an entire filter is 230 g per each liter, while the weight of adsorption layers is 90 g per liter, which corresponds to 39% of the entire filter. For comparison purpose, Table 5 shows the protection efficiency of the filter which includes only the above first adsorption layer. Kaolinite has an effective pore diameter of more than 1000 angstroms, so that it scarcely has ability of physical adsorption. On one hand, activated clay has an effective pore diameter distributing in the range of 20 to 1000 angstroms, so that it is not inferior to activated charcoal with respect to its physical adsorption ability. The shape of the honeycomb structure of this filter and the condition of the air flow passing therethrough are very identical to the shape of and the air flow condition to the filter of the invention as shown in Table 5, except only one point that the former has only the first adsorption layer but has nothing corresponding to the second adsorption layer (activated clay). As will be apparent from Table 5, since each of DOP and DBP has a molecular size smaller than 8 angstroms, both of them can be well adsorbed by means of hydrophobic zeolite even though the binder (i.e. kaolinite) hardly shows ability to physically adsorb them. However, in case of BHT and siloxane ($D_5$), since each of them has a molecular size larger than 8 angstroms, hydrophobic zeolite can not adsorb them. Consequently, provision of the second adsorption layer is inevitably required for removing such impurities.

Table 6 shows the results of another comparison study which was carried out by using filters of various types, namely three filters according to the invention, a filter of the invention having only zeolite adsorption layer, and two filters having the first and second adsorption layers of which formation order on the honeycomb structure surface is altered.

TABLE 6

| Gaseous Impurity | Filter A | Filter A' | Filter B | Filter C | Filter D | Filter E |
| --- | --- | --- | --- | --- | --- | --- |
| DOP | 98% | 95% | 98% | 99% or more | 95% | 98% |
| DBP | 98% | 95% | 98% | 99% or more | 95% | 98% |
| BHT | 85% | 30% | 60% | 85% | 30% | 60% |
| $D_5$ | 90% | 35% | 65% | 90% | 35% | 65% |

In Table 6, a filter A according to the invention includes the first adsorption layer formed of hydrophobic zeolite and the second adsorption layer formed of acid treated montmorillonite (binder), the first adsorption layer being firmly fixed to the honeycomb structure surface, the second adsorption layer being additionally formed on the first adsorption layer, and the air being made in contact with the two layers in the order of the second adsorption layer and the first adsorption layer. A filter A' is a filter having an adsorption layer formed of only hydrophobic zeolite firmly fixed to the honeycomb structure surface. A filter B according to the invention has an adsorption layer firmly fixed to the honeycomb structure surface, the adsorption layer being formed of a mixture of hydrophobic zeolite, acid treated montmorillonite (binder), and alumina sol (inorganic adhesion assisting agent). A filter C according to the invention is a filter having the second adsorption layer which is formed of acid treated montmorillonite (binder) and is additionally formed on the surface of the filter B. A filter D is formed by changing the adhesion order of the first and second adsorption layers of the filter A onto the honeycomb structure surface, thus the first and second adsorption layers being formed of acid treated montmorillonite (binder) and hydrophobic zeolite, respectively. A filter E is formed by changing the adhesion order of the first and second adsorption layers of the filter C onto the honeycomb structure surface, thus the first and second adsorption layers being formed of acid treated montmorillonite (binder) and hydrophobic zeolite plus montmorillonite (binder), respectively.

FIGS. 33 through 38 show various structures of adsorption layers in the above-mentioned filters. Each of figures includes a perspective view (a) and a sectional view (b) of the adsorption layer which is partially cut, in the shape of a cylinder, out of the adsorption layer as shown in FIG. 9 or 15 in such a manner that the height of the cylinder corresponds to the thickness of the adsorption layer. In the figures, there is also shown the distribution model of pores and meso-pores which contribute to adsorption of impurities. Also, in each figure, the supporter (e.g. honeycomb structure) is not shown. In the filter A as shown in FIGS. 33(a) and (b) there are formed the first adsorption layer 551 made of hydrophobic zeolite having an effective pore diameter of about 8 angstroms and the second adsorption layer 552 made of acid treated montmorillonite having an effective pore diameter of about 15 to 300 angstroms. The filter A' as shown in FIGS. 34(a) and (b) includes a single adsorption layer 553 made of hydrophobic zeolite having an effective pore diameter of about 8 angstroms. In the filter B as shown in FIGS. 35(a) and (b) there is formed a single adsorption layer 554 in which hydrophobic zeolite having an effective pore diameter of about 8 angstroms coexists with acid treated montmorillonite having an effective pore diameter of about 15 to 300 angstroms. In the filter C as shown in FIGS. 36(a) and (b) there are formed the first adsorption layer 555 made of hydrophobic zeolite having an effective pore diameter of about 8 angstroms and acid treated montmorillonite having an effective pore diameter of about 15 to 300 angstroms, and the second adsorption layer 556 made of acid treated montmorillonite having an effective pore diameter of about 15 to 300 angstroms. On one hand, in the filter D as shown in FIGS. 37(a) and (b) there are formed the first adsorption layer 560 made of acid treated montmorillonite having an effective pore diameter of about 15 to 300 angstroms and the second adsorption layer 561 made of hydrophobic zeolite having an effective pore diameter of about 8 angstroms. Finally, in the filter E as shown in FIGS. 38(a) and (b) there are formed the first adsorption layer 562 made of acid treated montmorillonite having an effective pore diameter of about 15 to 300 angstroms and the second adsorption layer 563 made of hydrophobic zeolite having an effective pore diameter of about 8 angstroms and acid treated montmorillonite having an effective pore diameter of about 15 to 300 angstroms.

In the similar way as previously described, efficiency of protection against surface contaminants was evaluated with respect to the above-mentioned filters. As will be seen from Table 6, all the filters A, B, and C according to the invention are superior to the filter A' (having a single adsorption layer made of hydrophobic zeolite) with respect to adsorption of all the impurities (DOP, DBP, BHT, siloxane ($D_5$)). Especially, they are superior by far to the filter A' in respect of adsorption of BHT and siloxane ($D_5$). When comparing filters A, B, and C with each other in respect of adsorption of all the organic impurities, they are lined up in the order of C, A and B. The filter D shows an adsorption efficiency comparable with the filter A' with regard to all the impurities. The filter E shows an adsorption efficiency equivalent to that of the filter B. Adsorption of gaseous organic impurities such as BHT and siloxane $D_5$, of which the molecular size is larger than the effective pore diameter of zeolite, depends on the density of the pore of which the effective pore diameter is larger than that of hydrophobic zeolite and is distributed on the surface of the adsorption layer directly getting in contact with an object gaseous impurities. Next, let us consider which is to be first formed on the surface of the supporter (e.g. honeycomb structure), an adsorption layer (I) made of the adsorbent which can be deposited on the supporter surface and has a relatively low density of the pore of which the effective pore diameter is not suitable for adsorbing large molecules such as BHT and siloxane ($D_5$), thus being less effective for large molecules, or an adsorption layer (II) made of the adsorbent which can be deposited on the supporter surface and has a relatively high density of the pore suitable for adsorbing large molecules such as BHT and siloxane ($D_5$), thus being more effective for large molecules. Accordingly, the most preferable formation of a dual adsorption layer structure is to initially form the adsorption layer (I) in contact with the surface of the supporter and then, to form the adsorption layer (II) on the above adsorption layer (I). Thus, it should be noted that if this order is reversed, the adsorption efficiency as to large molecules such as BHT and siloxane ($D_5$) will be apparently made worse.

Adsorption of gaseous organic impurities such as DOP and DBP, of which the molecular size is smaller than the effective pore diameter of zeolite, also depends very much on the density of the pore and meso-pore, which are distributed on the surface of the adsorption layer directly getting in contact with the object gaseous impurities and contribute to physical adsorption thereof. Accordingly, in this case, the first adsorption layer getting in contact with the supporter produces no effect on the adsorption effeciency. However, significance of the second adsorption layer never denies importance of the first adsorption layer. Adsorption efficiency as shown in Table 6 indicates the results of measurement obtained before each of filters is saturated with adsorbed gaseous impurities. The performance of the filter has to be evaluated in terms of not only its adsorption efficiency but also the length of time until it is completely saturated with the adsorbed gaseous impurities, in other words in terms of its life time. Factors determining the life time of the filter are the total volume and area of pores and meso-pores which are constituting an adsorption layer and contribute to physical adsorption of gaseous organic impurities. Accordingly, in order to obtain a filter with a long life, its first and second adsorption layers should be designed so as to include adsorbents which are selected such that the total volume and area of their pores and meso-pores become as large as possible.

Next, another filter according to the invention was evaluated based on the contact angle change with the passage of time through the 3-day exposure test as previously described. In this case, the adsorption layer of this filter was formed of hydrophilic zeolite according to the invention. For 3-day exposure test, there was used the clean room according to the invention (FIG. 16), in the ceiling portion of which there were installed a plurality of clean fan units, of which each includes a fan unit, a filter of the invention, and a particle filter. A silicon wafer covered by a silicon dioxide film formed thereon was used as a test piece. In the test, the contact angle was first measured immediately after rinsing the test piece, and also measured after exposing it to the air of the clean room for 3 days, thereby determining increase in the contact angle caused by this 3-day exposure. This 3-day exposure cycle i.e. rinsing—contact angle measurement—3-day exposure—contact angle measurement, was repeated every 15 days, thereby measuring the adsorption ability change of the filter with the passage of time. The flow rate of the air circulating in the clean room was set as 5000 m$^3$/min while the quantity of hydrophilic zeolite used for cleaning the air was set as 5000 kg in total. The outdoor air was introduced in the clean room at a rate of 200 m$^3$/min, which corresponds to 4% of the total circulating air volume. The entire volume of the clean room was 3120 m$^3$ and the air circulation rate was set as 100 times per hour.

For comparison study, after replacing the filter including a hydrophilic zeolite adsorption layer by a conventional chemical filter of the felt type which is composed of fibrous activated charcoal and a polyester binder, the 3-day exposure cycle was also repeated every 15 days with respect to the test piece similar to the above-mentioned. In this case, the fibrous activated charcoal of 1 kg was used to the air flow at a rate of 1 m$^3$/min. For further comparison study, the 3-day exposure cycle was also repeated every 15 days with respect to a similar test piece under the condition that neither filter with hydrophilic zeolite according to the invention nor conventional chemical filter was installed in the clean room, namely no special countermeasure was taken against gaseous organic impurities contained in the air circulating in the clean room.

Through the experiments by the inventors, it has been statistically determined that a contact angle of 3° in average is made between the surface of the test piece and a pure water droplet dropped thereon when measuring it immediately after rinsing the test piece. Then, in order to evaluate the cleanliness of the air circulating in the clean room, it is assumed that to keep a contact angle of less than 6° after the above 3-day exposure test is a requirement necessary for preventing quality of products from being deteriorated by gaseous organic impurities.

Figure 39:
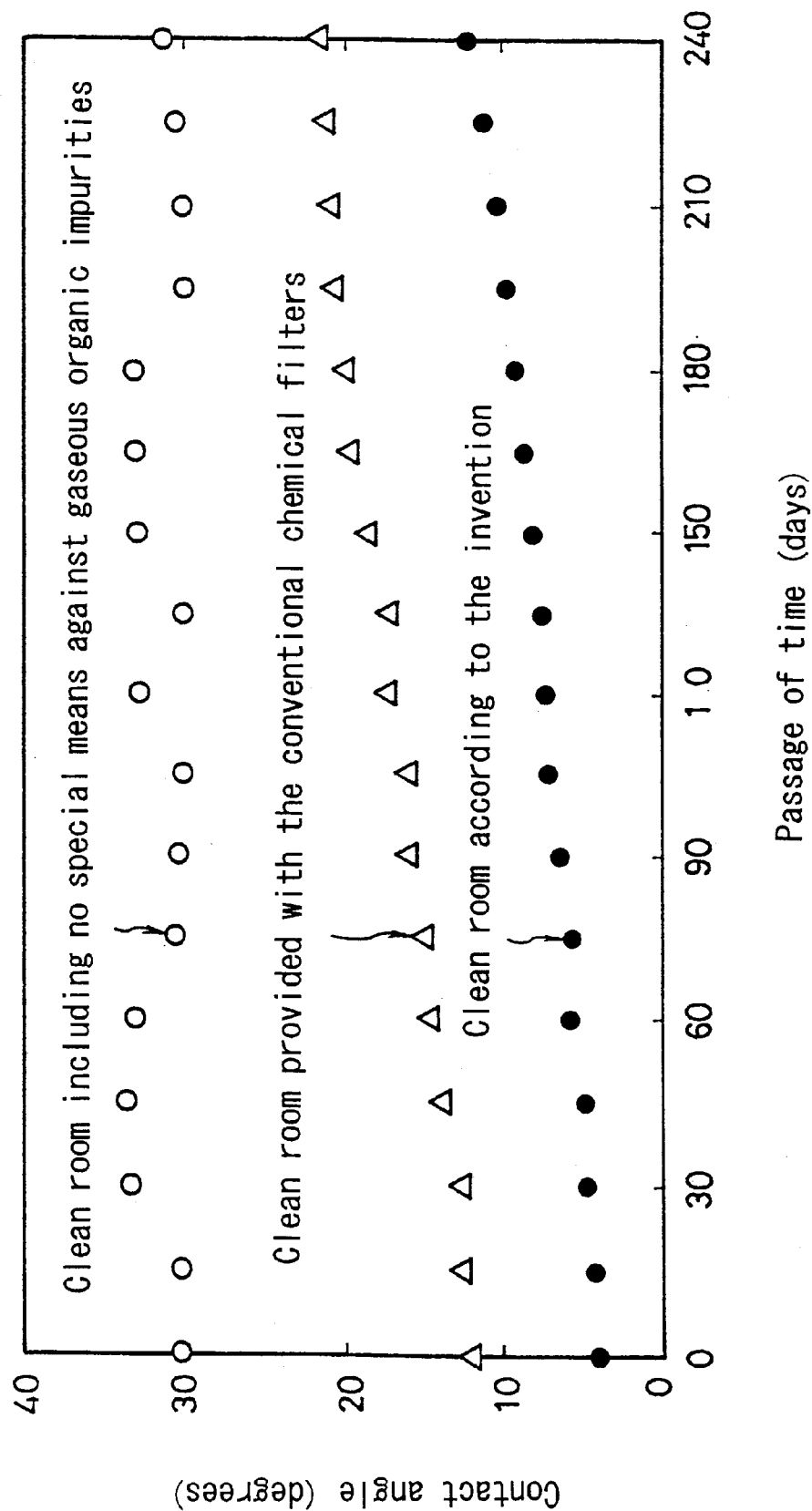
FIG. 39 is a graph showing contact angle change with the passage of time when exposing a silicon wafer having an oxide film formed thereon to various ambiences for 3 days immediately after rinsing it.

FIG. 39 is a graph showing results of contact angle measurement, more specifically the contact angle change with the passage of time after performing the 3-day exposure tests every 15 days in the air cleaned by various filters: (1) in the air circulating through the clean room provided with air filters according to the invention, (2) the air circulating through the clean room provided with conventional chemical filters, and (3) the air circulating through the clean room including no special means against gaseous organic impurities. As will be understood from FIG. 39, the test piece exposed to the air (3) increased its contact angle from 3° (immediately after rinsing) to 29°–33° after the first 3-day exposure test. In case of exposing the test piece to the air (1) cleaned by the filter having the hydrophilic zeolite adsorption layer, the contact angle was kept lower than 4° after the first 3-day exposure test. With the passage of time, however, the adsorption ability of the hydrophilic zeolite layer gradually went down, so that there was increased the concentration of gaseous organic impurities contained in the air passing through the adsorption layer. In other words, the contact angle of the test piece exposed to the air downstream from the filter for a preset period of time was increased with increase of time the air passes through the hydrophilic zeolite layer. However, it will be understood from FIG. 39 that it takes about 3 months until the contact angle of the test piece exposed to the air (1) increases up to 6°, even if the 3-day exposure test is periodically performed every 15 days. On one hand, in case of exposing the test piece to the air (2) filtered by the conventional chemical filter, the contact angle was increased up to 12° even after the first 3-day exposure test. This might be possibly caused by gas originated from polyester which is used as a binder for supporting activated fibrous charcoal. Accordingly, this gas flows out downstream from the chemical filter without being filtered, and directly contaminates the surface of the test piece located downstream from the filter. In case of the conventional chemical filter, the adsorption ability of the activated charcoal also went down with increase of time the air flows therethrough. The contact angle of the test piece exposed to the air filtered with the conventional chemical filter was increased up to 20° when 6 months passed away.

Figure 40:
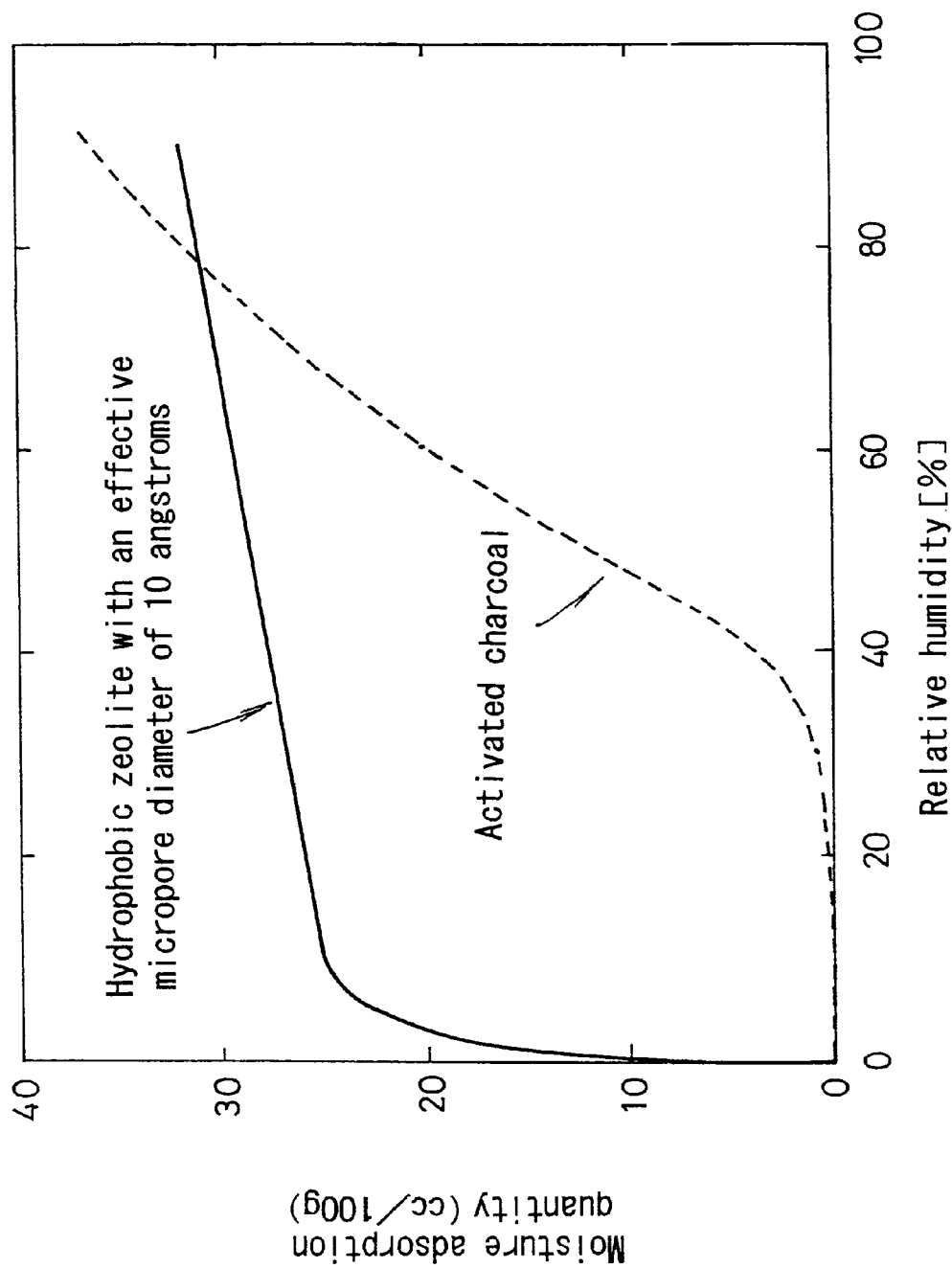
FIG. 40 is a graph showing moisture adsorption isotherm of hydrophilic zeolite and activated charcoal.

There will now be explained about moisture adsorption characteristic of hydrophilic zeolite. FIG. 40 shows a moisture adsorption isotherm which is derived from the data as measured at an ambient temperature of 25° C. with respect to hydrophilic zeolite having an effective pore diameter of 10 angstroms and activated charcoal made of coal. Activated charcoal is easily saturated with moisture with a small increase in the relative humidity of the ambience. For instance, if a fresh chemical filter (activated charcoal) adsorbing no moisture yet is kept in a compartment of which the inside relative humidity is maintained at 20% and is then abruptly transferred to and installed in the clean room which is kept at a relative humidity of 50%, the filter will adsorb a large amount of moisture until it is saturated therewith. The moisture quantity which saturates activated charcoal per unit weight, very much varies depending on the relative humidity of the ambience, for instance 0.004 cc/g at 20% and 0.114 cc/g at 50%, respectively. Thus, the balance 0.11 cc/g is considerably large. On one hand, in case of hydrophilic zeolite with an effective pore diameter of 10 angstroms, it is saturated with the comparatively large quantity of moisture such as 0.262 cc/g at 20%. However, this value is not so largely varied, for instance it being increased only by 0.02 cc/g at 50%. Accordingly, as will be understood from FIG. 40, if a fresh chemical filter (having an adsorption layer formed of hydrophilic zeolite with an effective pore diameter of 10 angstroms) is stored in a compartment which is kept at the relative humidity of about 20%, is transferred to and installed in the clean room with the relative humidity of 50%., the hydrophilic zeolite adsorption layer will hardly adsorb moisture regardless of the moisture control which is performed upstream from the filter. Consequently, there will not be caused such inconvenience that the relative humidity control of the clean room is disturbed (lowered) by the excess moisture adsorption by the chemical filter, especially at the initial stage of clean room operation after installation of fresh chemical filters therein.

Accordingly, there is no need to perform such a very complex work as previously described in connection with the conventional chemical filter using activated charcoal, for instance surveying the relative humidity and temperature of client's clean room before shipping the filters, and then intentionally humidifying the filter (activated charcoal) to meet the temperature and humidity of the client's clean room and further air-tightly packing the humidified filters for shipping thereof. Since relative humidity of less than 20% stands for extremely dried circumstances, the ordinary working space is air-conditioned not with such a very low relative humidity, but usually with the relative humidity of several tens percents. Consequently, different from the activated charcoal filter, there is no need for the filter provided with the hydrophilic zeolite adsorption layer to be humidified and air-tightly packed before shipping thereof.

In the next, the humidity control in the clean room provided with the filter including an adsorption layer formed of hydrophilic zeolite according to the invention was compared with that in the conventional clean room provided with conventional chemical filter. One humidity sensor is arranged in the outdoor air intake circuit provided downstream from the air conditioner unit which removes airborne dust particles and regulates the temperature and humidity of the clean room, and the filter for filtering the outdoor air. The water supply valve of the humidity regulator in the unit type air conditioner is regulated based on a signal from the humidity sensor. Other humidity sensors are arranged one each in both of the above clean rooms for comparing the humidity control in both clean rooms with each other. The outdoor air was introduced at a rate of 200 m$^3$/min to the air which is circulated in the clean room at a rate of 5000 m$^3$/min. In case of the clean room provided with the conventional chemical filter (activated charcoal), since activated charcoal well adsorbs moisture contained in the air passing through the filters, the relative humidity of the clean room is maintained at a level of about 45% lower by 5% than a preset value of 50% for about 2 weeks after starting operation of the clean room, during which the activated charcoal is saturated with moisture. On one hand, in case of the clean room provided with the chemical filter (hydrophobic zeolite) of the invention, since hydrophilic zeolite hardly adsorbs moisture contained in the air passing through the filters, the relative humidity of the clean room can be maintained at a level of 50% as preset initially. Therefore, in the clean room provided with conventional chemical filters, a drop in the production yield took place for about 2 weeks. In contrast, in case of the clean room provided with the filters according to the invention, the relative humidity could be maintained at a preset value, so that there was caused no drop in the production yield.

Next, a filter 311 (FIG. 18) was actually manufactured according to the invention. The first filter portion 311a was formed by firmly fixing synthetic zeolite with an effective pore diameter of 8 angstroms to the honeycomb structure surface. The second filter portion 311b was formed by firmly fixing montmorillonite (activated clay) powder of several microns to the honeycomb structure surface. Physical properties of montmorillonite is already described in the above.

DOP and DBP are the majority of organic contaminants which are detected on the surface of a substrate (e.g. Si wafer, glass) when it is exposed to the air circulating in the clean room. They are included in large quantity in raw materials such as polyvinyl chloride, and of which the molecular size is in the range of 6 to 8 angstroms. Accordingly, if synthetic zeolite with an effective pore diameter of 7 angstroms or more is selected as an adsorbent, the first filter portion 311a may remove the majority of gaseous organic impurities as the substrate surface contaminants. However, BHT and siloxane (D$_6$) of which the molecular size is larger than 8 angstroms are detected to some extent from the surface of the substrate which is exposed to the air circulating in the clean room, so that these can not be removed by the first filter portion 311a. Consequently, these have to be removed at least by means of the second filter portion 311b.

As shown in FIG. 17, the first and second filter portions 311a and 311b were made to have a structure which is formed by alternately stacking the corrugated sheet and the thin flat sheet so as to form a multiple layered structure of them. The filter assembled like the above had a depth of 10 cm along the direction of the air flow. The air was supplied to pass through the filter at a face velocity of 0.6 m/sec, and the total effective sheet area per unit volume acting on the air passing through the filter (i.e. effective filtration area) was 3000 m$^2$/m$^3$.

The honeycomb structure for the first filter portion 311a was formed by immersing the above-mentioned porous honeycomb structure in a suspension and then drying it, the suspension including dispersoids, which are synthetic zeolite powder having an effective pore diameter of 8 angstroms and a grain size of 3 micrometer, and a mixture of kaolin mineral (kaolinite) powder having a grain size of 3 micrometer and silica sol as an inorganic binder. However, talc, bentonite, sodium silicate, silica, or alumina and so on, may be used as an inorganic binder other than the above mixture as the binder. The honeycomb structure for the second filter portion 311b was formed by immersing the above-mentioned porous honeycomb structure in a suspension and then drying it, the suspension including dispersoids, which are activated clay having an effective pore diameter distributing mainly in the range of 20 to 100 angstroms and a grain size of 3 micrometer, and silica sol as an inorganic binder. Activated clay has physical adsorption ability comparable with that of activated charcoal with respect to gaseous organic impurities.

In the first filter portion 311a, the thickness of synthetic zeolite layer was 100 micrometer, and the weight composition of the same was: synthetic zeolite:kaolinite:silica= 70%:25%:5%. In the second filter portion 311b, the thickness of activated clay layer was 10 micrometer, and the weight composition of the same was: activated clay:silica= 87%:13%. In both of filter portions 311a and 311b, the weight of an entire filter is about 250 g per each liter. In the first filter portion 311a, the weight occupied by inorganic material layer is about 90 g per each liter (about 36% of the entire filter weight), while in the second filter portion, the same is about 9 g per each liter (about 3.6% of the entire filter weight). The quantity of activated clay used for the second filter portion 311b was made smaller comparing with that of synthetic zeolite used for the first filter portion 311a, the former being about 1/10 of the latter. This is because adsorption and desorption of moisture by synthetic zeolite are less influenced by the change of the relative humidity, so that the relative humidity control of the clean room is less influenced comparing with the case of using activated charcoal as an adsorbent. However, an inorganic adsorbent such as activated clay is hydrophilic in itself, and shows adsorption and desorption of moisture comparable with activated charcoal, so that it is preferable and necessary to lessen the quantity of activated clay within an allowable range. Furthermore, as previously mentioned, DOP and DBP are the majority of organic impurities which are detected on the surface of a substrate exposed to the air circulating in the clean room. These impurities can be removed by the first filter portion 311a having a synthetic zeolite layer. On one hand, BHT and siloxane (D$_5$) which can be not removed by the first filter portion 311a but removed by the second filter portion 311b, have a considerably smaller concentration in the air than DOP and DBP, and their quantity as detected on the substrate surface is smaller than DOP and DBP. Accordingly, the quantity of activated clay used for the second filter portion 311b can be much less than that of synthetic zeolite used for the first filter portion 311a.

Figure 41:
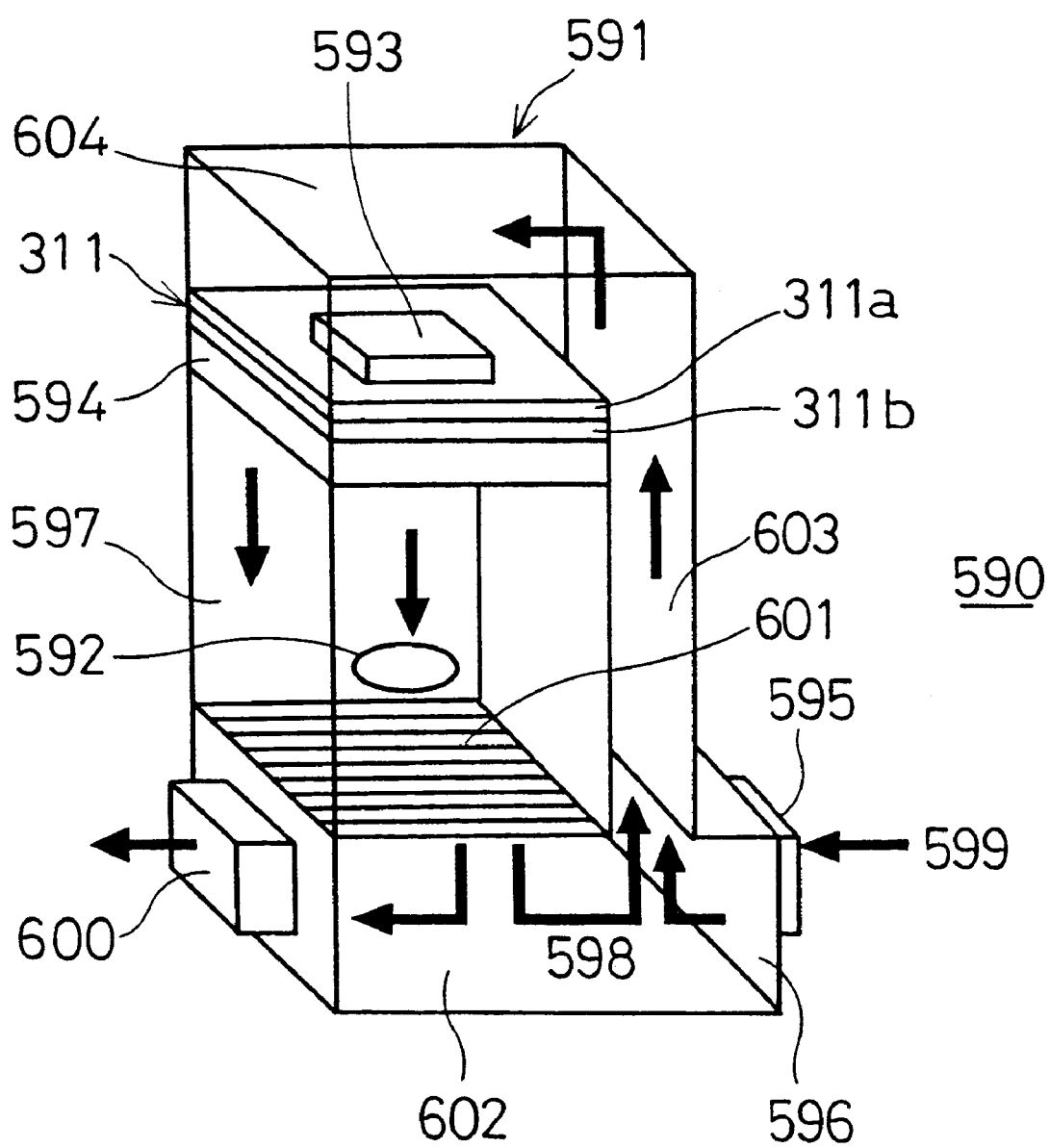
FIG. 41 is a schematic perspective view of a storage compartment constructed or installed in a clean room, on the ceiling of which a filter according to the invention is installed.

FIG. 41 is a perspective view of a storage compartment 591 constructed or installed in a clean room 590, on the ceiling of which the filter 311 according to the invention is installed along with a fan 593, a HEPA filter 594. Another fan 595 takes in the air of clean room 590 into the storage compartment 591 from a clean room 590 through an air inlet 596, and the clean room air 599 is further cleaned through the filter 311 and fills up a working space 597 with the clean room air as filtered ultimately. Under this condition, adsorption ability of the filter 311 was further evaluated by using this storage compartment 591, more specifically the 3-day exposure test as previously described was again carried out in the working space 597, thereby evaluating the adsorption ability of the filter 311 based on the change of contact angle with the passage of time. A silicon wafer substrate 592 covered with a silicon dioxide film was again employed as a test piece for this 3-day exposure test. In the same manner as previously mentioned, the test piece was first rinsed and dried, and immediately exposed to the clean air of the working space 597 for 3 days, and then, the contact angle was measured. This 3-day exposure was repeated every 15 days i.e. rinsing—3-day exposure—contact angle measurement—rinsing—3-day exposure—contact angle measurement— . . . , as mentioned before. The storage compartment 591 was constructed with materials which generate no gaseous organic impurities. Consequently, there is no possibility that the inside of the compartment 591, especially the working space 597 acts as a gaseous organic impurity source.

The air inside the working space 597 was flowed according to arrows shown in FIG. 41, namely flowing through grated panels 601, an under-floor portion 602, a return path 603, and then back to the ceiling portion 604. In the storage compartment, the air was circulated at a rate of 20 m³/min. In order to form necessary adsorption layers for filtering this circulating air, synthetic zeolite of 2 kg was used for the first filter portion 311a of the filter 311 while activated clay of 0.2 kg was used for the second filter portion 311b of the same. The quantity of the clean room air 599 introduced to the storage compartment was set as 0.8 m³/min. , which stands for 4% of the amount of the circulating air 598, and the air equivalent to that which was taken in, was exhausted out of an air outlet 600. The total capacity of the storage compartment was 12 m³, and a rate of air circulation was set as 100 times per hour.

For comparison study, the above 3-day exposure test was also performed with regard to the case where the filter 311 is constituted only with the first filter portion 311a. Still further, the above 3-day exposure test was carried out with respect to the case where no filter 311 is installed on the storage compartment. This means that gaseous organic impurities may enter in the storage compartment without any removal thereof.

Through the experiments by the inventors, it has been statistically determined that a contact angle of 3° in average is made between the surface of the test piece and a pure water droplet dropped thereon when measuring it immediately after rinsing the test piece. Then, in order to evaluate the cleanliness of the air circulating in the storage compartment it is assumed that keeping a contact angle of less than 6° after the above 3-day exposure test is a requirement necessary for preventing quality of products in the storage compartment from being deteriorated by gaseous organic impurity contamination.

Figure 42:
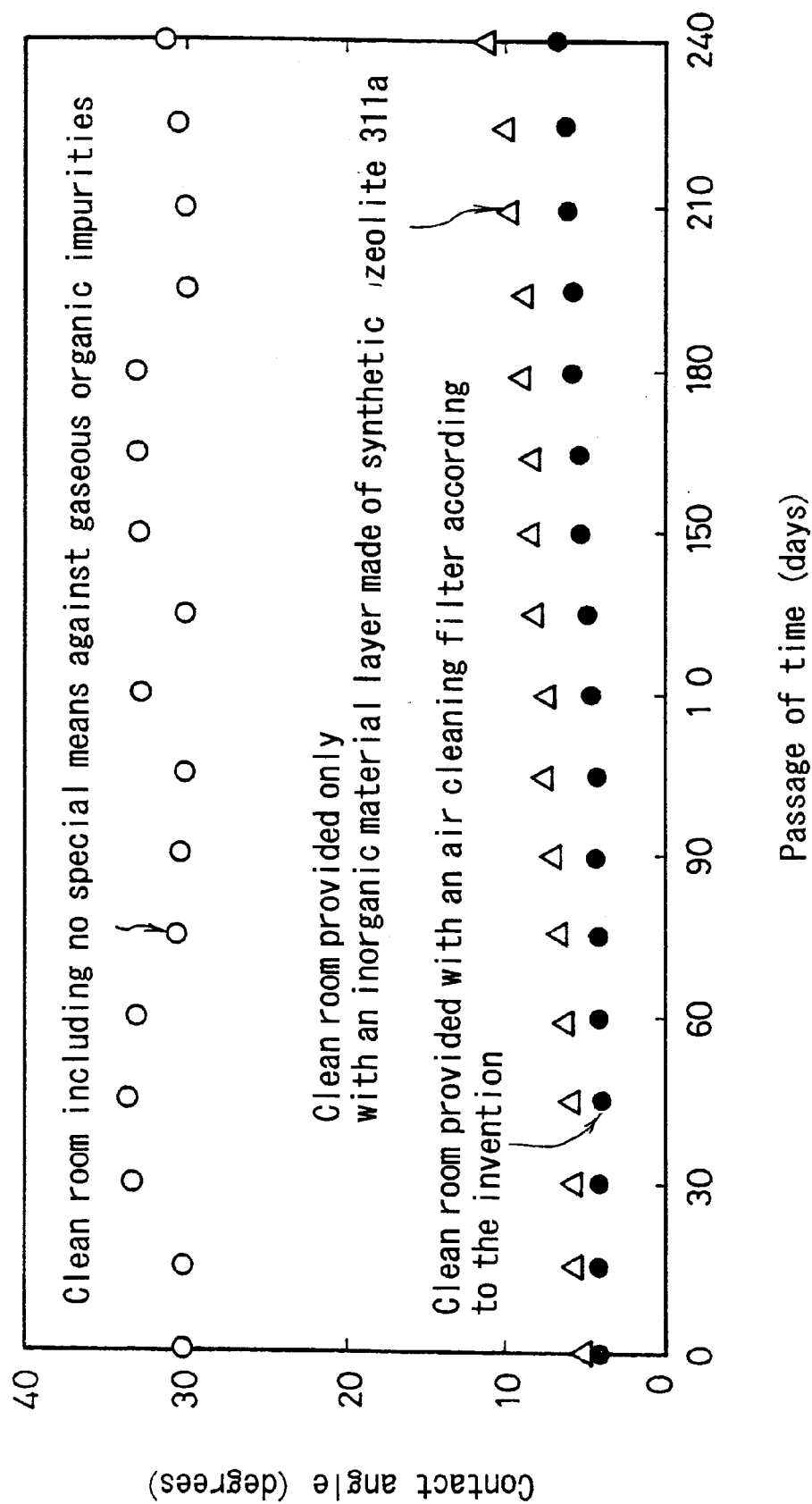
FIG. 42 is a graph showing the effect of a filter according to the invention.

FIG. 42 is a graph showing results of contact angle measurement, more specifically the contact angle change with the passage of time after the 3-day exposure test repeated every 15 days in the air of the working space 597, which is filtered by: (A) the filter 311 formed of the first and second filter portions 311a and 311b according to the invention, (B) the filter formed of only the filter portion 311a, and (C) no special means taken against gaseous organic impurities.

As will be understood from the FIG. 42, the test piece exposed to the air filtered by (C) increased its contact angle from 3° (immediately after rinsing) to 29°–33° after the first 3-day exposure test. In case of exposing the test piece to the air filtered by (A), the contact angle was kept lower than 4° after the first 3-day exposure test. With the passage of time, however, the adsorption ability of the filter 311 went down gradually, so that there was increased the concentration of gaseous organic impurities contained in the air passing through the filter. In other words, the contact angle of the test piece exposed to the filtered air for a preset period of time, was increased with the passage of time the air passes through the filter 311. However, it will be understood from FIG. 42 that it took about 8 months until the contact angle of the test piece exposed to the air filtered by (A) increased up to 6°, even when the 3-day exposure test was repeated every 15 days. On one hand, when the test piece was exposed to the air filtered by (B), the contact angle exceeds 5° even in the first 3-day exposure test, and only 2 months was needed for the contact angle to become 6°.

Figure 43:
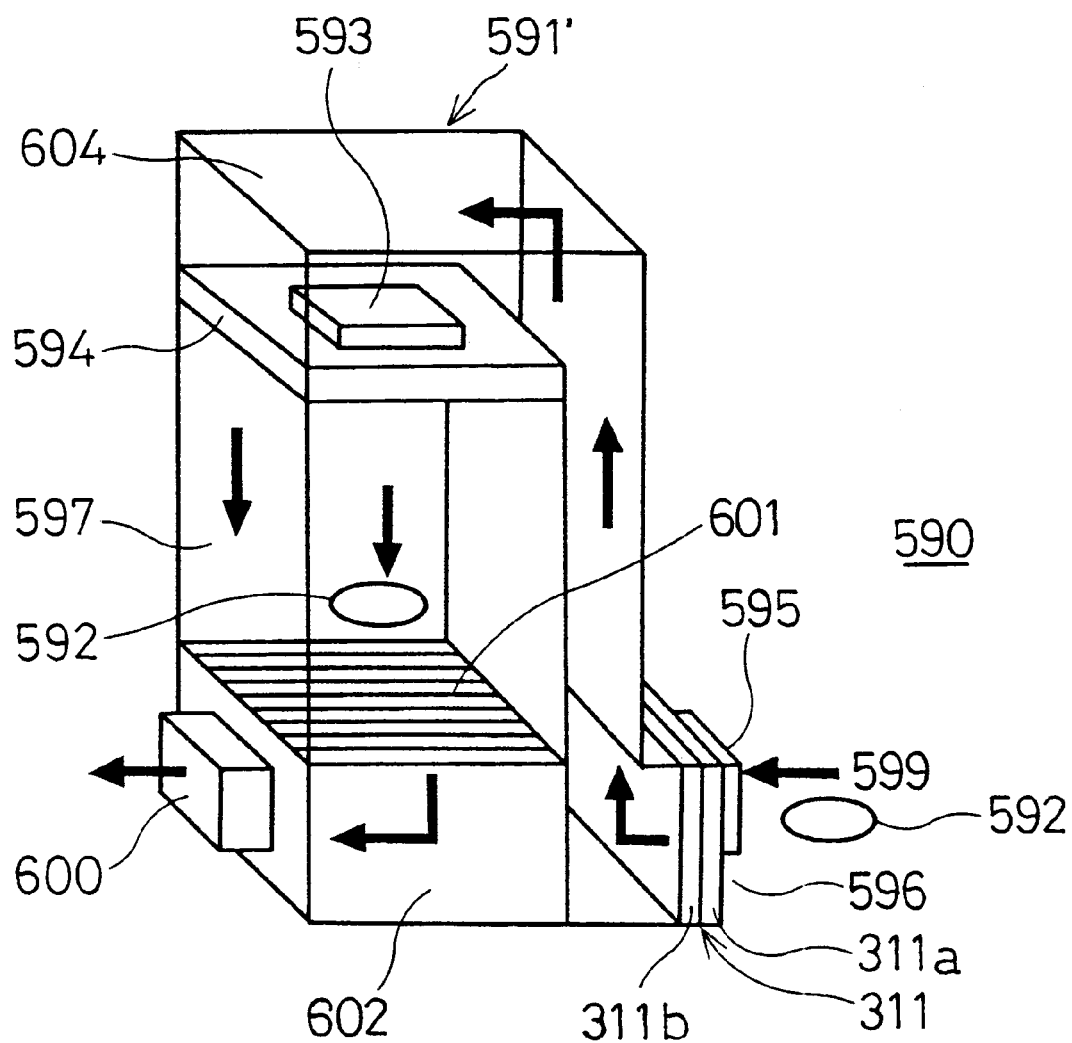
FIG. 43 is a schematic perspective view of a storage compartment constructed or installed in a clean room, in which a filter according to the invention is provided at the intake opening for the clean room air.

In order to clarify this cause in detail, another comparison study was made as follows. That is, the prevention effect against surface contaminants caused by 4 kinds of gaseous organic impurities, DOP, DBP, BHT, $D_5$ (decamethyl cyclopenta siloxane) was examined by using another storage compartment 591' as shown in FIG. 43. More specifically, two cases were compared with each other, namely the first case in which the filter 311 (combination of first and second filter portions 311a, 311b) according to the invention was installed on the intake opening 596 of the clean room air 599, and the second case in which only the first filter portion 311a was installed on the same intake opening 596. It should be noted that the air flow path in the storage compartment 591' (FIG. 43) was different from that in the storage compartment 591 (FIG. 41). The air in the working space 597 in FIG. 43 flowed through grating panels 601, an under-floor portion 602, and an air exhaust opening 600 along arrows as shown. In other words, the air flow path as shown in FIG. 43 is equivalent to the case where the circulation path shown in FIG. 41 is closed in part so as to allow the air to flow in one direction without making any circulation. Concentration of impurities as used for the test is several tens ppb for DOP and DBP, and several ppb for BHT and $D_5$, respectively.

In the test, the test piece was exposed, immediately after being rinsed, to the air in the clean room 590 and to the air of the storage compartment 591' for 4 hours each, and the prevention effect against the surface contamination was evaluated from the quantity of contaminants DOP, DBP, BHT, D, detected on the test piece surface, of which the results are shown in Table 7.

TABLE 7

| | Gaseous Impurity | 1st filter +2nd filter | 1st filter only |
|---|---|---|---|
| Protection Efficiency | DOP | 99% or more | 99% or more |
| | DBP | 95% | 95% |
| | BHT | 90% | 35% |
| | $D_5$ | 90% | 40% |

A 4-inch diameter silicon wafer of p-type was used for the above evaluation. Measurement and analysis of organic substances deposited on the silicon wafer were performed by using an elevated temperature gas desorption device and GC-MS in combination. The protection efficiency of the filter against the surface contaminants is determined by means of gas chromatograph as follows.

The protection efficiency=$(1-(B/A))\times 100(\%)$

Where
- A: Peak area of the organic contaminant detected on the wafer surface placed in the clean room air, and
- B: Peak area of the organic contaminant detected on the wafer surface placed in the storage compartment air.

As will be apparent from Table 7, two of DOP and DBP among 4 kinds of gaseous organic impurities have a molecular size of less than 8 angstroms, so that they are almost removed by the first filter portion 311a, which includes a layer formed of synthetic zeolite having an effective pore diameter of 8 angstroms. However, both of BHT and $D_5$ have a molecular size of more than 8 angstroms, so that they can not be removed by-the first filter portion 311a, but can be removed by the second filter portion 311b, which includes a layer formed of activated clay of which the effective pore diameter is mainly distributed in the range of 20 to 1000 angstroms. Accordingly, as will be apparent from Table 7, in order to achieve more reliable protection of substrate surface against organic impurities contained in the clean room air, it is inevitably required to provide, upstream or downstream from the first filter portion 311a, such a filter as the second filter portion 311b which includes an adsorbent layer capable of adsorbing gaseous organic impurities and is formed of an inorganic material of which the effective pore diameter is larger than that of synthetic zeolite. Single use of the first filter portion 311a can not make it possible to realize the reliable substrate surface protection, because synthetic zeolite fails to adsorb molecules of which the size is larger than the effective pore diameter of synthetic zeolite.

The following is a reason why it is preferable to select hydrophobic synthetic zeolite having an effective pore diameter larger than 7 angstroms.

There has been described so far about organic substances causing substrate surface contamination in the clean room. While a silicon wafer is handled in the clean room, silicon is generally so active in itself that it is more or less naturally oxidized in the air, thus a silicon dioxide film being naturally formed on it. As a result, its surface becomes hydrophilic. Also, it is known that glass substrate handled in the clean room or the like shows a hydrophilic nature because so is glass in itself. Organic substances contained in the atmosphere, which contaminates the hydrophilic surface of a silicon wafer covered with a $SiO_2$ film or glass substrate, can have a hydrophilic group capable of readily making a bond with the hydrophilic surface. Actually, the above-mentioned organic substances causing the surface contamination are hydrophobic polymers, of which each has a high boiling point and includes such a chemical structure as the double bond or benzene ring of carbon and a hydrophobic group, too. At the same time, these polymers may also include a hydrophilic group causing the hydrophilic surface to be contaminated. However, once the clean hydrophilic surface of the silicon wafer or glass substrate has been contaminated with these organic substances, the contaminated hydrophilic surface portion is converted into a hydrophobic surface portion. Since the converted hydrophobic surface easily makes a bond with the hydrophobic group of the above hydrophobic organic substance, the surface contamination by organic substances rapidly proceeds and comes to form a multiple hydrophobic molecular layer, eventually.

As described in the above, the organic substances (a polymer with a high boiling point) causing the surface contamination, include a hydrophobic group, so that it is preferable to select hydrophobic zeolite as an adsorbent because of its having affinity for a hydrophobic group. However, these organic substances also include a hydrophilic group, so that it might be the second better selection to employ hydrophilic zeolite as an adsorbent because of its having affinity for a hydrophilic group. In case of using hydrophobic zeolite, it less adsorbs moisture in the air comparing to activated charcoal and hydrophilic zeolite. Consequently, porous structure of hydrophobic zeolite can be advantageously used for adsorbing gaseous organic impurities without largely losing its adsorption capacity for adsorbing moisture. Therefore, the life of hydrophobic zeolite as an adsorbent of organic substances is elongated by far comparing to activated charcoal and hydrophilic zeolite which have a similar porous structure. On one hand, activated charcoal and hydrophilic zeolite are apt to largely spend the adsorption capacity of their porous structure for adsorbing moisture in the air, and only the remaining adsorption capacity is used for adsorbing organic substances. As a result, their life as an adsorbent of organic substances naturally becomes shorter than that of hydrophobic zeolite by the capacity spent for moisture adsorption.

The moisture adsorption characteristic of synthetic zeolite will now be discussed returning to FIG. 27, in which there is shown a moisture adsorption isotherm of hydrophilic synthetic zeolite with an effective pore diameter of 10 angstroms, measured at an ambient temperature of 25° C. Hydrophilic synthetic zeolite with an effective pore diameter of 10 angstroms shows a considerable large saturated moisture adsorption quantity of 0.262 cc/g at the relative humidity of 20%. However, this quantity is increased only by 0.02 cc/g even if the relative humidity rises from 20% to 50%. This corresponds to only 27% of the increase quantity in the case of activated charcoal. As will be understood from FIG. 27, even though a fresh filter of the invention including a synthetic zeolite adsorption layer which has been stored in the air with a relative humidity of more than 20%, is transferred to and installed in a clean room of which the air is controlled so as to be kept at a relative humidity of 50%, the synthetic zeolite layer will hardly adsorb the moisture which is controlled up stream from the filter. Therefore, different from the case of the conventional chemical filter, there is no possibility that the fresh filter installed in the clean room causes such inconvenience that it lowers the relative humidity of the clean room exceeding the preset value even at the early stage of installation thereof.

As has been described so far, the invention has been discussed in terms of a clean room and a storage compartment as a small sized auxiliary clean room, which are generally used in the manufacturing process of LSI's and LCD's. However, the invention should not be limited to various examples as mentioned above. The invention is applicable to a local clean room which is called 'mini-environment,' clean benches, clean chambers, clean conveyers for transporting clean products, and other air cleaning items in various scales. Also, the invention may be modified in compliance with various operational and environmental conditions such as an air volume to be filtered, a ratio of the intake volume of the outdoor air to the air volume circulating in the clean room, existence of a gaseous organic impurity source inside the clean room, etc. Needless to say, there is no need for the object gas to be limited only to the air. Inert gases such as nitrogen, argon, etc. may be purified by the filter of the invention, thereby producing inert gases most suitable for production of LSI's and LCD's.

For instance, it is now expected that the manufacture of DRAM's of 256-megabit and/or 1-gigabit would start in 1999, using a gigantic silicon wafer with a diameter of 300 mm. In case of the apparatus used for manufacturing such a sophisticated semiconductor device, after introducing and setting the silicon wafer in a chemical reaction chamber of the apparatus, an inert gas such as highly purified nitrogen or argon is adequately supplied to the chemical reaction chamber from an inert gas source so as to fill it up therewith, before initiating predetermined various chemical reactions with the silicon wafer inside the apparatus. The inert gas itself is so highly purified that there is no possibility that it contaminates the surface of the silicon wafer. In order to control supply of the inert gas, however, a valve is provided between the chemical reaction chamber and the inert gas supply source. Therefore, there is the possibility that the valve might work as a source of gaseous organic substances. Accordingly, if the filter of the invention is provided on way of the gas flow path i.e. between the valve and the chemical reaction chamber, it would remove various gaseous organic contaminants which might be generated by the valve, thereby contributing to the prevention of the surface contamination and to enhancement of product quality as well.

POSSIBLE APPLICATION OF INVENTION IN INDUSTRIES

According to the invention, in case of protecting the substrate surface treated in the clean room from being contaminated with gaseous organic substances in the air, since there can be removed both of gaseous organic impurities such as DOP and DBP having a molecular size of less than 8 angstroms and gaseous organic impurities such as BHT and siloxane having a molecular size of more than 8 angstroms. Accordingly:

A. The invention make it possible to produce the clean air which is suitable for manufacture of semiconductor devices and LCD's, and from which there is removed gaseous organic substances causing the substrate surface contamination.

B. In the manufacture of semiconductor devices and LCD's, the above clean air is used for constituting the ambience of the clean room in which the substrate surface is handled being exposed thereto, so that the substrate surface is protected from being contaminated.

Furthermore, according to the invention, zeolite is employed as an adsorbent for adsorbing gaseous organic impurities having a molecular size of less than 8 angstroms, and properly selected various inorganic substances are employed solely or in combination as an adsorbent for adsorbing gaseous organic impurities having a molecular size of more than 8 angstroms. Accordingly:

A. The invention provides a filter which includes no inflammable constituents. Therefore, the clean room which is constructed with this filter, is superior to that which is constructed with conventional activate charcoal filter, from the standpoint of fire prevention.

B. Furthermore, the invention can provide a filter which is formed of materials which do not generate any gaseous organic substances causing the substrate surface contamination. Therefore, the clean room which is constructed with this filter, is superior to that which is constructed with conventional activate charcoal filter, from the standpoint of perfectness in prevention of substrate surface contamination.

C. Still further, the invention can provide a filter which hardly adsorbs moisture in the air and maintains its ability to adsorb gaseous organic impurities for a long period of time, comparing the conventional activated charcoal filter. Therefore, the clean room which is constructed with this filter, is superior to that which is constructed with conventional activate charcoal filter, from the standpoint of easiness in humidity control of the clean room and also from the standpoint of elongated life time thereof.

Use of synthetic zeolite as an adsorbent makes the filter very much safe from the standpoint of fire prevention, comparing to activated charcoal which is classified in an inflammable material group according to the fire laws. If the filter is formed so as to include a honeycomb structure to the surface of which synthetic zeolite is firmly fixed, its vent resistance against the air passing therethrough is made so small. Synthetic zeolite hardly adsorbs moisture in the air when the relative humidity is more than 20%, so that the humidity control by a humidifier provided upstream from the filter is scarcely disturbed with the moisture adsorption of synthetic zeolite, thus the humidity control of the clean room becoming much easier.

What is claimed is:

1. A filter having a base filter media as a supporter for supporting an adsorbent, wherein synthetic hydrophobic zeolite having an effective pore diameter of not less than 7 angstroms as the adsorbent for adsorbing gaseous organic impurities contained in an object ambience, is firmly fixed to the surface of said supporter by using an inorganic substance as binder, said inorganic substance having ability to adsorb gaseous organic impurities and having an effective pore diameter larger than that of zeolite.

2. A filter having a base filter media as a supporter for supporting an adsorbent, wherein a first adsorption layer is formed by firmly fixing synthetic hydrophobic zeolite having an effective pore diameter of not less than 7 angstroms as the adsorbent for adsorbing gaseous organic impurities contained in an object ambience to the surface of said supporter with an inorganic substance as a binder, and a second adsorption layer is formed by firmly fixing another inorganic substance to the surface of said first adsorption layer, said another inorganic substance having ability to adsorb gaseous organic impurities and having an effective pore diameter larger than that of zeolite.

3. A filter having a base filter media as a supporter for supporting an adsorbent, wherein synthetic hydrophobic zeolite having an effective pore diameter of not less than 7 angstroms as an adsorbent for adsorbing gaseous organic impurities contained in an object ambience, is pelletized by using an inorganic substance as a binder, and the resultant zeolite pellets are firmly fixed to the surface of said supporter, said inorganic substance having ability to adsorb gaseous organic impurities and an effective pore diameter larger than that of zeolite.

4. A filter having a base filter media as a supporter for supporting an adsorbent, wherein synthetic hydrophobic zeolite having an effective pore diameter of not less than 7 angstroms as the adsorbent for adsorbing gaseous organic impurities contained in an object ambience, is pelletized by using an inorganic substance as a binder, and the resultant zeolite pellets are coated with another inorganic substance having ability to adsorb gaseous organic impurities and an effective pore diameter larger than that of zeolite.

5. A filter as claimed in claims 1, 2, 3, or 4, wherein said supporter is formed into a honeycomb structure.

6. A filter provided with a casing which is charged with an adsorbent, wherein said adsorbent has a shape of a pellet which is formed by pelletizing a mixture of synthetic hydrophobic zeolite having an effective pore diameter of not less than 7 angstroms for adsorbing gaseous organic impurities contained in an object ambience and an inorganic substance as a binder, said inorganic substance having ability to adsorb gaseous organic impurities and an effective pore diameter larger than that of zeolite.

7. A filter provided with a casing which is charged with an adsorbent, wherein said adsorbent has a shape of a pellet which is formed by pelletizing a mixture of synthetic hydrophobic zeolite having an effective pore diameter of not less than 7 angstroms for adsorbing gaseous organic impurities contained in an object ambience and an inorganic substance as a binder, and said resultant zeolite pellet is further coated with another inorganic substance which has ability to adsorb gaseous organic impurities and an effective pore diameter larger than that of zeolite.

8. A filter as claimed in claims 1, 2, 3, 4, 6 or 7, wherein said inorganic substance adsorbing gaseous organic impurities has an effective pore diameter larger than that of zeolite, and a total volume per unit weight of the pore of said inorganic substance is more than 0.2 cc/g, or a specific surface of the pore of said inorganic substance is more than 100 m$^2$/g, the size of said pore of said inorganic substance distributing in the range of 15 to 300 angstroms.

9. A filter as claimed in claims 1, 2, 3, 4, 6 or 7, wherein a main component of said inorganic substance adsorbing gaseous organic impurities and having an effective pore diameter larger than that of zeolite, is selected from the group consisting of porous viscous clay mineral, diatom earth, silica, alumina, mixture of silica and alumina, aluminum silicate, activated alumina or porous glass, and combinations thereof.

10. A filter as claimed in claim 9, wherein said porous viscous clay mineral is hydrated magnesium silicate clay mineral, activated clay, acid clay, activated bentonite, or a complex of micro-crystal of aluminosilicate and microscopic particles of silica, or a combination thereof.

11. A filter as claimed in claims 1, 2, 3, 4, 6 or 7, wherein said inorganic substances includes an inorganic adhesion assisting agent.

12. A filter as claimed in claim 11, wherein said adhesion assisting inorganic agent includes at least sodium silicate, silica, or alumina.

13. An air cleaning apparatus having an air circulation mechanism which circulates humidity controlled air through a predetermined air circulation path, wherein said air circulation path is provided with such a first filter as recited in claims 1, 2, 3, 4, 6 or 7, and a second filter which is disposed downstream from said first filter, said second filter capable of removing particulate impurities contained in the circulating air.

14. A filter comprising a first filter portion including synthetic hydrophobic zeolite having an effective pore diameter of not less than 7 angstroms as an adsorbent, and a second filter portion which is disposed upstream or downstream from said first filter portion so as to be adjacent thereto, said second filter portion including an inorganic adsorbent which adsorbs gaseous organic impurities and has an effective pore diameter larger than synthetic zeolite.

15. A filter as claimed in claim 14, wherein said first filter portion includes a base filter media as an adsorbent supporter to which synthetic zeolite is firmly fixed, and said second filter portion includes a base filter media as an adsorbent supporter to which an inorganic adsorbent is firmly fixed.

16. A filter as claimed in claim 15, wherein the supporter of said first filter portion is immersed in a suspension in which synthetic zeolite is dispersed, and then dried, thereby synthetic zeolite being firmly fixed to the surface of said supporter, and the supporter of said second filter portion is immersed in a suspension in which an inorganic adsorbent is dispersed, and then dried, thereby said inorganic adsorbent being firmly fixed to the surface of said supporter.

17. A filter as claimed in claim 15, wherein pellets formed by pelletizing synthetic zeolite powder are firmly fixed to the supporter surface of the first filter portion, and pellets formed by pelletizing said inorganic adsorbent powder are firmly fixed to the supporter surface of the second filter portion.

18. A filter as claimed in claim 16 or 17, wherein when firmly fixing pellets formed by pelletizing synthetic zeolite or powder thereof to the surface of said supporter and/or when firmly fixing pellets formed by pelletizing said inorganic adsorbent or powder thereof to the surface of said supporter, there is used an inorganic adhesion assisting agent which is selected from the group consisting of talc, kaolin mineral, bentonite, sodium silicate, silica, and alumina and combinations thereof.

19. A filter as claimed in claim 15, wherein said supporter is divided into two regions by an imaginary boundary plane intersecting the air flow passing through the supporter at right angles, and pellets formed by pelletizing synthetic zeolite or powder, thereof are firmly fixed to the surface of one of said two regions, thereby forming the first filter portion, while pellets formed by pelletizing said inorganic adsorbent or powder thereof are firmly fixed to the surface of the other of said two regions, thereby forming the second filter portion.

20. A filter as claimed in claims 14, 15, 16, 17 or 19, wherein said inorganic adsorbent used for said second filter portion is selected from the group consisting of diatom earth, silica, alumina, mixture of silica and alumina, aluminum silicate, activated alumina, porous glass, hydarated magnesium silicate clay mineral, activated clay, and activated bentonite, and combinations thereof.

21. A filter as claimed in claims 14, 15, 16, 17 or 19, wherein a total volume per unit weight of the pore of said inorganic substance is more than 0.2 cc/g or a specific surface of the pore of said inorganic substance is more than 100 m2/g, the size of said pore of said inorganic substance distributing in the range of 15 to 300 angstroms.

22. A filter as claimed in claims 14, 15, 16, 17 or 19, wherein said supporter is formed into the honeycomb structure.

23. A filter as claimed in claim 14, wherein said first filter portion is constructed in the form of a cylindrical casing which is filled with said synthetic hydrophobic zeolite pellets while said second filter portion is constructed in the form of a separate cylindrical casing which is filled with pellets which are pelletized from said inorganic adsorbent.

24. A method of manufacturing a filter having a base filter media as a supporter for supporting an adsorbent, comprising the steps of:

preparing a suspension in which there are dispersed powder of synthetic hydrophobic zeolite having an effective pore diameter of not less than 7 angstroms and powder of an inorganic substance which absorbs gaseous impurities and has an effective pore diameter larger than that of zeolite and serves as a binder; and immersing said supporter in said suspension and then subjecting said supporter to drying, thereby forming an adsorption layer on the surface of said supporter.

25. A method of manufacturing a filter having a base filter media as a supporter for supporting an adsorbent, comprising the steps of:

immersing said supporter in a suspension in which there are dispersed powder of synthetic hydrophobic zeolite having an effective pore diameter of not less than 7 angstroms and powder of an inorganic substance as a binder and then subjecting said supporter to drying, thereby forming a first adsorption layer on the surface of said supporter; and immersing said supporter already having said first adsorption layer in a suspension in which there is dispersed an inorganic substance which has ability to adsorb gaseous organic impurities and an effective pore diameter larger than that of zeolite and then subjecting said supporter to drying, thereby forming a second adsorption layer on the surface of said first adsorption layer.

* * * * *